Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 2

Inventors:
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 3

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 4

Inventors
Wallace M. Cutler
Edwin S. Kant
By their Attorney
Thomas J. Ryan

HEEL ATTACHING MACHINES

Filed April 9, 1952

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 6

Inventors
Wallace M. Cutler
Edwin S. Kant
By their Attorney
Thomas J. Ryan

HEEL ATTACHING MACHINES

Filed April 9, 1952 22 Sheets-Sheet 7

Inventors
Wallace M. Cutler
Edwin S. Kant
By their Attorney
Thomas J. Ryan

HEEL ATTACHING MACHINES

Filed April 9, 1952 22 Sheets-Sheet 8

Inventors:
Wallace M. Cutler
Edwin S. Kant
By their Attorney
Thomas J Ryan

Inventors
Wallace M. Cutler
Edwin S. Kant
By their Attorney
Thomas J. Ryan

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 11

Inventors
Wallace M. Cutler
Edwin S. Kant
By their Attorney
Thomas J. Ryan

Inventors
Wallace M. Cutler
Edwin S. Kant
By their Attorney
Thomas J. Ryan

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 14

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 15

Inventors
Wallace M. Cutler
Edwin S. Kant
By their Attorney
Thomas J. Ryan

Inventors
Wallace M. Cutler
Edwin S. Kant
By their Attorney
Thomas J. Ryan

Inventors
Wallace M. Cutler
Edwin S. Kant
By their Attorney
Thomas J. Ryan

Inventors
Wallace M. Cutler
Edwin S. Kant
By their Attorney
Thomas J. Ryan

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 20

Inventors
Wallace M. Cutler
Edwin S. Kant
By their Attorney
Thomas J. Ryan

May 22, 1956 W. M. CUTLER ET AL 2,746,048

HEEL ATTACHING MACHINES

Filed April 9, 1952 22 Sheets-Sheet 21

Inventors:
Wallace M. Cutler
Edwin S. Kant
By their Attorney
Thomas J. Ryan

Inventors
Wallace M. Cutler
Edwin S. Kant
By their Attorney
Thomas J. Ryan.

2,746,048
Patented May 22, 1956

2,746,048

HEEL ATTACHING MACHINES

Wallace M. Cutler, Gloucester, and Edwin S. Kant, Melrose, Mass., assignors to United Shoe Machinery Corporation, Flemington, N. J., a corporation of New Jersey Application April 9, 1952, Serial No. 281,391

60 Claims. (Cl. 1—141)

This invention relates to machines for use in the attachment of heels to shoes, and is illustrated as embodied in an improved heel attaching machine of the general type disclosed in an application for United States Letters Patent Serial No. 281,392, filed April 9, 1952, in the names of Wallace M. Cutler et al.

The present machine consists in the novel features hereinafter described, reference being had to the accompanying drawings which illustrate one embodiment of the invention selected for purposes of illustration, the invention being fully disclosed in the following description and claims.

In the accompanying drawings,

Figs. 28 and 29 are front and side views respectively of a one-revolution clutch for operatively connecting the sliding beam to an impeller which reciprocates continuously when the main switch of the machine is turned on;

Figure 4:
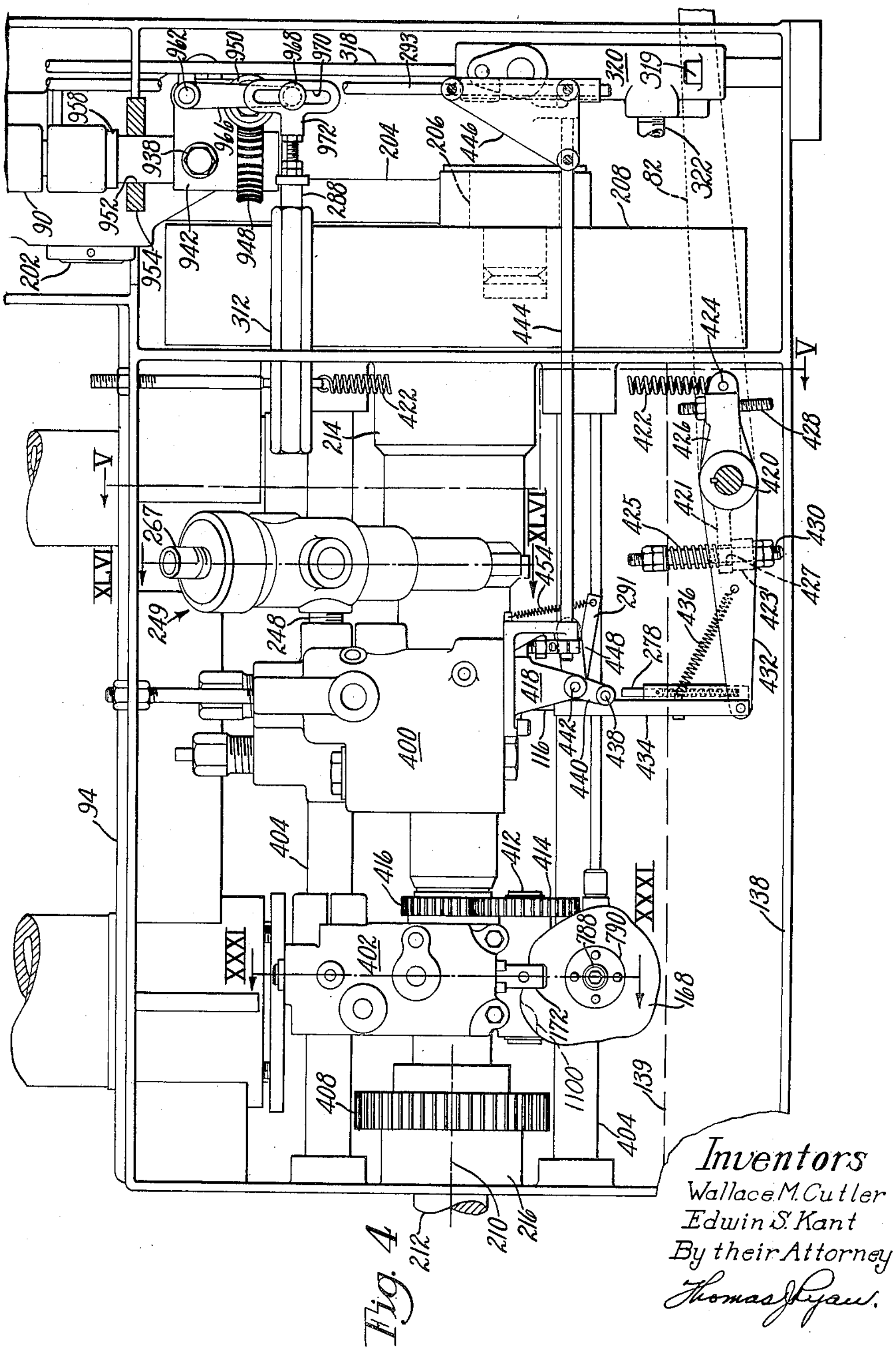
Fig. 4 is a left side elevation of the base portion of the illustrative machine the left side wall of a base housing of which has been broken away.
Figures 41A, 42:
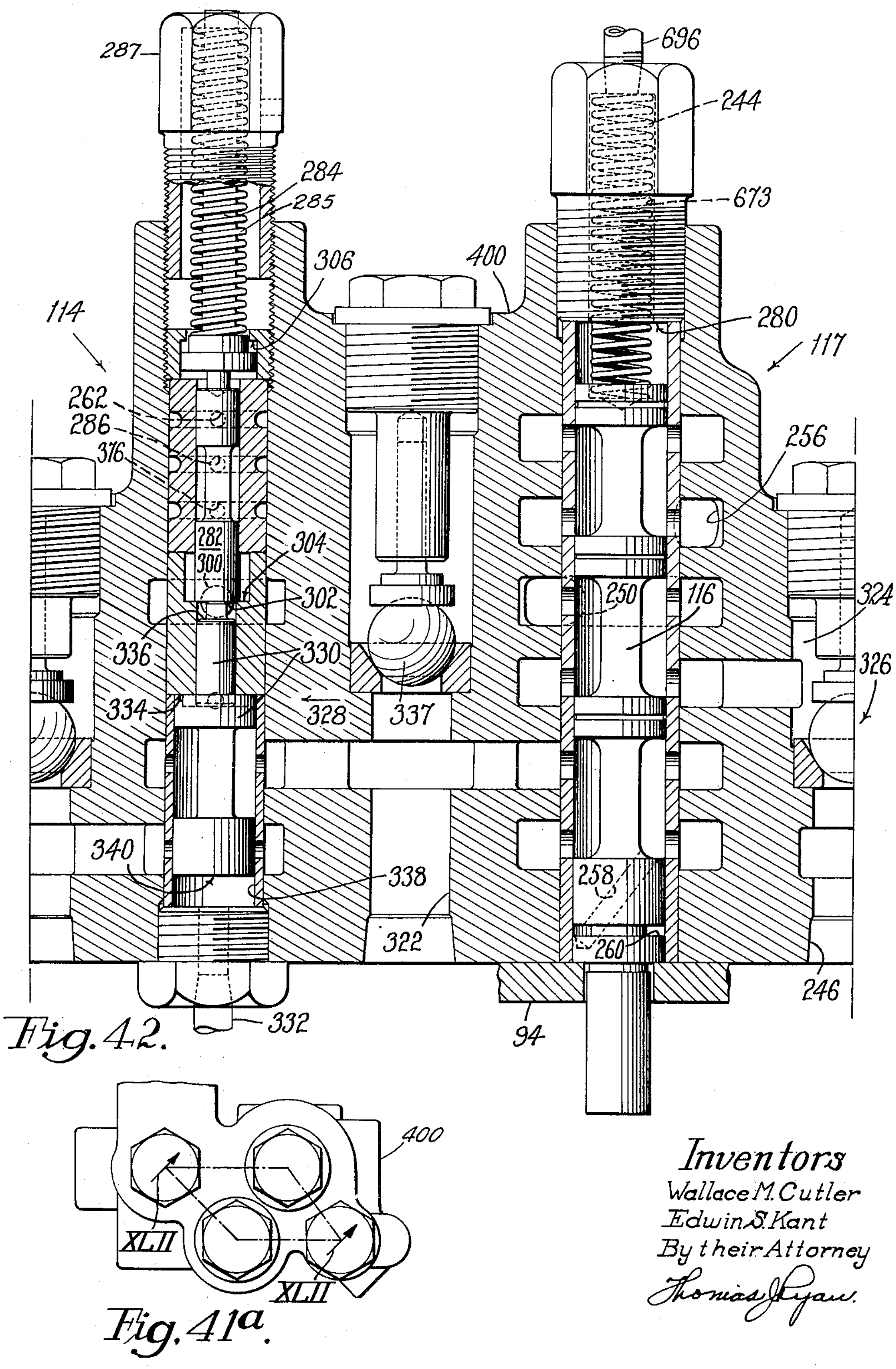
Figures 43, 44, 45, 46:
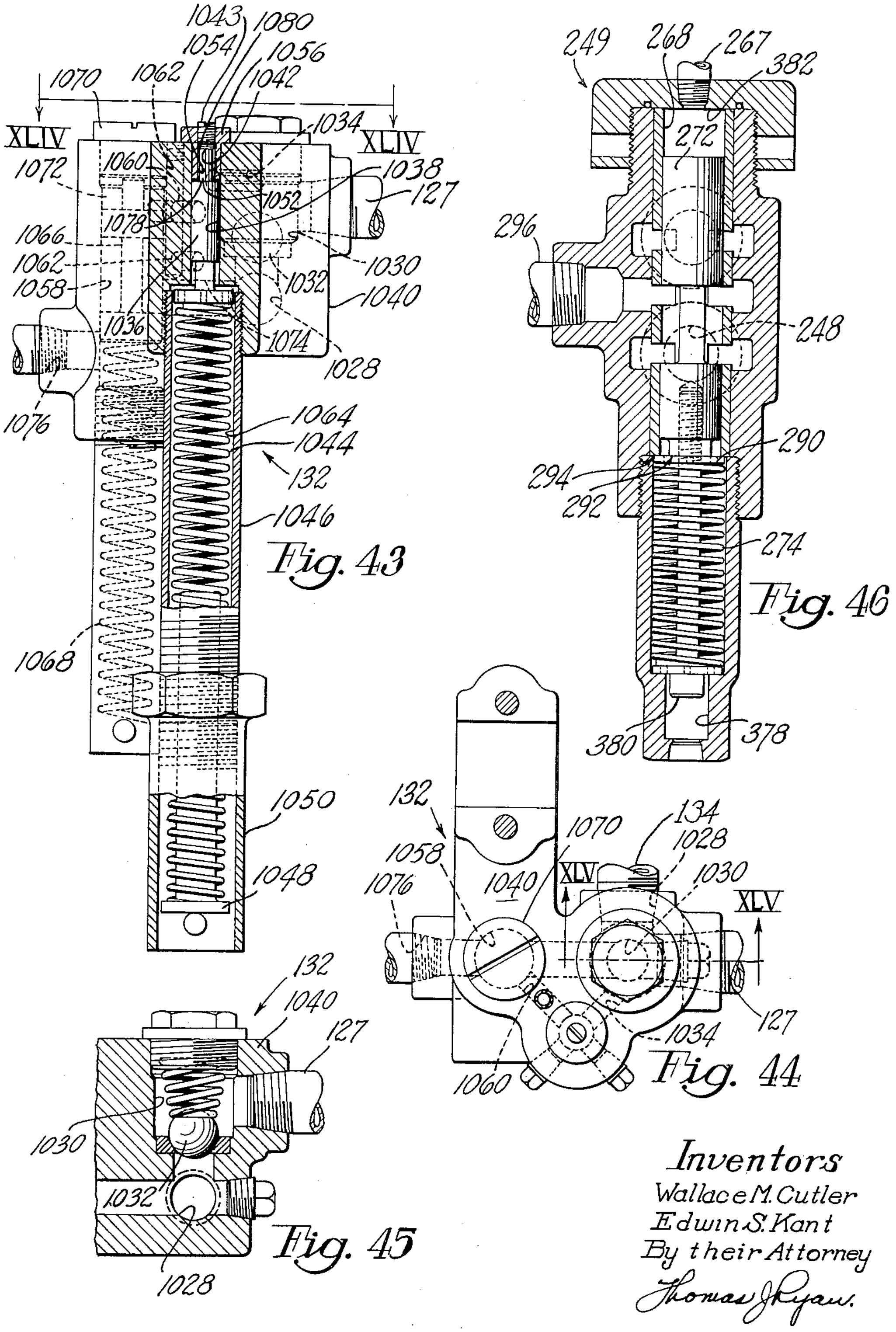
Figure 47:
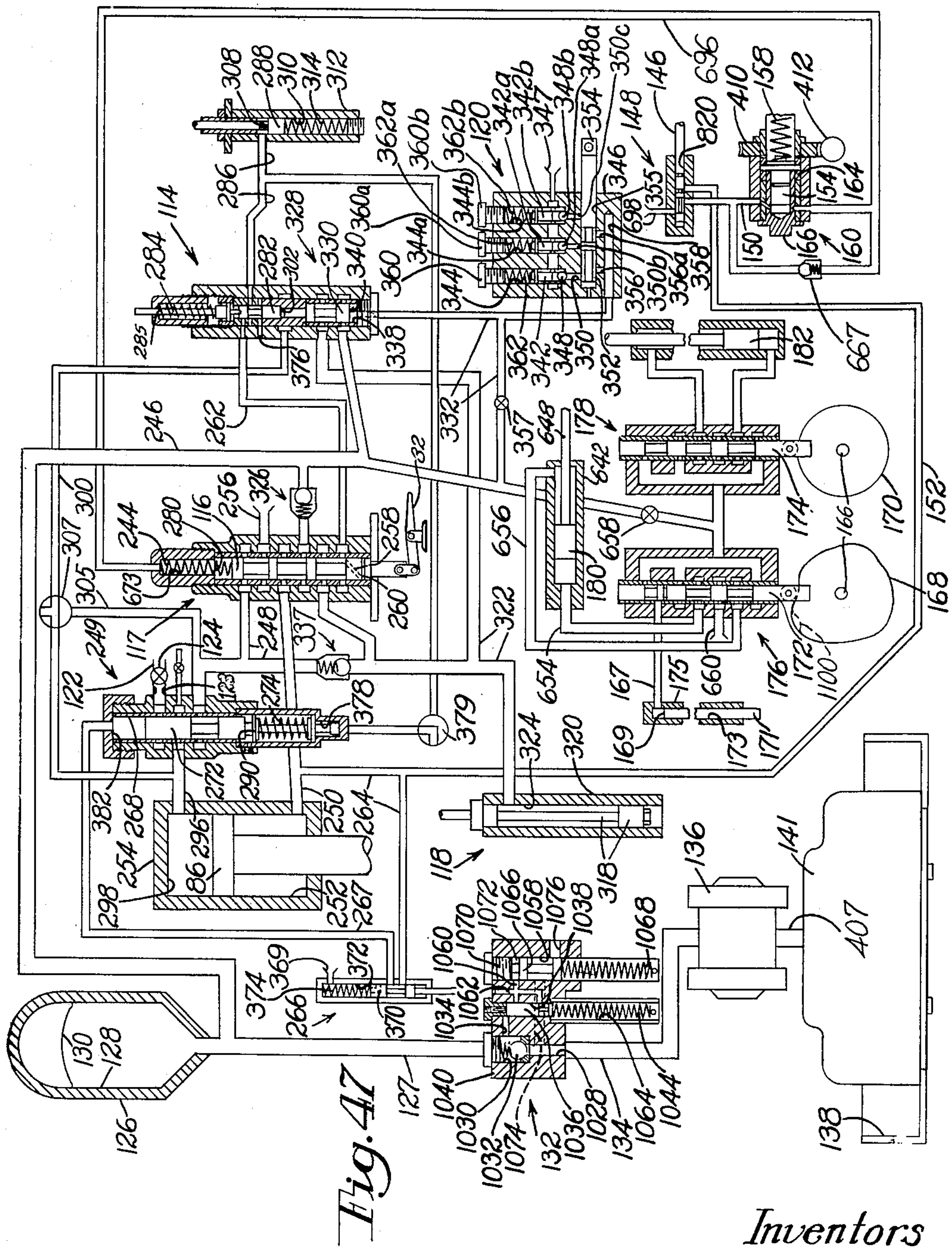
Figure 48:
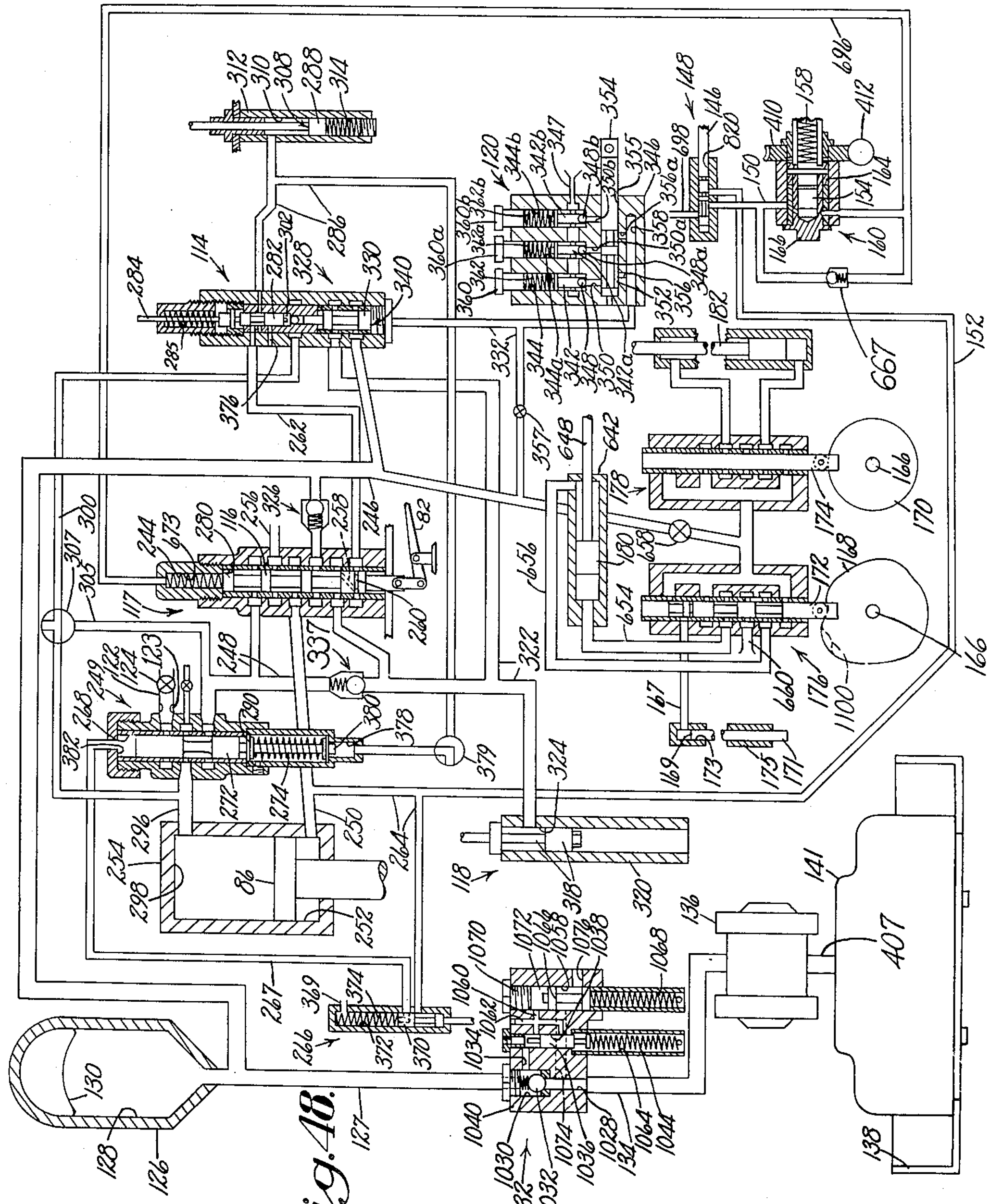
Figures 49, 50:
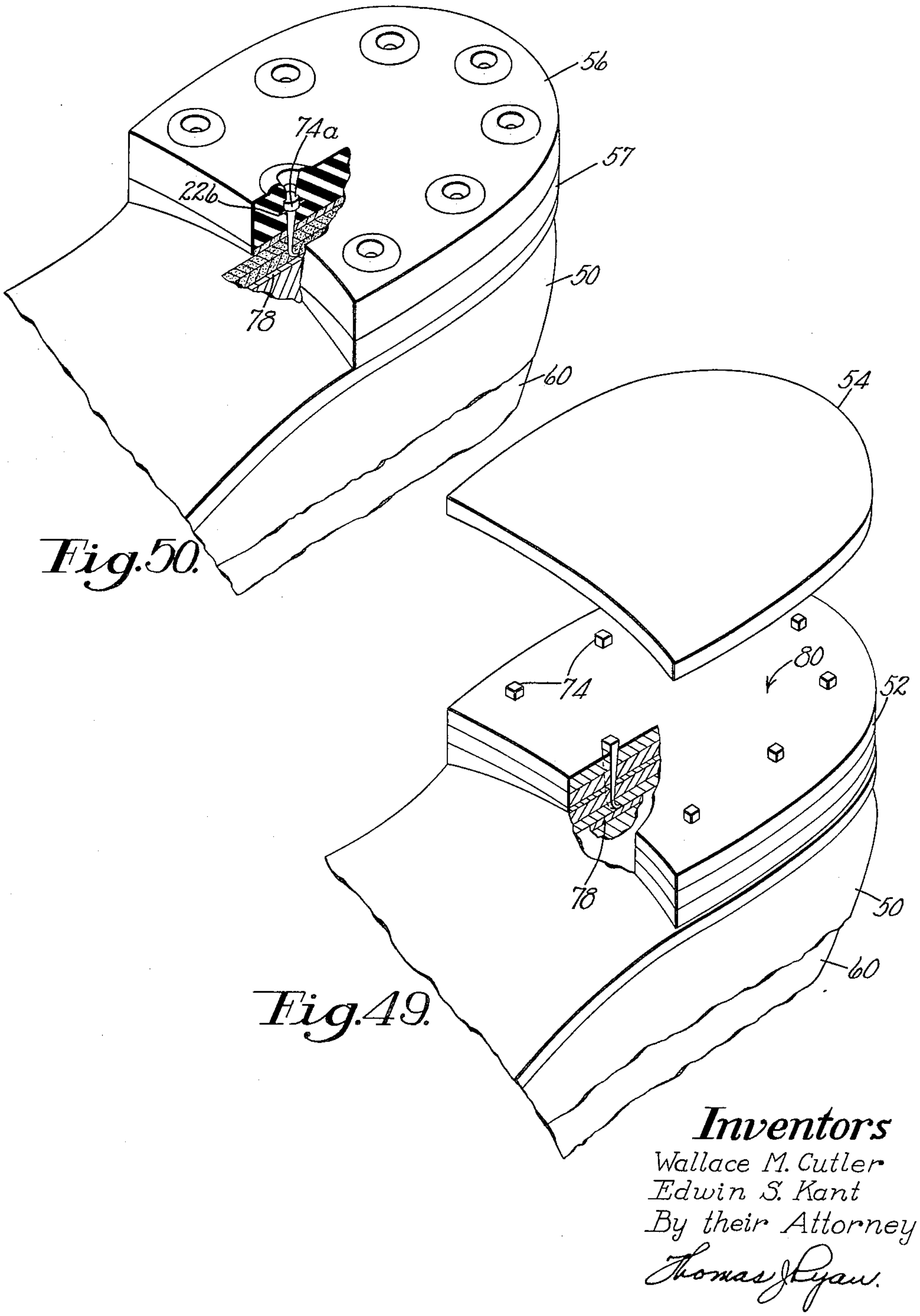

Fig. 41*a* is a plan view of a housing of a treadle valve;

Fig. 42 is a development on a plane of a section on the line XLII—XLII through the valve housing shown in Fig. 41*a*, said section showing in detail a treadle valve, a clutch trip pilot valve and a pilot relief valve which form part of the fluid pressure means for operating the machine;

Fig. 43 is a longitudinal section through an unloader which is interposed between a pump and an accumulator of the machine;

Fig. 44 is a view of the unloader illustrated in Fig. 43 on line XLIV—XLIV of Fig. 43;

Fig. 45 is a section on line XLV—XLV of Fig. 44;

Fig. 46 is a section on the line XLVI—XLVI of Fig. 4 through a main cylinder pilot valve;

Figs. 47 and 48 show the fluid pressure means of the machine diagrammatically when the machine is idle and when nails are being driven into the work respectively;

Fig. 49 is a view, partly in section, showing the rear end portion of a shoe to which a heel has been attached by the use of the machine and a top lift which has been spanked onto the heel but has been removed from the heel for purposes of illustration; and Fig. 50 is a perspective view, partly in section, of the heel end portion of a shoe to which a rubber heel and its base lift have been attached by the use of the illustrated machine.

Figure 2:
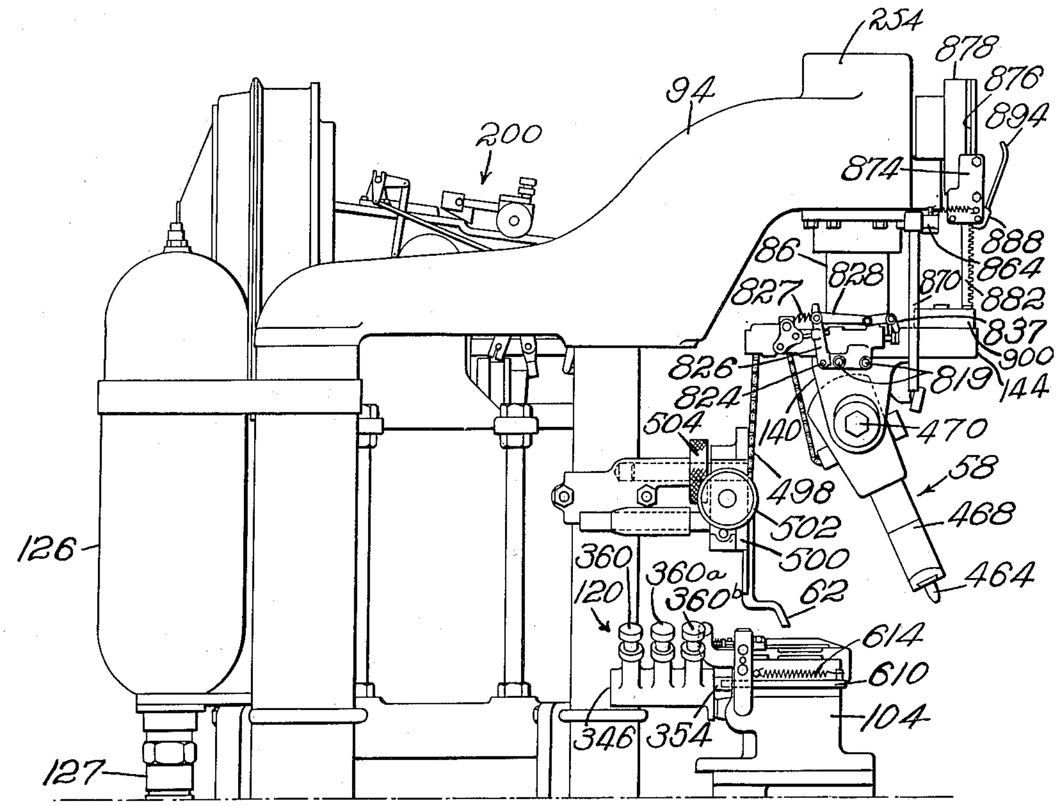
Fig. 2 is a left side elevation of the upper portion of the machine shown in Fig. 1.
Figure 3:
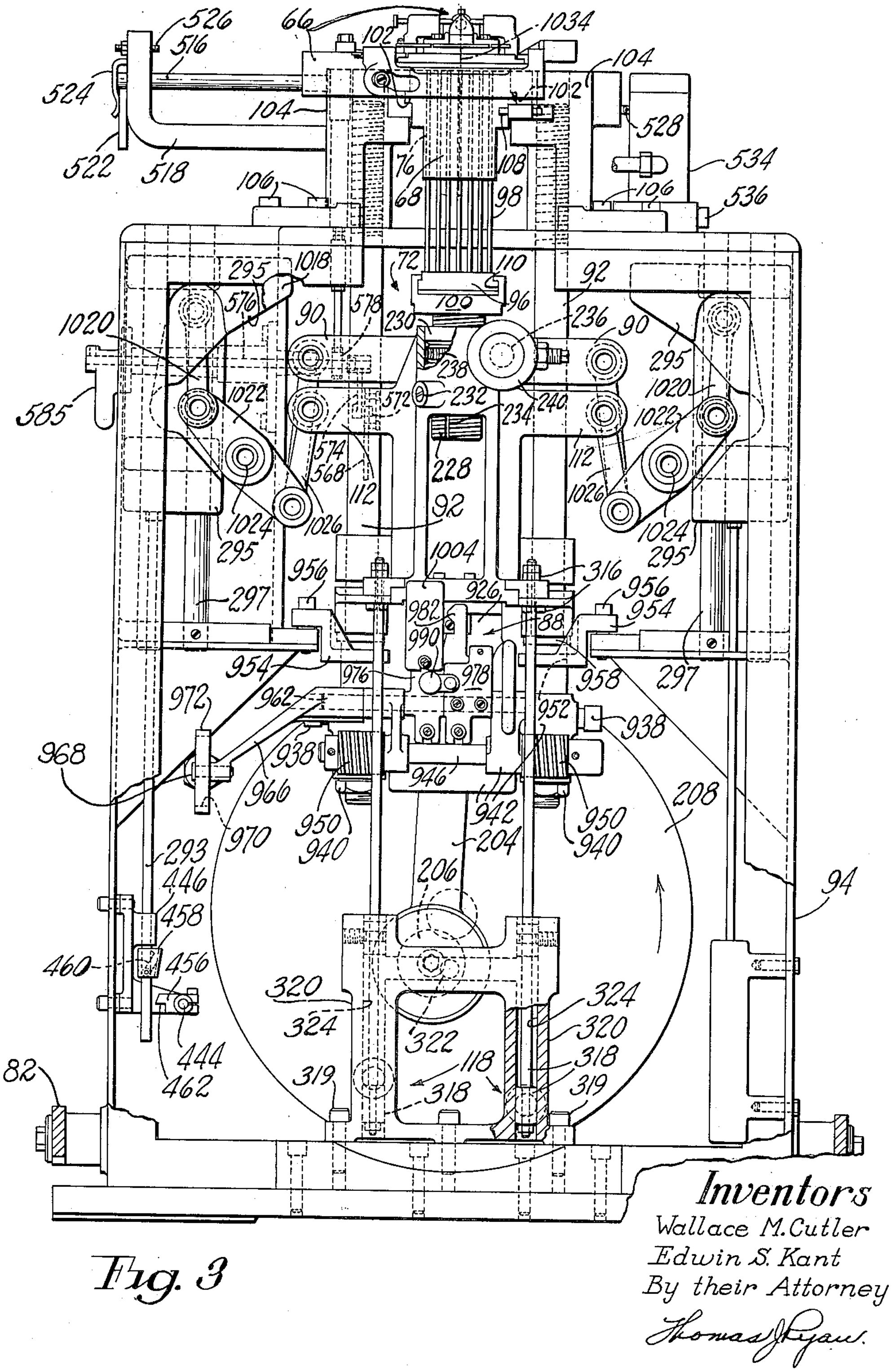
Fig. 3 is a front view of the lower half of the machine, a base housing of which has been broken away to show nail driving and other mechanism of the machine.
Figure 11:
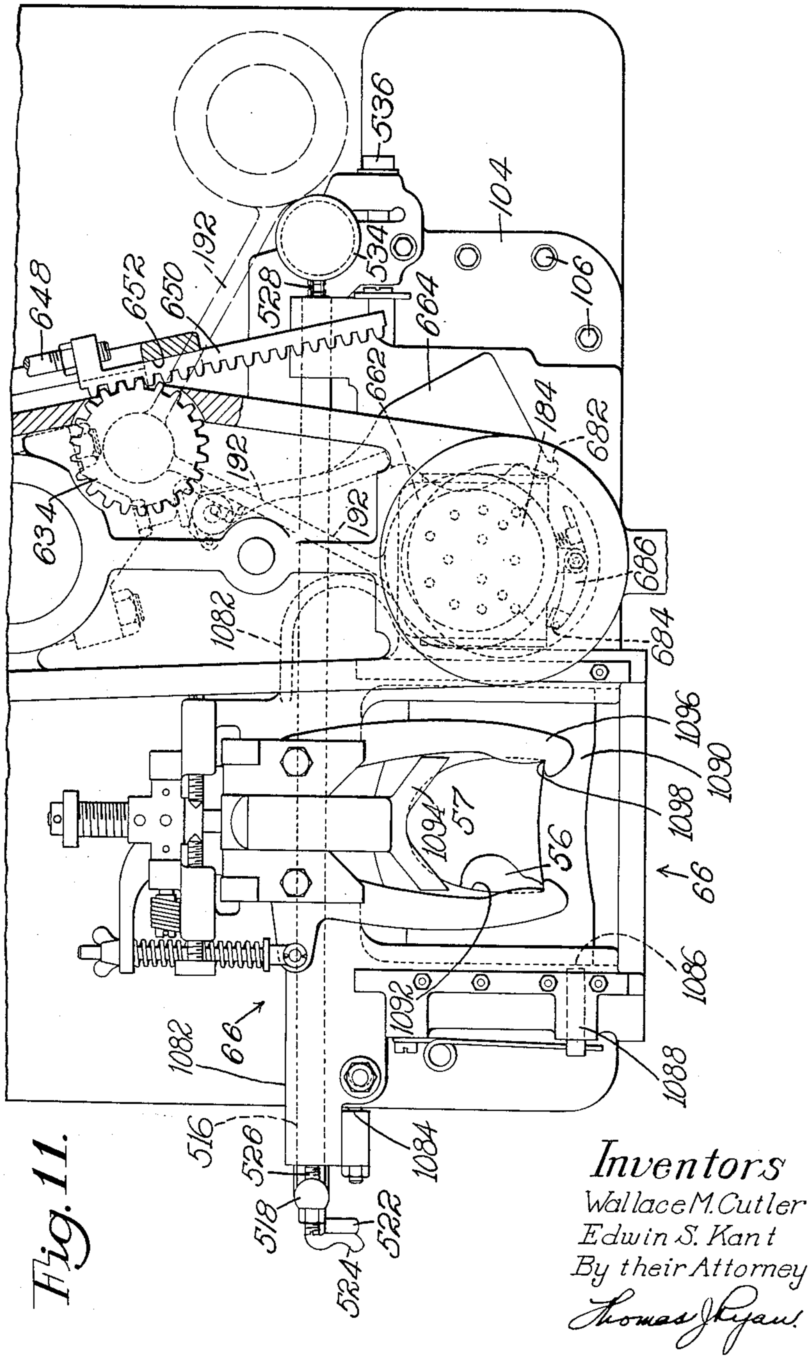
Fig. 11 is a plan view of a rubber heel and base lift carrier held away from its normal postion over the nailing die by a loader block arm the loader block of which is in a nail delivering position over the nailing die.
Figures 22, 23, 24:
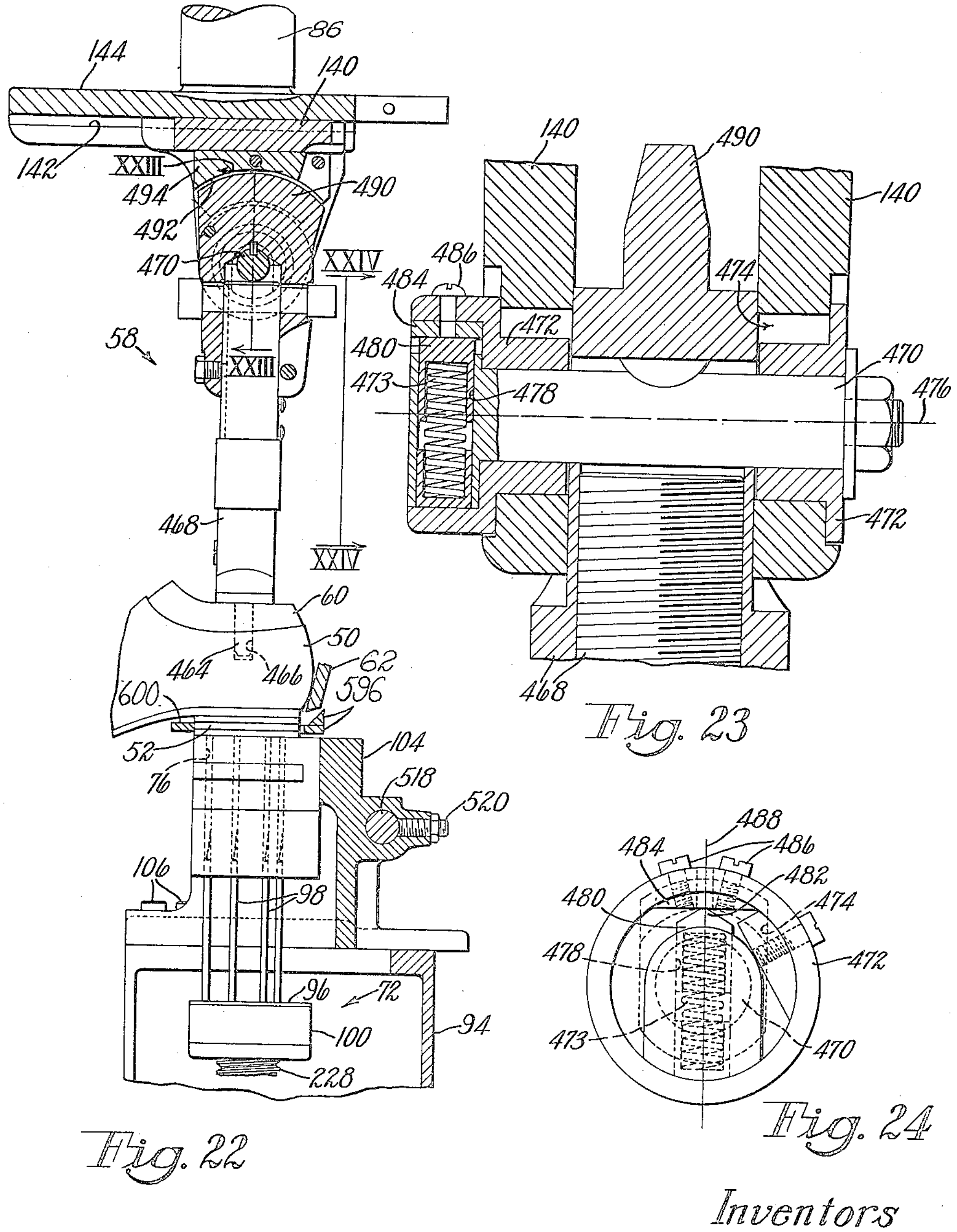
Fig. 22 is a vertical longitudinal section showing a jack and a nailing die between which are clamped a shoe and a heel preparatory to driving nails through the heel and the heel seat of the shoe.
Fig. 23 is a section on line XXIII—XXIII of Fig. 22.
Fig. 24 is a view on line XXIV—XXIV of Fig. 23.

The illustrative machine, which is described with reference to the attachment to shoes 50 (Figs. 22, 49 and 50) of built-up leather or composition heels 52 and top lifts 54 and also with reference to the attachment to said shoes of rubber heels 56 and their base lifts 57, comprises a jack 58 (Figs. 1, 2 and 22) on which a shoe upon a last 60 and arranged right side up is mounted and with relation to which the shoe is positioned by a back gage 62, and a heel and top lift carrier 64 (Figs. 3, 8, 9, 25 and 26) which is mounted for transverse sliding movement and is adapted successively to position the heel and top lift over a nailing die 68 (Figs. 3, 13, 12 and 16). The machine, adapted to accommodate rubber heel work, has substituted for the carriage 64 a modified carriage 66 (Figs. 3 and 11). The leather heel 52 or the base 57 to which the rubber heel may or may not have been "spotted" is forced against the nailing die 68 by the heel seat portion of the shoe 50 mounted upon and depressed by the jack 58 preparatory to raising a driver head or nail driver head 72 (Figs. 3 and 22) to drive nails 74 (Fig. 49) or **74*a* (Fig. 50) then in driver passages 76 of the nailing die 68 through the leather heel and the heel seat of the shoe or through the rubber heel, its base lift and the heel seat of the shoe, said nails being clinched by driving them against a heel plate 78** of the last.

As in the case of the machine disclosed in said application Serial No. 281,392, in attaching leather heels 52 and their top lifts 54 to shoes 50 the machine drives nails only during every other cycle. During the attachment of the heel 52 to the shoe the nails 74 are left projecting slightly beyond a top lift receiving face 80 of the heel as illustrated in Fig. 49 and at the end of the first power cycle of the machine the jack 58 is lifted slightly to enable the carrier 66 to shift transversely to a position in which the top lift 54 in the carrier underlies the attached heel of the shoe upon the jack. During the succeeding partial cycle of the machine effected by depressing a treadle 82, (Figs. 1, 3 and 4) the projecting portions of the nails 74 in the heel are forced into the top lift 54 mounted in the carrier and resting on a plate 84 (Fig. 8) which constitutes part of the carrier and rests on the upper surface of the nailing die 68. It will be noted at this point that in order to "spank" the top lift onto the heel the treadle 82 of the machine is usually fully depressed thereby forcing the attached heel of the shoe against the top lift under preliminary and secondary pressures. The top lift 54 is permanently secured to the leather heel 52 in a subsequent slugging operation performed by the use of a separate machine (not shown) in which one or more rows of closely positioned nails are driven through the peripheral portion of the top lift and into the heel.

The jack 58 is operated by hereinafter described fluid pressure means which comprises a piston or plunger 86 (Figs. 1, 2, 47 and 48) serving as an activator for the jack 58 and which is responsive to movement of the treadle 82, the driver head 72 being operated after being coupled, by a one-revolution clutch 88, (Figs. 3, 28, 29 and 30) which is responsive to clutch tripping means associated with said fluid pressure means, to an impeller 90 which when a power switch of the machine has been turned on reciprocates continuously on vertical rods 92 secured to and initially adjustable vertically in a main frame 94 of the machine. The driver head 72 comprises a holder 96 (Figs. 3 and 22) to which the lower ends of nail drivers 98 are secured, and a housing 100 which has ways adapted interchangeably to receive holders having drivers arranged in different "patterns" or "designs." The nailing die 68 has a pair of lateral flanges fitting in grooves 102 of a bracket 104 which is secured by screws 106 to and may be considered part of the main frame 94, said nailing die being secured against movement in said bracket by a spring-pressed plunger 108. Nailing dies 68 of different patterns together with corresponding holders 96 and associated drivers 98 are interchangeably incorporated in the machine by sliding, respectively, the nailing dies into the grooves 102 of the bracket 104 and into a groove 110 of the housing 100. As will be hereinafter described, the housing 100 is adjustably secured to a sliding beam 112 and the holder 96 is adapted freely to slide in the groove 110 to insure that the nail drivers 98 shall slide without binding in the passages 76 of the nailing die 68.

The one-revolution clutch 88 is tripped or engaged by hereinafter described mechanism rendered active in response to actuation of a clutch trip pilot or control valve 114 (Figs. 42, 47 and 48) moved to a raised or open position shown in Fig. 48 by fluid pressure means controlled by a plunger 116 of a treadle, control or reversing valve 117 manually actuated in response to movement of the treadle 82. In order to insure against displacement of work while the nails 74 are being driven it is desirable to increase preliminary or initial downward pressure of the shoe 50 mounted upon the jack 58 against the heel 52. Accordingly, the machine is provided with a mechanically actuated booster or booster unit or compressor 118 which is operatively connected to the sliding beam 112 and is actively associated with the fluid pressure means for operating the jack 58 and which materially increases the pressure applied by the jack 58 against the work just before and during the driving of nails 74 into the work. The maximum pressure exerted upon the work by the jack 58 during the attachment of the heel 52 to the shoe and during the attachment of the top lift 54 to the heel, is controlled by a pressure regulator 120 (Figs. 2, 38, 39, 47 and 48).

It will be noted at this time that when the nails **74*a* are being driven in the attachment of rubber heels 56 and their base lifts 57 to shoes it is desirable to apply against the work a pressure substantially less than that required in attaching leather heels to shoes and accordingly, just before the nails 74 are driven into the work, fluid pressure means which may be regulated to apply low preliminary pressure against the work is connected to an exhaust or low pressure line 122 (Figs. 5, 47 and 48) having in it a relief valve 124 and an orifice 123**.

In order to supply sustained oil pressure to the fluid pressure means or system there is provided an accumulator 126 (Figs. 1, 2, 47 and 48) which is supplied by a line 127 and has an oil chamber 128 housing at its upper end an air bag 130 having a controlled internal pressure. The accumulator 126 has associated with it an unloader 132 which when the pressure in the accumulator reaches a desired maximum spills oil supplied by a line 134 from a pump 136 directly into an atmospheric sump 138 formed by an oil tight base housing of the main frame 94. Oil in the sump 138 is maintained at a level indicated by reference numeral 139 (Figs. 4 and 5), a filter (not shown) through which oil supplied to the pump 136 passes being enclosed in a hood 141 (Figs. 5, 47 and 48) enclosed in the base housing.

The jack 58 is swiveled upon a slide 140 (Figs. 1, 2, 22 and 23), which is initially adjustable in a guideway 142 of a platform 144 secured to the lower end of the piston 86, for movement between its forward or loading and unloading position on the one hand and its rear or pressure applying position on the other hand.

In the attachment of heels 52 and their top lifts 54 to shoes the nails are automatically supplied to the passages 76 of the nailing die 68 at the end of every nail driving cycle of the machine in response to movement of a plunger 146 (Figs. 41, 47 and 48) of a clutch valve 148 which supplies to a line 150 oil from a line 152 which at that time is open to the accumulator 126, thereby effecting sliding movement of a plunger 154 (Figs. 31, 47 and 48) against the action of a spring 158 to cause to be engaged a one-revolution fluid pressure actuated clutch 160, hereinafter described in detail. Operatively connected to a slidable driven portion 164 of the clutch 160 is a multipart drive shaft 166 having rotatable with it cams 168, 170 which actuate plungers 172, 174 respectively of valves 176, 178 adapted to control movements of pistons 180, 182 (Figs. 12, 19, 47 and 48) which control respectively horizontal swinging and if desirable vertical movement of a loader block 184. The above loader block driving arrangement was designed for use in a machine in which the loader block was movable vertically as well as horizontally as disclosed in said application Serial No. 281,392. In the present machine the loader block swings in a horizontal plane only and accordingly the cam 170 is circular and at all times maintains the plunger 174 and the piston 182 inactive. Extending from the valve 176 is a line 167 for supplying oil to the upper face 169 of a piston 171 which is slidingly mounted in a bore 173 of a fixed housing 175 and is associated with mechanism hereinafter described for biasing the carrier 64 to the right as viewed from the front of the machine.

Figures 12, 13, 14, 15:
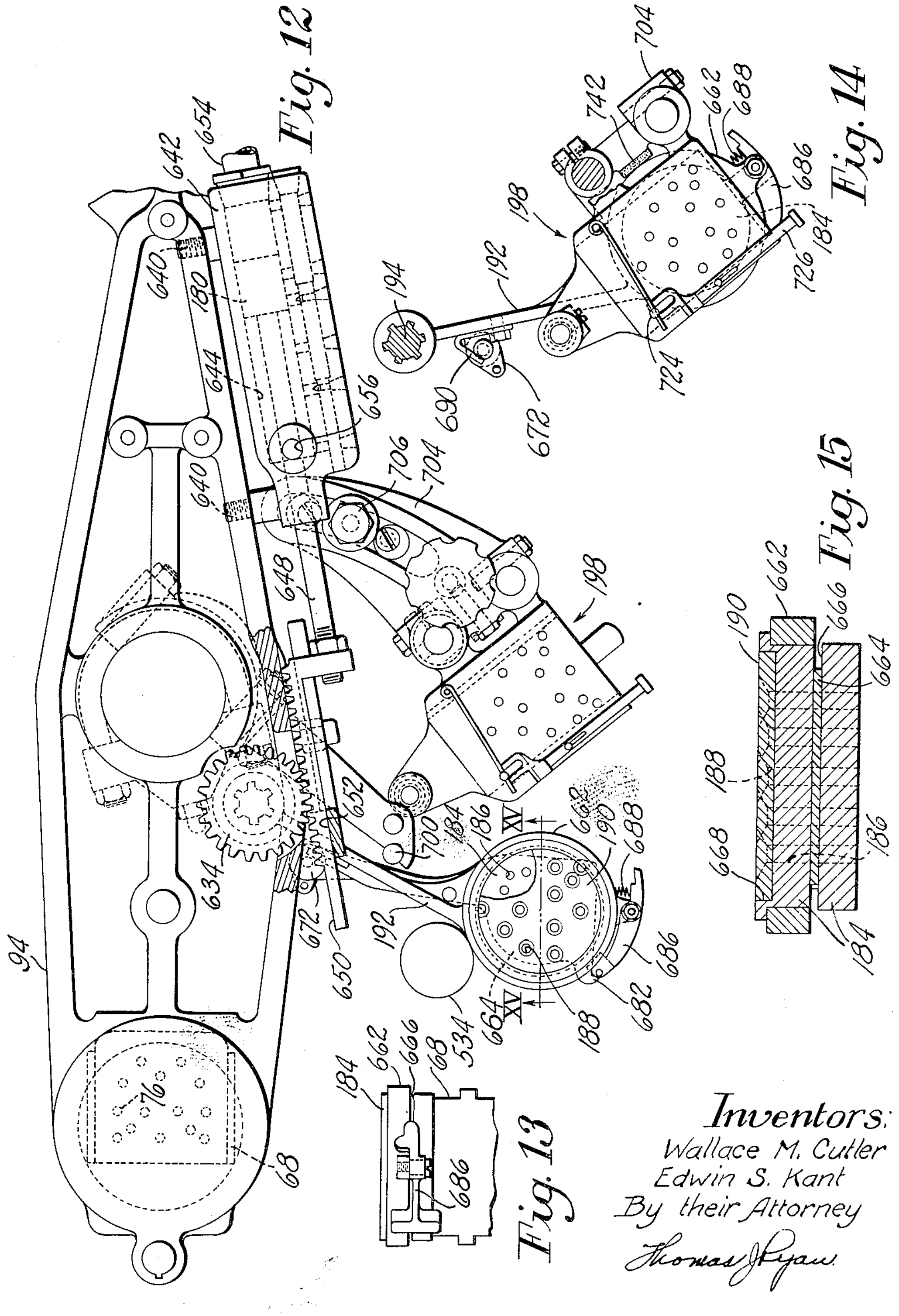
Fig. 12 shows in plan the loader block arm and the loader block in rest position and a nail delivering unit from which the loader block receives its nails.
Fig. 13 is a front view of the nailing die and the loader block arm and its associated loader block positioned over said die.
Fig. 14 shows in plan the nail delivering unit at the time the loader block is beneath the unit receiving a load of nails.
Fig. 15 is a section on line XV—XV of Fig. 12 through the loader block and a ring portion of the arm which supports the loader block.

When the machine is at rest the loader block 184 is in a rest position, best shown in Fig. 12, said block having in certain of its passages 186 (Figs. 12, 15 and 16), which are in register with passages 188 of a selector plate 190 forming part of said block, a load of nails 74 or 74_a_. Upon operation of the plunger 146 and the resulting movement of the piston 180 to the left as viewed in Fig. 12 the loader block together with an arm 192 of said block swings from its rest position to a dwell position shown in Figs. 11 and 16 over the nailing die 68 in which position the load of nails in the passages 186 is dumped into the driver passages 76 of the nailing die 68 and onto the upper ends of the drivers 98. The loader block arm 192, which is secured to the lower end of a splined shaft 194 by a draw screw 196, (Figs. 16 and 19) is then swung counterclockwise as viewed from above to move the loader block 184 into a position beneath a nail supplying unit 198 (Figs. 1, 12, 14 and 17) preparatory to dropping nails 74 or 74_a_ delivered to said unit from a nail distributor 200 (Figs. 1 and 2) into said loader block which after receiving said nails is swung clockwise to its rest position. The nail distributor 200 is described and claimed in United States Letters Patent No. 2,604,624, granted July 29, 1952 on an application filed in the names of Wallace M. Cutler et al.

Secured to the impeller 90 is a pin 202 (Figs. 1, 29 and 30) operatively connected to a crank 206 (Figs. 1, 3 and 4) which is carried by a flywheel 208, by a connecting rod 204. The throw of the crank 206 may be varied, said flywheel 208, crank 206 and connecting rod 204 being automatically balanced dynamically with relation to an axis of rotation 210 of the flywheel, which is secured to the forward end of a driven shaft 212, as the throw of the crank is varied by mechanism described and claimed in United States Letters Patent No. 2,561,344, granted July 24, 1951 on an application filed in the names of Wallace M. Cutler et al. The drive shaft 212 is journaled in bearings 214 (Figs. 1 and 4), 216 supported by the main frame 94 and has secured to its rear end a pulley 218 driven through belts 220 by pulleys 222 secured to a shaft 224 of an electric motor 225.

In order initially to position the drivers 98 in the driver passages 76 of the nailing die 68 so that they shall drive nails 74 to predetermined depths into the work, or if desirable flush with the work, it is desirable that the driver holding housing 100 shall be vertically adjusted with relation to the sliding beam 112 upon which it is mounted. The drivers 98 are sometimes positioned to drive the nails 74 flush with the top lift receiving face 80 of the built-up leather heel 52 but are usually set to leave the nails projecting beyond said face so that when the heel attached to the shoe mounted upon the jack 58 is pressed against the top lift in the carrier 64 said top lift is spanked onto the heel. The nails 74_a_ which attach rubber heels 56 and their base lifts 57 to shoes 50 are driven substantial distances into the rubber heels, heads of said nails stopping at metal washers 226 incorporated in said heels as shown in Fig. 50.

With the foregoing in view the housing 100 for the holder 96 of the driver head 72 has a threaded shank 228 (Figs. 3 and 22) on which is mounted an internally threaded nut 230 rotatably mounted in the sliding beam 112. The threaded shank 228 of the housing is constrained against rotation in the sliding beam by a stud 232 threaded into said beam and fitting in a vertical slot 234 in said shank. The driver head 72 may be moved into different adjusted positions upon the sliding beam 112 by the use of a worm 236 which is rotatably mounted in said beam and which meshes with a worm gear 238 of the nut and has secured to it a hand wheel 240, said worm being held in different adjusted positions in the sliding beam by a spring-pressed plunger (not shown).

In the operation of the machine the operator depresses the treadle 82 causing the plunger 116 of the treadle valve 117 (Figs. 42, 47 and 48) to be moved against the action of a spring 244 from its rest position shown in Fig. 47 to its position shown in Fig. 48, thereby connecting a line 246 from the accumulator 126 with a line 248 leading to a main cylinder or actuator pilot or cut-off valve 249 and also connecting a line 250 extending from a chamber 252 of a main cylinder 254 in which the piston 86 reciprocates with an exhaust or low pressure line 256. Extending diagonally through a spool of the plunger 116 is a passage 258 in communication with a channel or passage 260 which extends circumferentially of said spool and when the machine is at rest is spaced from a line 262 between the treadle valve 117 and the clutch trip pilot valve 114.

The line 250 has connected to it a line 264 which when the machine is at rest, as shown in Fig. 47, communicates through a limit stop valve 266 and a line 267 with a chamber 268 of the main cylinder pilot valve 249. When the line 264 has been connected to the exhaust port 256 in response to upward movement of the treadle-operated plunger 116, oil, which is under accumulator pressure and when the machine is idle acts against the upper end of a plunger 272 slidable in a cylindrical bore of the pilot valve 249, is released with the result that the plunger 272 acted upon by a spring 274 moves from its lowered position shown in Fig. 47 to an intermediate position shown in Figs. 46 and 48.

So long as the operator does not move the channel 260 of the plunger 116 of the treadle valve 117 into communication with the line 262 connecting the treadle valve to the clutch trip pilot valve 114 he may remove his foot from the treadle 82 and the plunger 116 of the treadle valve acted upon by the spring 244 will return to its rest position shown in Fig. 47, the piston 86 which may be referred to as an actuator being moved to its raised or rest position and thus affording the operator a chance to reposition the work if desirable in the machine. When the plunger 116 of the treadle valve 117 has been partially raised to its position shown in Fig. 48 and the operator is confident that the shoe 50 mounted upon the jack 58 is properly positioned with relation to the leather heel 52 or the rubber heel 56 and its base lift 57, he further depresses the treadle 82 and operates hereinafter described mechanism, which is responsive to movement of said treadle, against the action of a spring-pressed plunger 278 (Figs. 4, 5 and 6) which is provided for the purpose of "feeling" when the testing limit of the treadle has been reached. As depression of the treadle 82 is continued the plunger 116 moves to its raised position shown in Fig. 48 against a stop face 280 with the result that oil passes through the diagonal passage 258, the channel 260 and into the line 262. Accordingly, when a plunger 282 of the pilot valve 114 is raised by fluid pressure means, which is referred to above and will be hereinafter described in detail, in opposition to a spring-pressed rod or resistance member 284, oil is available for a line 286 leading to a piston 288 for actuating mechanism which trips the one-revolution clutch 88. The rod 284 and a spring 285 which actuates said rod may be referred to as a resistor unit. The strength of the spring 285 may be varied by turning a housing screw 287 into different positions in the housing of the clutch trip pilot valve 114. At this point in the cycle of operation of the machine when the plunger 116 of the treadle valve 117 has been moved to the upper end of its stroke in response to mechanism hereinafter described and operatively connected to the treadle 82, a spring-pressed latch 291 (Figs. 4, 5 and 6) slides beneath the plunger 116 of the treadle valve 117, said latch serving to hold the plunger in its raised position until it is released by mechanism hereinafter described actuated by a rod 293 (Figs. 3 and 4) secured to the left, as viewed from the front of the machine, of a pair of counter-weights 295 which, as will be explained later, are mounted for vertical movement on rods 297 secured to the main frame 94 and are operatively connected respectively to the sliding beam 112.

When the upper end of the plunger 272 of the main cylinder pilot valve 249 is opened to the exhaust port 256 a washer 290 which is slidingly mounted upon a shank of the plunger 272 and normally engages a shoulder 292 (Fig. 46) of the plunger, acted on by the spring 274 raises the plunger until the collar engages a shoulder 294 of a fixed bushing of the valve thus opening a line 296 leading to an upper chamber 298 of the main cylinder 254 with the line 248 and accordingly allowing accumulator oil to depress the jack carrying piston 86 and thereby forcing under preliminary pressure the heel seat of the shoe 50 upon the jack 58 against the leather heel 52 mounted upon the carrier 64.

When the work has been clamped in the machine under preliminary pressure, pressure builds up in the chamber 298 of the main cylinder 254 and is available for a transfer line 300 leading to a face 302 of the plunger 282 of the clutch trip pilot valve 114 which, as above stated, has operating against its upper end as viewed in Figs. 42, 47 and 48 the spring-pressed rod 284 for constantly urging the plunger toward its closed position in which the face 302 (Fig. 42) of the plunger is forced against a shoulder 304 of the valve. It will be noted at this point that a line 305 extends between the line 248 and the transfer line 300 and that at the junction of the line 305 and the line 300 is a valve 307 which when the machine is being used for attaching leather-heels to shoes is in a position in which the line 305 is closed to flow of oil and which when the machine is being used for attaching rubber heels and their base lifts to shoes is open to the portion of the line 300 leading to the pilot valve 114 and the pilot relief valve 328 but is closed to the portion of the line 300 leading to line 296. As high pressure oil is forced against the bottom face 302 of the plunger 282 the plunger is raised against the action of the spring-pressed rod 284 to its open position shown in Fig. 48 and determined by the engagement of a flange of the rod with a shoulder 306 (Fig. 42) of the valve thereby admitting oil open to the accumulator from the line 262 through ports in the valve 114 and the line 286 to an upper face 308 of the piston 288 which is movable in a bore 310 of a casing 312 (Figs. 4, 47 and 48) and causing said piston to slide against the action of a spring 314 which is housed in said casing to trip through hereinafter described mechanism, the one-revolution clutch 88, thereby operatively connecting the sliding beam 112 to the impeller 90.

Secured by nuts 316 (Fig. 3) to the sliding beam 112 are a pair of pistons 318 slidable in chambers 324 of oil cylinders 320 which are secured to the main frame 94 by bolts 319 and are connected by a booster pressure line 322 to the line 248. As the sliding beam 112 is raised to drive the nails 74 or 74$a$ then in the passages 76 of the nailing die 68 into the work, oil in the chambers 324 of the cylinders 320, which together with associated pistons 318 may be described as constituting the booster or booster unit 118, is forced under augmented or secondary pressure into the upper chamber 298 of the main cylinder 254 thereby forcing the shoe 50 on the jack 58 under secondary pressure against the heel 52 as the nails 74 are driven upward into the heel and the heel seat of the shoe and are clinched against the heel plate 78 of the last 60. In order to insure that high pressure oil from the chambers 324 shall not be available at this time for the line 246, said line has incorporated in it a ball check 326 (Fig. 42).

In order to regulate the maximum pressure that can be applied by the jack 58 against the work there is provided the pressure regulating valve 120 and an associated pilot relief or by-pass valve 328 comprising a plunger 330 which is made in two parts but may be considered as a single unit and is normally held by pressure, from a line 332 in its raised position in the valve as shown in Figs. 42 and 47, upward movement of the plunger 330 being limited by its engagement with a shoulder 334 of the valve. The upper end of the plunger 330 has a face 336 (Fig. 42) which is open to the transfer line 300 and when oil in the upper chamber 298 of the main cylinder 254 reaches a predetermined pressure the plunger 330 of the pilot relief valve 328 is depressed to its position shown in Fig. 48, thus rendering the booster pressure line 322 accessible through the pilot relief valve 328 to the accumulator line 246 so that oil under booster pressure is available for the accumulator 126. In order to insure that there shall not be a sudden lowering of pressure in the chamber 298 of the main cylinder 254 when the line 322 is opened to the accumulator line 246 a ball check 337 is inserted between the lines 322 and 248.

Maximum pressure in the upper chamber 298 of the main cylinder 254 may be regulated by varying the pressure in a chamber 338 which is open to the line 332 and acts against a face 340 of the plunger 330 of the pilot relief valve 328. Pressure in the line 332 and accordingly the chamber 338 may be varied by varying the pressure exerted by spring-pressed slides 342, 342$a$, 342$b$ slidable in bores 344, 344$a$, 344$b$ which are formed in a casing 346 and are connected to an exhaust or low pressure line 347, against ball checks or reliefs 348, 348$a$, 348$b$ which normally rest on seats at the upper ends of passages 350, 350$a$, 350$b$ any one of which may be selected to communicate with a chamber 352 formed by a selector slide 354 and a bore 355 of the casing 346, said chamber having access to the line 332 through a passage 356 or 356$a$ and a bore 358. It will be noted that the face 340 of the plunger 330 has considerably more area than the face 336 of the said plunger and accordingly the pressure of oil, which is in the line 332 and is supplied through a throttle valve 357 from the accumulator line 246, is relatively low. The throttle valve 357 is at all times open wide enough to insure that the pressure regulator system is full of oil, a small trickle of oil flowing continuously through the particular ball check 348, 348$a$ or 348$b$ and into the sump 138 through the low or exhaust pressure line 347.

Pressure of the ball checks 348, 348$a$, 348$b$ against their associated seats may be varied by rotating screws 360, 360$a$, 360$b$ which bear against the upper ends of springs 362, 362a, 362b interposed between the slides 342, 342a, 342b respectively and the screws 360, 360a, 360b; the passage 350, 350a, or 350b it is desired to have in communication with the line 332 being selected by operating the selector slide 354 (Figs. 2, 38, 39, 47 and 48) which is movable in the bore 355 of the casing 346 and is actuated by mechanism hereinafter described and comprising a cam 364 screwed to the carrier 64 (Figs. 8, 9, 25 and 26) upon which the heel 52 and the top lift 54 are supported and positioned.

Each of the screws 360, 360a, 360b and its associated spring-pressed slide 342, 342a or 342b, ball checks 348, 348a or 348b and passages 350, 350a or 350b may be described as constituting a pressure reguator unit of the pressure regulator 120. When the machine is operating upon shoes to which rubber heels are being attached the pressure regulator unit responsive to adjustment of the screw 360 is used, the selector slide 354 remaining fixed during the operation of the machine. In the attachment of built-up leather heels 52 and their top lifts 54 to shoes 50 two pressure regulator units are commonly used, the pressure during the attachment of the heel to the shoe and the spanking of the top lift onto the heel being regulated respectively by turning the screws 360, 360b and the selector slide 354 being operated by mechanism hereinafter described and controlled by the cam 364. In the attachment of high leather heels to shoes an upper "deck" of lifts (not shown) may be nailed to the heel seat of the shoe by one set of nails during one cycle of the machine and a lower or bottom "deck" of lifts may be nailed to the upper deck of lifts by another set of nails during the next cycle of the machine, the top lift being spanked onto the lower deck of nails in a following cycle during which the jack is operated. Accordingly, when high leather heels are being attached to shoes all three pressure regulator units of the pressure regulator 120 are used, the screws 360 and 360b serving to regulate the pressures applied against the work by the jack 58 during the attachment of the upper and lower "decks" of heel lifts respectively to the shoe and the screw 360b regulating the maximum pressure that can be applied by the jack against the work when the top lift is being spanked onto the lower "deck" of lifts.

When during the attachment of the heel to the shoe the desired maximum pressure in the chamber 298 of the main cylinder 254 has been reached, pressure applied against the face 336 of the plunger 330 of the clutch trip pilot valve 114 causes said plunger to be moved from its position shown in Fig. 47 to its position shown in Fig. 48, and displaced oil in the chamber 338 to be spilled through the ball reliefs 348, 348a or 348b in use, the line 246 being open to the line 322 so that oil under booster pressure will back up into the accumulator 126. As the nails are driven into the work pressure continues to be built up in the chamber 298, the plunger 330 maintaining its position in the valve 328 and when the plunger 116 is again moved to its lowered position, pressure in the line 332 raises the plunger 330 from its position shown in Fig. 48 to its position shown in Fig. 47.

After the nails have been driven into the work and the rod 293 (Figs. 3 and 4) starts to rise to its starting position, as will be hereinafter explained, the latch 291 is released whereupon the plunger 116, whether or not the treadle 82 is still depressed, moves under the action of the spring 244 to its idle position shown in Fig. 47, the line 296 leading to the upper chamber 298 of the cylinder 254 at this time being open to the exhaust port 256, and the line 250 leading to the lower chamber 252 of said cylinder being opened to the accumulator thus causing the piston 86 and accordingly the jack 58 to be raised to enable the shoe and its attached heel to be raised as the carrier 64 slides under the shoe to move the top lift into a position to be spanked onto the heel.

When the jack 58 is in its lowered position the line 267 extending from the limit stop valve 266 into the chamber 268 at the upper end of the main pilot valve 249 is connected to an exhaust line 369 as shown in Fig. 48, a plunger 370 movable in a bore 372 of the limit stop valve 266 being forced by a spring 374 against a press fitted plug or stop 375 (Fig. 35) closing the bottom of said bore. As the piston 86 moving from its lowered position reaches the upper portion of its stroke it engages, through mechanism hereinafter described, the plunger 370 forcing it against the action of the spring 374 to its position shown in Fig. 47 thus connecting the chamber 268 of the main cylinder pilot valve 249, which may also be referred to as a cut-off valve, with oil under accumulator pressure and lowering the plunger 272 of said valve against the action of the spring 274 to its position shown in Fig. 47 thereby shutting the chamber 298 of the main cylinder from communication with the exhaust port 256 and causing upward movement of the jack to cease.

When during the first part of the upward movement of the jack 58 the line 296 is in communication with the exhaust line 256 pressure in said line and accordingly the transfer line 300 is released and the plunger 282 of the clutch trip pilot valve 114 is moved to its lowered rest position shown in Figs. 42 and 47 by the spring-pressed rod 284. As the plunger 282 of the clutch trip pilot valve 114 moves back to its rest position the line 286 is in communication with an exhaust port 376 with the result that the piston 288, under the action of the spring 314, moves back to its starting position shown in Fig. 47.

In the attachment of rubber heels 56 and their base lifts 57 to shoes it is desirable to force the heel seat of the shoe mounted upon the jack 58 with relatively light pressure against the base lift mounted on the rubber heel in the carrier 66. In operating upon a run of rubber heel work the pressure of the oil in the accumulator 126 may be materially reduced and/or the machine may be modified as hereinafter described to insure that during the driving of nails into the work, downward pressure of the jack 58 against the work is modified. With the foregoing in view the line 286 connecting the clutch trip pilot valve 114 to the clutch operating piston 288 extends into a chamber 378 of the main cylinder pilot valve 249, a valve 379 being built into said line selectively to cut oil in the line 286 from the chamber 378 when the machine is attaching leather heels to shoes or to open up said chamber to the line 286 when rubber heels and their base lifts are being attached to shoes. As above explained, in the attachment of rubber heels and their base lifts to shoes the valve 307 is turned to a position in which the line 305 and the portion of the line 300 leading to the pilot valve 114 and to the pilot relief valve 328 are in communication, said portion of the line 305 at that time being cut off from the portion of the line 300 leading to the line 296.

When high pressure oil enters the line 286 preparatory to operating the piston 288 and thus actuating the clutch 88, it operates against the lower face 380 and other exposed surfaces of the plunger 272, causing said plunger to be moved against the action of the spring 274 into engagement with the upper face 382 of the chamber 268 of the main cylinder pilot valve 249 thereby shutting off the line 248 from the line 296 and causing the line 296 to be opened to the exhaust line 122. It will thus be apparent that when pressure of oil in the chamber 298 of the main cylinder 254 has been built up sufficiently to cause the clutch 88 to be tripped, said chamber is opened to exhaust plus residual pressure. By opening the line 248 to the portion of the line 300 leading to the clutch trip pilot valve 114 and the pilot relief valve 328 high pressure oil from the booster 118 is available for the face 336 of the plunger 330 and accordingly such high pressure oil can be by-passed through the relief valve into the accumulator line 246. In attaching rubber heels and their base lifts to shoes or in attaching rubber heels to base lifts which have already been attached to the shoe some manufacturers prefer that oil under considerable pressure should be present in the chamber 298 during the nail driving operation. Accordingly the exhaust line 122 has in it the relief valve 124 which regulates the pressure in the chamber 298 and may be readily adjusted to retain the desired oil pressure in the chamber 298 when the nails 74*a* are being driven into the work. As in the case of attachment of leather heels 52 to shoes 50, after the rubber heel 50 and its base lift have been attached to the shoe the plunger 116 of the treadle valve 117 and the various other valves move back to their positions shown in Fig. 47. It will be noted at this point that an orifice leading from line 286 to balance leaks has been omitted together with other such details not affecting the theory of operation.

Figures 5, 6, 7:
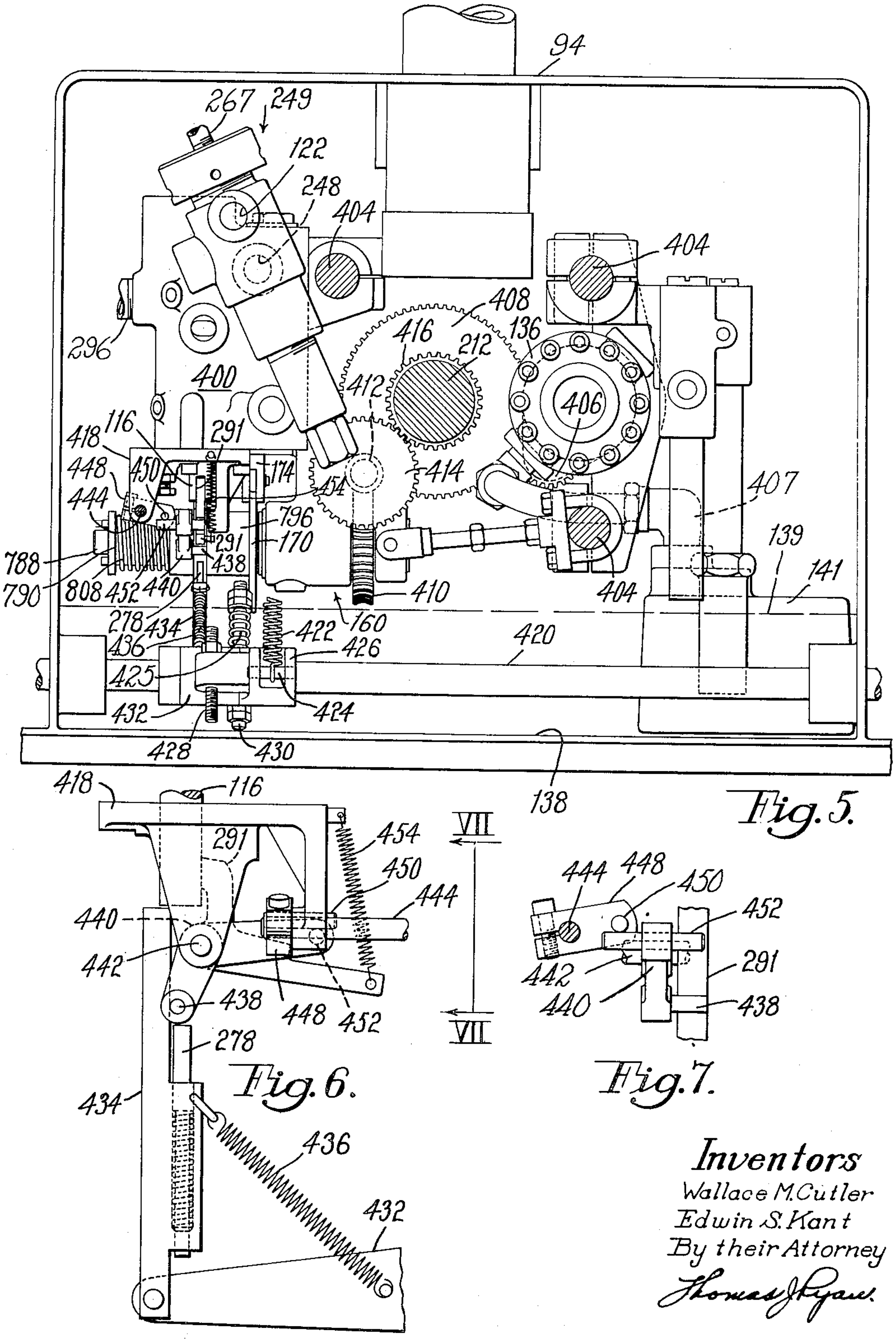
Fig. 5 is a section on line V—V of Fig. 4.
Fig. 6 is an enlarged side view showing in detail portions of treadle mechanism and mechanism which are shown in Fig. 4 and serve to lock in its operative position a plunger of a treadle valve.
Fig. 7 is a view on line VII—VII of Fig. 6 showing portions of the locking mechanism.

A housing 400 (Figs. 4, 5 and 42) for the treadle valve 117, the clutch trip pilot valve 114 and the pilot valve 328 and a housing 402 for the loader block control valves 176, 178 are included in the base housing of the main frame 94 and are secured by suitable clamps and brackets to longitudinal tie rods 404 rigidly fixed to the said frame. The main cylinder pilot valve 249 is supported by its line 248 to the housing 400. In view of the fact that the oil lines are disclosed in Figs. 47 and 48 most of the said lines have been omitted in other views of the machine. The sump 138 which consists of the oil tight base housing of the main frame 94 and in which oil is maintained at a level 139 has arranged in its lower right-hand corner the hood 141 which includes the above-mentioned filter (not shown) and above which is arranged the gear pump 136, said pump receiving oil from the sump through a line 407 (Figs. 5, 47 and 48). A gear 406 which is driven by a gear 408 secured to the drive shaft 212 drives a gear (not shown) secured to a drive shaft (not shown) of the pump 136. The fluid pressure operated clutch 160 is mounted in a bore 394 of a bracket 396 (Fig. 31) secured to the housing 402 and has a worm gear 410 meshing with a worm 412 to which is secured a gear 414 driven by a gear 416 secured to the drive shaft 212. Secured to the bottom of the housing 400 is a bracket 418 (Figs. 4, 5 and 6) upon which are mounted the latch 291 and its associated mechanism for locking the plunger 116 of the treadle valve 117 in its raised position. The treadle 82 is keyed to a shaft 420 which is journaled in the main frame 94, said treadle being biased counterclockwise, as viewed in Fig. 4, by a tension spring 422 the lower end of which is attached to a pin 424 mounted in a rocking beam 426 secured to the shaft 420. Clockwise movement or depression of the treadle 82 as viewed in Fig. 4 is limited by the engagement of a screw 428 secured to the beam 426 with the floor of the base housing of the main frame 94.

Mounted upon the shaft 420 (Figs. 4 and 5) beside the beam 426 is a longitudinally extending arm 432 upon the rear end of which is pivoted a lift arm 434 which carries the spring-pressed plunger 278 and is biased clockwise, as viewed in Figs. 4 and 6, by a spring 436. The rocking beam 426 has a flange 421 which is normally forced against a lateral lug 423 of the arm 432 by a spring 425 which surrounds a screw 430 secured to said lug and passing through a recess 427 in the flange, said spring being interposed between said flange and a nut threaded onto the screw and being adapted to raise the screw and accordingly the arm 432 yielding, for a purpose which will be hereinafter explained, when pressure is applied to the treadle and the plunger 116 is held in its lowered position under pressure applied against its upper surface. Clockwise movement of the lift arm 434 with relation to the arm 432 is limited by the engagement of said arm with a pin 438 against which the spring-pressed plunger 278 acts and which is secured to a bell crank lever 440 pivotally mounted on a bearing pin 442 which is secured to the bracket 418 and upon which the latch 291 is mounted. When the machine is at rest the latch 291, which is mounted upon and is urged counterclockwise as viewed in Fig. 6 about the pin 442, engages a side of the plunger 116, the bottom of said plunger being substantially in engagement with an upper face of the lift arm 434. As above stated, it is desirable that when the plunger 116 has been raised to its position shown in Fig. 48 it shall be held in said position out of the operator's control until the machine has completed its nail driving cycle and, furthermore, that after the machine has completed said cycle the plunger shall move back to its rest position shown in Figs. 6 and 47 whether or not the operator has released the treadle 82 or kept said treadle depressed.

Secured to a longitudinal rod 444 journaled in the bracket 418 and in a bracket 446 (Figs. 3 and 4) secured to the main frame 94 is an arm 448 (Figs. 4, 5, 6 and 7) carrying a pin 450 overlying a pin 452 which is secured to the bell crank lever 440 and overlies an arm of the latch 291 which is constantly urged counterclockwise, as viewed in Fig. 6, by a spring 454. Secured to the forward end of the rod 444 is an arm 456 and pivotally mounted upon the lower end of the rod 293, which is secured to one of the counterweights 295 and is guided by the bracket 446, is a latch 458 biased on the rod to its position shown in Fig. 3 by a spring 460. When the machine is in its rest position the latch 456 is in its position shown in Fig. 3 and the latch 291 is in its position shown in Fig. 6. When the operator depresses the treadle 82 the lift arm 434 raises the plunger 116 of the valve 117 and as the channel 260 of the plunger 116 of the treadle valve 117 moves into register with the line 262 the latch 291 acted upon by the spring 454 moves into a position beneath the plunger 116 of the treadle valve 117 and against the pin 452 of the bell crank lever 440 thus holding said plunger in its raised position.

Upon actuation of the one-revolution clutch 88 the sliding beam 112 is coupled to the impeller 90 and raises the drivers 98 to drive nails into the work, the counterweights 295 and accordingly the rod 293 being lowered causing the latch 458 to swing counterclockwise as viewed in Fig. 3 against the action of the spring 460 to allow said latch to be depressed past the arm 456, said latch then rotating back to its normal position on the rod into a position beneath a face 462 of said arm 456. When the nails have been driven into the work and the rod 293 is raised the latch 456 is swung clockwise, as viewed in Fig. 3, and through mechanism above described rotates the bell crank lever 440 clockwise, as viewed in Fig. 6, with the result that the latch 291 is swung from beneath the plunger 116 and the lift arm 434, whether or not the treadle 82 is raised, is swung counterclockwise against the action of the spring 436 to insure that the plunger 116 shall be moved by gravity and the spring 244 without interference to its rest position shown in Figs. 6 and 47. When the treadle 82 has been released the lift arm 434 swings clockwise as viewed in Fig. 6 back to its rest position beneath the plunger 116 and swings the bell crank lever 440 counterclockwise about the bearing pin 442 thereby moving the shaft 444 to its rest position and the pin 452 carried by the bell crank lever 440 away from the latch 291 so that the latch can again be moved to its latching position beneath the plunger 116 when said plunger is again raised by the lift arm 434.

The jack 58 is substantially similar to the jack disclosed in said application Serial No. 281,392 and comprises a pin 464, (Figs. 1, 2 and 22) commonly referred to as a last pin, shaped and arranged to be received in a thimble 466 of the last 60. It is common practice to attach heels to shoes which are off the last in which event special forms (not shown) which are attached to a multipart post 468 of the jack and are well known in the art are provided for receiving the shoe. The jack post 468 (Figs. 2, 22, 23 and 24) has keyed to its upper end portion a bearing shaft 470 which is journaled in blocks 472 mounted for vertical sliding movement in guideways 474 of the slide 140, the blocks resting at the lower ends of the guideways when the jack is idle.

In order to retain the jack 58 in the position to which it is swung by the operator about an axis 476 of the bearing shaft 470 there is slidingly mounted in a bore 478 at one end of the shaft a spring-pressed plunger 480 having an apexed upper end 482 (Fig. 24) which engages a bearing plate 484 secured by screws 486 to an associated block 472. A spring 473 which is housed in the bore 478 and urges the plunger 480 upward is of sufficient strength to insure that the jack shall remain at the angle to which it is swung on the blocks 472 and yet shall not offer substantial resistance to swinging movement by the operator. With the above construction it will be clear that the greater the displacement of the jack post 468 from a vertical plane 488 and accordingly the greater the moment due to the weight of said post tending to move the post back to its vertical position, the greater will be the displacement of the apexed upper end 482 of the plunger 480 from said plane 488 and the greater will be the resistance opposing swinging movement of the jack back to its vertical position.

As in the heel attaching machine disclosed in application Serial No. 281,392, the jack 58 has at its upper end a wedge 490 which as the jack exerts downward pressure against the work is raised as the blocks 472 are raised along their guideways 474, into a tapered arcuate opening 492 of an abutment 494 secured to the slide 140. With such a construction the jack post 468 is locked by reason of the interlocking action between the wedge 490 and the tapered opening 492 of the abutment 494 as the jack forces the shoe against the heel on the carrier 64. The illustrative machine comprises mechanism actuated by the use of a hand wheel 496 (Fig. 1) for moving the slide 140 into different forward and rearward positions upon the platform 144, and mechanism comprising a chain 498 for raising the back gage 62 along a guide 500 in response to forward swinging movement of the jack post 468, said guide 500 being initially adjustable into different operative positions widthwise and lengthwise of the machine by the use of hand wheels 502 and 504 respectively.

The heel and top lift carrier 64, which includes heel and top lift receiving stations or units 506, 508, respectively, and is best illustrated in Figs. 8, 9, 25 and 26, comprises a fabricated plate 510 and blocks 512 having alined bores 514 for receiving a guide rod 516. The guide rod 516 is secured to a boss of the fixed bracket 104 and extends through a bore in an L-shaped far 518 which is secured by screws 520 to said bracket. The guide rod 516 has secured to it a pin 522 which may be swung into a rod latching position between the bar 518 and a spring latch 524 secured to said bar. Also secured to the bar 518 is a stop 526 which limits sliding movement of the plate 510 upon the rod to the left, as viewed from the front of the machine, when said carrier is acted on by the loader block arm 192, as will be explained later.

Figures 8, 10:
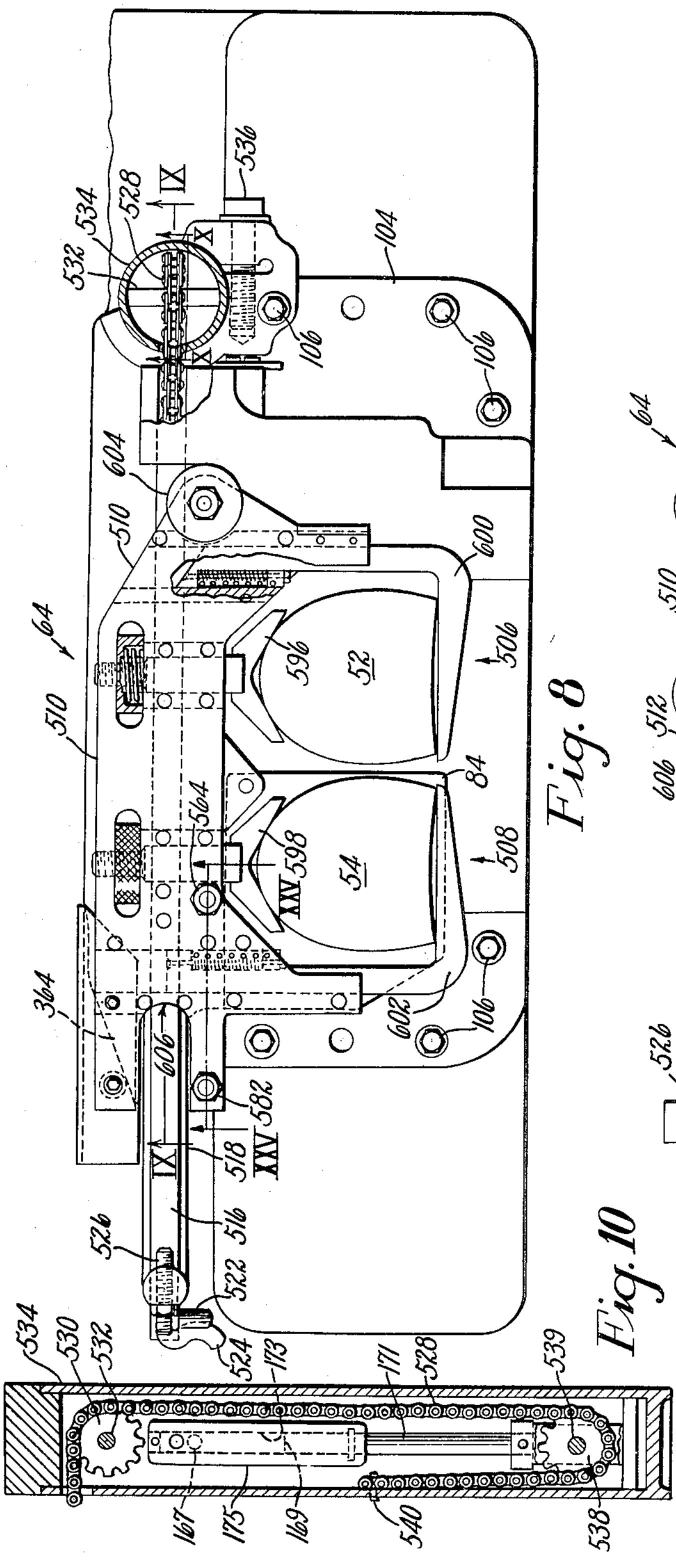
Fig. 8 is a plan view of a heel and top lift carrier.
Fig. 10 is a section on line X—X of Fig. 8 showing portions of fluid pressure actuated mechanism for biasing the carrier to positions in which heel and top lift holding units of the carrier are successively arranged over a nailing die and under a jack of the machine.
Figure 9:
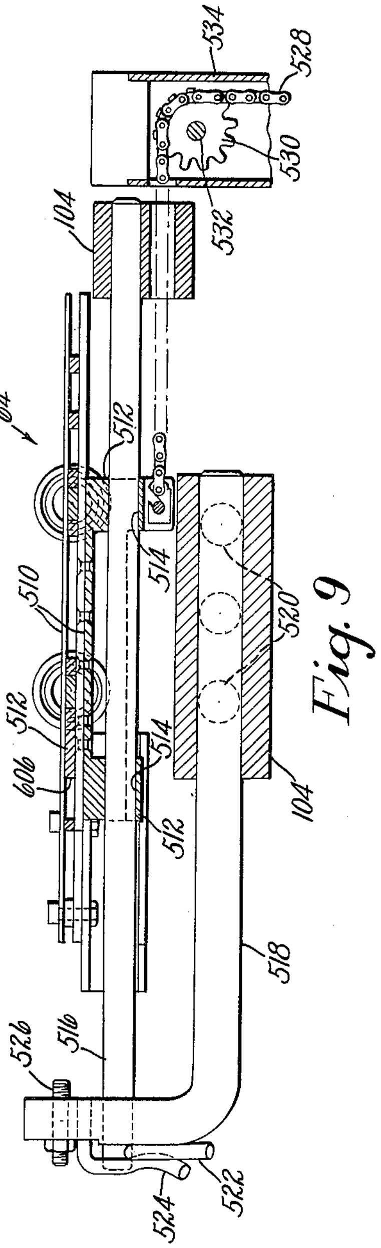
Fig. 9 is a section of the carrier as viewed on line IX—IX of Fig. 8.

The carrier 64 is constantly urged to the right, as viewed in Figs. 8 and 9 to predetermined positions in which, during two successive operations of the machine, the heel 52 and the top lift 54, respectively, are positioned above the nailing die 68, by a chain 528, (Figs. 3, 8, 9, 10 and 11) the upper end of which is attached to the right of the blocks 512 and passes over a sprocket 530 rotatably mounted on a bearing pin 532 fixed to a cylindrical casing 534 secured by one or more screws 536 to a split portion of the bracket 104. Secured to the casing 534 is the housing 175 (Figs. 10, 47 and 48) in a chamber 173 of which reciprocates the piston 171 carrying a pin 539 upon which is rotatably mounted a sprocket 538 (Fig. 10) over which passes the chain 528 the lower end of which is fixed to the casing 534 by a pin 540.

Secured in vertical recesses 542 (Figs. 25 and 26) in the nailing die supporting bracket 104 is a bushing 544 provided with a recess 546 in which is slidable a multi-part rod 548 constantly held in raised position by a coil spring 550, upward movement of the rod under the action of the spring being limited by the engagement of a nut 552 threaded onto the rod with the bottom of the bushing. Pivoted on a pin 554 secured to the rod 548 is a detent 556 included in a sleeve 558 fitting in a bore of the block and having a recess for receiving one end of a spring 560, the other end of which is positioned in a recess 562 of the detent which is biased counterclockwise as viewed in Figs. 25 and 26 by the spring.

Figure 25:
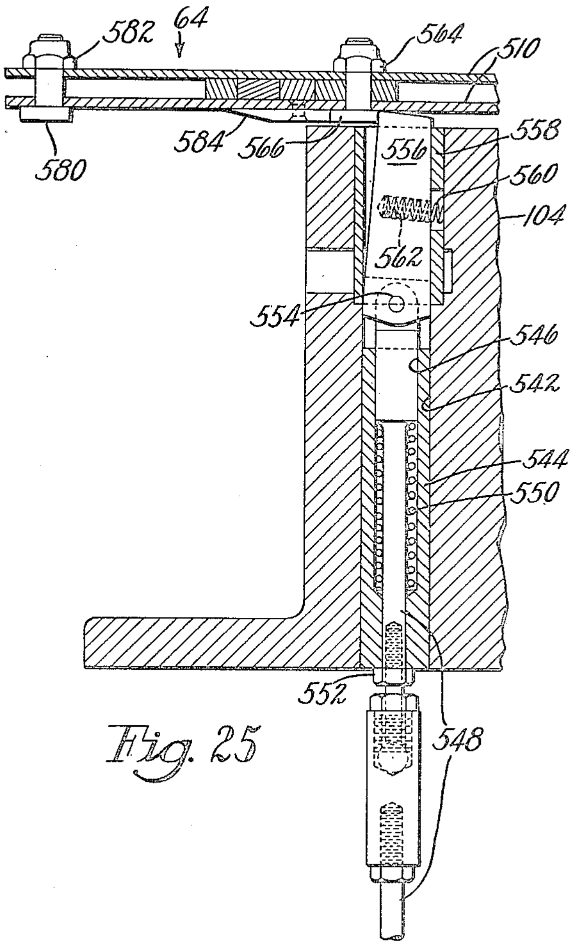
Figs. 25 and 26 are transverse vertical sections partly on the line XXV—XXV of Fig. 8 showing the heel and top lift carrier illustrated in Fig. 8 and also showing a nailing die receiving bracket which supports the carrier and a detent for positioning the heel and top lift receiving units of the carrier successively in predetermined positions over the nailing die which is carried by the bracket.

Adjustably secured by a nut 564 to the fabricated plate 510 of the carrier 64 is an eccentric stop 566 which when the carrier slides to the right, as viewed from the front of the machine, over the bracket 104 and the nailing die 68, engages the then raised detent 556, as shown in Fig. 25. When the carrier 64 is in a position in which the heel 52, positioned in and secured to the heel receiving unit 506 of the carrier, is located beneath a shoe mounted upon the jack 58 which has been swung back to position the shoe in engagement with the back gage 62, the stop 566 is in engagement with the detent 556.

Figure 27:
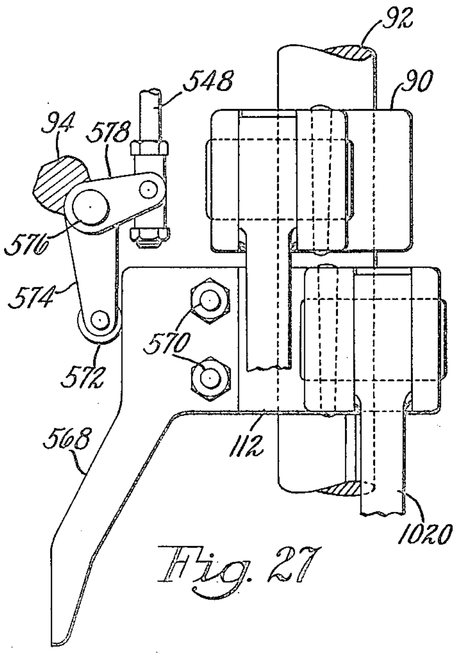
Fig. 27 is a side view of a cam, which is secured to a sliding beam connected to a driver head of the machine, for depressing the detent shown in Figs. 25 and 26 at the upper end of the driving stroke of said head.
Figure 26:
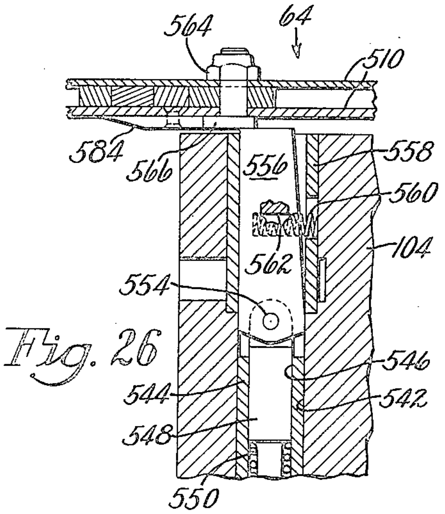
Figure 28:
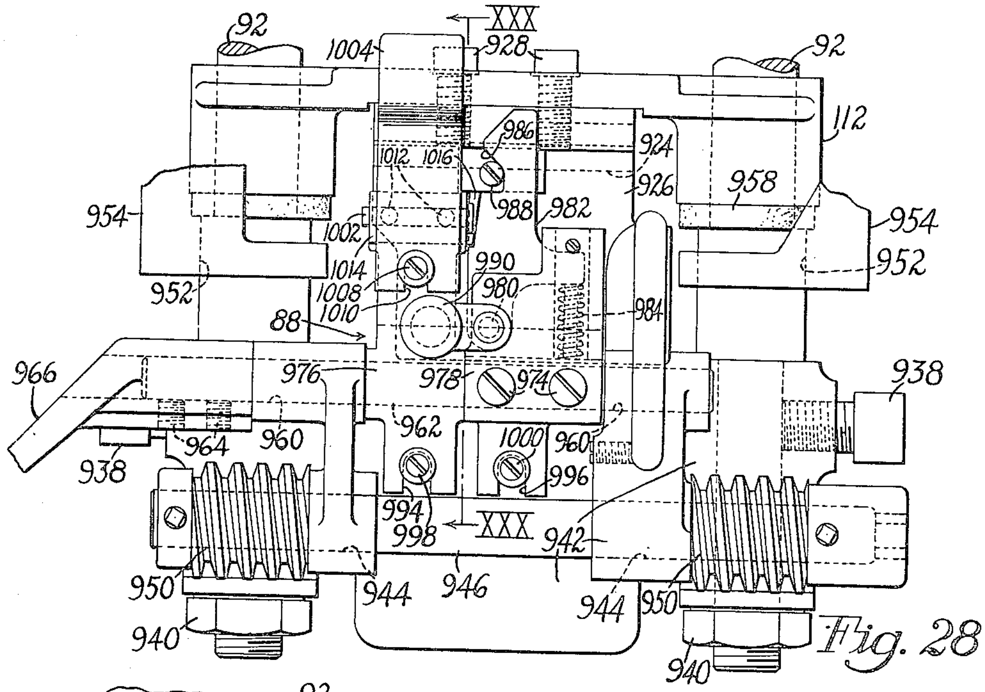
Figure 29:
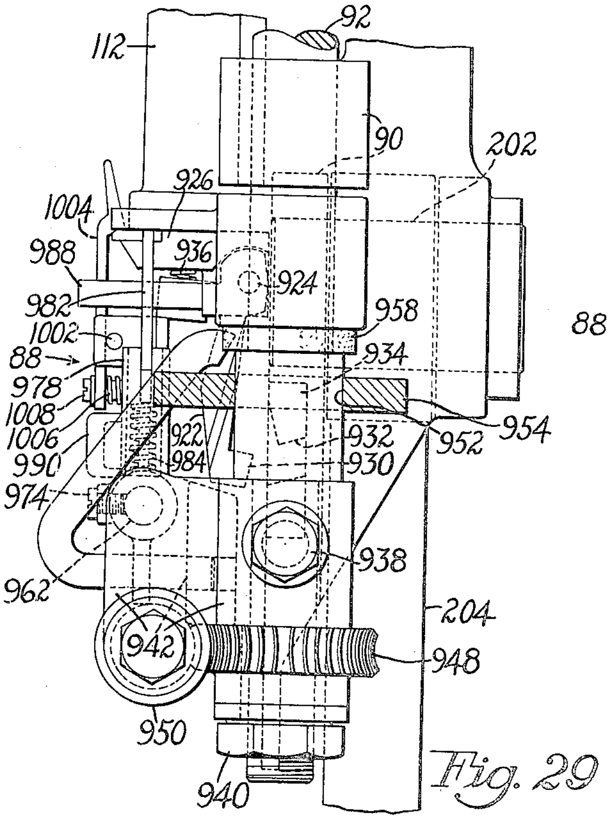
Figure 30:
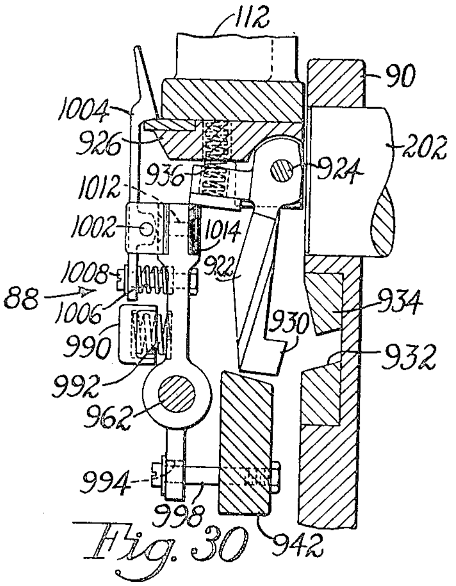
Fig. 30 is a section on line XXX—XXX of Fig. 28.

In the attachment of leather heels 52 to shoes 50 it is desirable to retract the detent 556 at the upper end of the nail driving stroke of the driver head 72 which is carried by the sliding beam 112, the carrier 64 after pressure of the work against it has been released moving to the right, as viewed from the front of the machine, under the action of the fluid pressure actuated chain 528. Accordingly as the sliding beam 112 nears the upper end of its stroke, a cam 568 (Figs. 3 and 27) secured by screws 570 to the sliding beam 112 engages a roll 572 carried by an arm 574 secured to a shaft 576, which is journaled in the main frame 94, thereby rotating the shaft clockwise as viewed in Fig. 27. Also secured to said shaft 576 and pivotally connected to the lower end of the rod 548 is an arm 578 which when said shaft is rotated clockwise depresses or lowers the detent 556 against the action of the spring 550. When the sliding beam 112 has been lowered a short distance from the upper end of its stroke and before the carrier 64 has been released by pressure of work against it, the rod 548 is released and under the action of the spring 550 moves upward, said detent in the meantime having swung on the pin 554 to its position shown in Fig. 26 beneath the stop 566. When pressure of the work against the carrier 64 is released the carrier acted upon by the chain 528 moves to the right, the detent 556 in the meanwhile being raised by the spring 550 to its position shown in Fig. 25, and as a following stop 580 which is secured to the carrier by a nut 582 engages the detent the carrier comes to rest with its top lift receiving unit 508 positioned above the nailing die 68. In order to enable the carrier 64 to be moved to the left, as viewed from the front of the machine, under the action of the loader block arm 192 there is riveted to the carrier plate 510, adjacent to the stop 566, a cam 584 for depressing the detent 556 as the carrier is moved by said arm. In order to enable the operator to depress the detent 556 manually the shaft 576 has secured to its outer end a hand lever 585 (Fig. 3).

The heel and top lift receiving units 506, 508 of the carrier 64 comprise V-shaped back gages 596, 598 which are constructed and arranged to be engaged respectively by the rear ends of the heel 52 and top lift 54, and breast gages 600, 602 which are constructed and arranged to engage yieldingly the breasts of the heel and the top lift. Since the heel and top lift receiving units 506, 508 are identical with corresponding units disclosed in application, Serial No. 281,392, no further description of these units is included herein. Movement of the carrier 64 to the left, as viewed from the front of the machine, under the action of the loader block arm 192 against a fiber roll 604, which is mounted on the plate 510, is limited by the engagement of a face 606 of the carrier with the adjustable stop 526.

The cam 364 which is secured to the carrier 64 has forced against it a roll 608 (Fig. 38) carried by a bar 610 pivotally mounted upon a pair of parallel arms 612 fulcrumed upon the bracket 104. The bar 610 is constantly urged rearward against the cam 364 by a spring 614 and has pinned to it the selector slide 354 which renders units comprising the spring-pressed slides 342, 342*a* respectively of the pressure regulator 120 effective in succession to control the maximum pressures that can be applied respectively against the work when the heel is being attached to the shoe and the top lift is being spanked onto the heel.

In the present machine the loader block 184 is swung in a horizontal plane about an axis 616 (Figs. 19, 20 and 21) but is not moved lengthwise of said axis as in the machine disclosed in application Serial No. 281,392. Accordingly, in the illustrative machine the splined shaft 194 has secured to it by the draw bolt 196 (Figs. 16 and 19), which also secures the loader block arm 192 to the splined shaft, a rod 618 the lower end of which is rotatably mounted in a cylindrical bushing of a bearing housing 620 screwed to the main frame 94. As in the machine disclosed in said application Serial No. 281,392, the splined shaft 194 interlocks with an internally splined coupling 626, which has threaded onto it a nut 627, and is secured by set screws 628 to a sleeve 630 to the upper end of which is secured by set screws 632 a pinion 634. The rod 618 is held in a raised position in which the loader block arm 192 is forced against the nut 627, by a heavy spring 622 the upper and lower ends of which are in engagement respectively with a collar 624 secured to the rod and with the upper face of the housing 620. Surrounding the sleeve 630 are upper and lower bushings 636 secured to a housing 638 which extends axially between the upper end of the coupling 626 and the lower face of the pinion 634 and is secured to the main frame 94. With the above construction it will be apparent that the pinion 634 and the loader block arm 192 swing together degree for degree about the axis 616, the operating height at which the loader block swings being varied by changing the adjustment of the nut 627 upon the coupling.

Secured by screws 640 (Figs. 12 and 19) to the main frame 94 is a cylinder 642 having a bore 644 in which reciprocates the piston 180 which comprises a rod 648 threaded into a rack 650 reciprocable along a guideway 652 of the main frame and meshing with the pinion 634. The cylinder 642 has formed in it a pair of ports which are in communication with lines 654, 656 alternately connected to accumulator oil, the pressure of which may be varied if desirable by a reducing valve 658 in the accumulator line 246, in order to swing the loader block 192 clockwise, as viewed from above, from its rest position shown in Fig. 12 to its nail delivering or dumping position above the nailing die 68, and then counterclockwise to a nail receiving position beneath the nail delivering unit 198 and thereafter back to its rest position. The connecting of the accumulator line 246 and an exhaust pressure line 660 alternately to the lines 654 and 656 is controlled by the valve 176 the plunger 172 of which is movable in response to movement of the cam 168.

The loader block arm 192 comprises a ring portion 662 in which the loader block 184 fits with a shoulder thereof overlying said ring as best shown in Fig. 15, said block being retained in the arm by a shutter 664 engaging in a slot 666 (Figs. 13 and 15) of the loader block. Extending through the loader block 184 are the passages 186 and fitting in a recess 668 (Figs. 15 and 16) in the upper surface of the block is the selector plate 190 the passages 188 of which are of a particular nail pattern and are in alinement with associated passages 186 which are of multiple pattern. The pattern of the passages 188 of the selector plate 190 is identical with the pattern of passages 670 (Fig. 17) in a nail tube holder 671, hereinafter described, of the nail delivering unit 198 and is also identical with one of the patterns of passages 76 of the nailing die 68. The selector plate 190 determines which passages 186 of the multiple pattern loader block 184 are to be used and constitutes part of the loader block.

Figure 18:
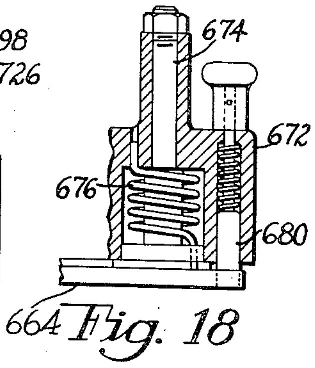
Fig. 18 is a section on line XVIII—XVIII of Fig. 16 showing mechanism for operatively connecting a nail shutter to the loader block arm.

Mounted upon the loader block arm 192 is a boss 672 in which is swiveled a fulcrum pin 674 (Fig. 18) to the lower end of which is secured the nail shutter 664. A torsion spring 676, opposite ends of which are attached to the boss 672 and to the shutter 664, constantly urges the shutter counterclockwise to a released open position shown in Fig. 16. Counterclockwise movement of the shutter with relation to the loader block arm 192, as viewed above, is limited by the engagement of a shoulder 678 (Fig. 16) of the shutter with a spring pressed stop 680 (Fig. 18) which is slidable in a recess in the boss.

When the loader block arm 192 is in its rest position shown in Fig. 12 the shutter 664 is in an active position beneath the loader block 184, a hook 682 (Figs. 11, 12 and 16) of the shutter being in engagement with a face 684 of a latch 686 fulcrumed on the ring portion 662 of the loader block arm 192 and constantly urged clockwise, as viewed from above, by a spring 688. As the loader block arm 192 is swung from its rest position to its nail delivering position over the nailing die 68, the latch 686 engages a front face of the nailing die, causing said latch to swing counterclockwise, as viewed from above, on the arm, thereby releasing the shutter 664 which then swings counterclockwise to its open position, shown in Fig. 16, under the action of the torsion spring 676.

As above described, the heel and top lift carrier 64 is slid over the nailing die 68 away from the upper ends of the driver passages 76 under the action of the loader block arm 192, the nail delivering position of the loader block 184 over the nailing die 68 being determined by the engagement of a lug 690 (Fig. 16) secured to said arm with a stud 692 adjustably secured to the main frame 94.

The supply of oil to the upper face 169 of the piston 171 and, accordingly, the pull on the chain 528 connected to the heel and top lift carrier 64 or the carrier 66, are controlled by the valve 176 which also controls the swinging movement of the loader block arm 192, the construction and arrangement being such that during a major portion of the rotation of the cam 168 and while said cam is stationary, oil under pressure is admitted through the line 167 to the plunger 171 thus biasing the carrier 64 to the right, as viewed from the front of the machine. However, during the time that the loader block arm 192 is in the vicinity of the nailing die 68 the plunger 172 of the valve 176 is in such a position that the line 167 has access to an exhaust port 694 (Fig. 31) which is formed in the upper end of the plunger 172 and, accordingly, the carrier offers little resistance, except that necessary to displace oil from the housing 175, to the loader block arm 192. If desirable the valve 176 may be so constructed that oil pressure at all times operates against the plunger 171.

During the cycle of the loader block arm 192 and positively during the first half of said cycle when the loader block 184 is in the vicinity of the nailing die 68, it is desirable to guard against movement of the piston 86 to which the jack 58 is operatively connected, thereby insuring against the jack colliding with the loader block. Accordingly, when the plunger 146 of the clutch valve 148 is moved forward, or to the right as viewed in Figs. 41, 47 and 48, to cause oil under accumulator pressure to be available for the line 150 and thus to operate the one-revolution clutch 160, said oil is also available for a line 696 connected to the line 150 by a ball check 667. An upper end of the line 696 extends into a chamber 673 in the upper end of the treadle valve 117 and a branch portion of the line 696 has fitted into it a nipple 677 (Fig. 32) which fits in a hole 675 formed in a bushing 756 (Figs. 31 and 32) hereinafter referred to and has a passage 679 through which, as will be hereinafter explained, an auxiliary supply of oil is fed through other passages hereinafter described into a chamber 786 of the clutch 160 which chamber becomes sealed after the shaft 166 has been rotated a few degrees from its rest position shown in Figs. 31 and 32. Oil under pressure entering the chamber 673 in the upper end of the treadle valve 117 acts against the top of the plunger 166 and holds said plunger 116 in its rest position, shown in Fig. 47, against upward movement by the lift arm 434 which as heretofore explained is connected yieldingly through the action of the spring 425 to the treadle 82.

As will be explained later, oil remains under pressure in the line 150 until after the shaft 166 has rotated about 90° in order to insure the proper engagement of the clutch, said line then being opened to an exhaust port 698. It is highly desirable that pressure shall be maintained in the line 696 until the clutch 160 has completed its cycle and the chamber 786 (Fig. 31) is again connected to the line 150 then open to exhaust, in order that the piston 116 of the treadle valve 117 cannot be operated until the completion of the cycle of the clutch 160 and also, as will be explained later, in order to insure that sufficient pressure is maintained in the chamber 786 to cause the clutch to be effectively engaged so that it can complete its cycle. By connecting the line 150 to the line 696 by the ball check 667, once oil pressure in the line 696 is established it is held under said pressure until the end of the cycle when it is released, as will appear later.

After the loader block 184 has delivered nails to the nailing die 68 it is swung automatically counterclockwise, as viewed from above, by the above fluid pressure actuated means, the shutter 664, after engaging a U-shaped stop 700 (Figs. 1, 12 and 16) being held against further rotation as the loader block arm 192 swings into a position in which the face 684 of the latch 686 registers with and slides behind the hook 682 of the shutter.

Counterclockwise swinging movement of the loader block 184 to its nail receiving position under the nail delivering unit 198, after delivering a load of nails to the nailing die 68, is effected by admitting oil under pressure to the line 656 and connecting the line 654 to the exhaust line 660. The valve 176 and the cam 168 which actuates the plunger 172 of the valve, are so constructed and arranged that oil which is in the lines 654 and 656 and the pressure of which may be regulated by the throttle valve 658, moves the piston 180 and accordingly the loader block arm 192 smoothly at a desired speed, the loader block arm arriving at its rest position and at its dwell positions adjacent to the nailing die 68 and the nail delivering unit 198 respectively, at slow speeds. In order to insure against the bending of nails which are sometimes caught between the nail tube holder 671 and the loader block 184 or between the loader block and the nailing die 68, and also in order more effectively to control the loader block, the action of the piston 180 may be dampened by providing the cylinder 642 with passages such as are described in detail in application Serial No. 281,392.

In the heel attaching machine disclosed in application Serial No. 281,392 the distributor, which is identical with the distributor 200, is actuated by the loader block arm 192 as said arm moves from its rest position toward the nailing die 68. In the present machine, however, the distributor 200 is actuated after the loader block 184 has delivered its load of nails to the nailing die 68 and as the loader block arm 192 moves toward the nail delivering unit 198. Secured to a bar 845 (Fig. 1) which is attached to the rack 650 is a trip rod 681 which when the loader block arm 192 is at rest is arranged just in front of a collar 683 secured to the forward end of a rod 685 guided in a bore of a lug 687 secured to the distributor 200, the rear end of said rod being pivotally connected to the upper end of a lever 689, instead of to the lower end of said lever as in the machine described in said Patent No. 2,604,624. As described in detail in said Patent No. 2,604,624 and in United States Letters Patent No. 2,575,336 granted November 20, 1951 on an application filed in the name of Edwin C. Eldred Jr., the rod 685 is biased forward. When the rod 685 is forced rearward, by the engagement of the trip rod 681 with the collar 683 as the loader block arm 192 is swung rearward the lever 689 is rotated clockwise and causes a one-revolution clutch (not shown) to be actuated to drop a load of nails into passages 670 of the nail delivering unit 198.

It will be noted that the nail delivering unit 198 disclosed in application Serial No. 281,392 comprised a shutter (not shown) actuated by the loader block arm 192 and arranged beneath the passages 670, the nails dropping from the nail distributor 200 into the passages and onto the shutter while the loader block 184 was delivering a prior load of nails to the nailing die 68. As the loader block 184 of the prior machine arrived at the nail delivering unit 198 the shutter (not shown) was swung from beneath the passages 670 by the loader block arm 192 to allow the nails to drop into the loader block. As above explained, in the present machine the nail distributor 200 is operated just before the loader block 184 arrives at a dwell position determined by a stop 742 (Fig. 14) beneath the passages 670, the timing being such that the loader block is in a dwell position beneath the passages 670 when the nails are dropped from the distributor. Accordingly, in the present machine there is no need for the shutter which has been omitted.

As above explained, at the time the loader block 184 swings to a dwell position beneath the nail delivering unit 198 nails released by the distributor 200 are on their way heads down to the passages 670 of the nail delivering unit 198, said nails falling into the passages 186 of the loader block just after said block arrives at said dwell position. The nail delivering unit 198 comprises a multipart bracket 704 (Figs. 1, 12 and 14) which is initially secured in a predetermined position to the main frame 94 by one or more screws 706, and a foot plate 708 (Figs. 1 and 17) which has formed in it a plurality of tapered openings 710 for receiving tapered lower ends of nail tubes 712 which house the lower ends of coil tubes 714 leading to the distributor 200. The foot plate 708 has formed in it a T-shaped guideway 716 for receiving the upper end portion of the nail tube holder 671. Mounted on the foot plate 708 is a thin plate 718 which has a plurality of bores which register with the tapered passages 710 in the foot plate 708 and serve to anchor the tubes 712 in the passages. The nail tube holder 671 has a plurality of upper passages 720 which register with corresponding passages 710 of the foot plate 708 and receive the upper ends of nail tubes 722 having their lower ends engaging in enlarged portions of the passages 670 which are of the same pattern as the passages 188 of the selector plate 190. Associated with the foot plate 708 is a pin 724 for readily securing holders 671 of different nail patterns to the foot plate 708, said pin being readily raised, preparatory to changing holders 671, by sliding a spring-pressed plunger 726 to the left as viewed in Fig. 17.

The fluid pressure actuated clutch 160, which is supported in the bore 394 of the bracket 396 secured to the housing 402, comprises the bushing 756 (Figs. 31 and 32) which is fixed to the bracket. Rotatably mounted in the bushing 756 and in a bore 758 of the bracket 396 is the multipart drive shaft 166 which has formed in it a bore 760 for receiving the plunger 154 and has an externally splined portion 762 interengaging with an internally splined portion of the driven member 164 of the clutch, said member being slidable longitudinally of the bore 394 and having formed on it a plurality of teeth 764. Secured to said plunger 154 and to said driven member 164 and extending through elongated slots 766 formed in the shaft 166 is a coupling pin 768 for moving the driven member 164 of the clutch longitudinally of an axis 770 of rotation of the shaft 166 in response to longitudinal sliding movement of the plunger 154 in the bore 760.

Figure 31:
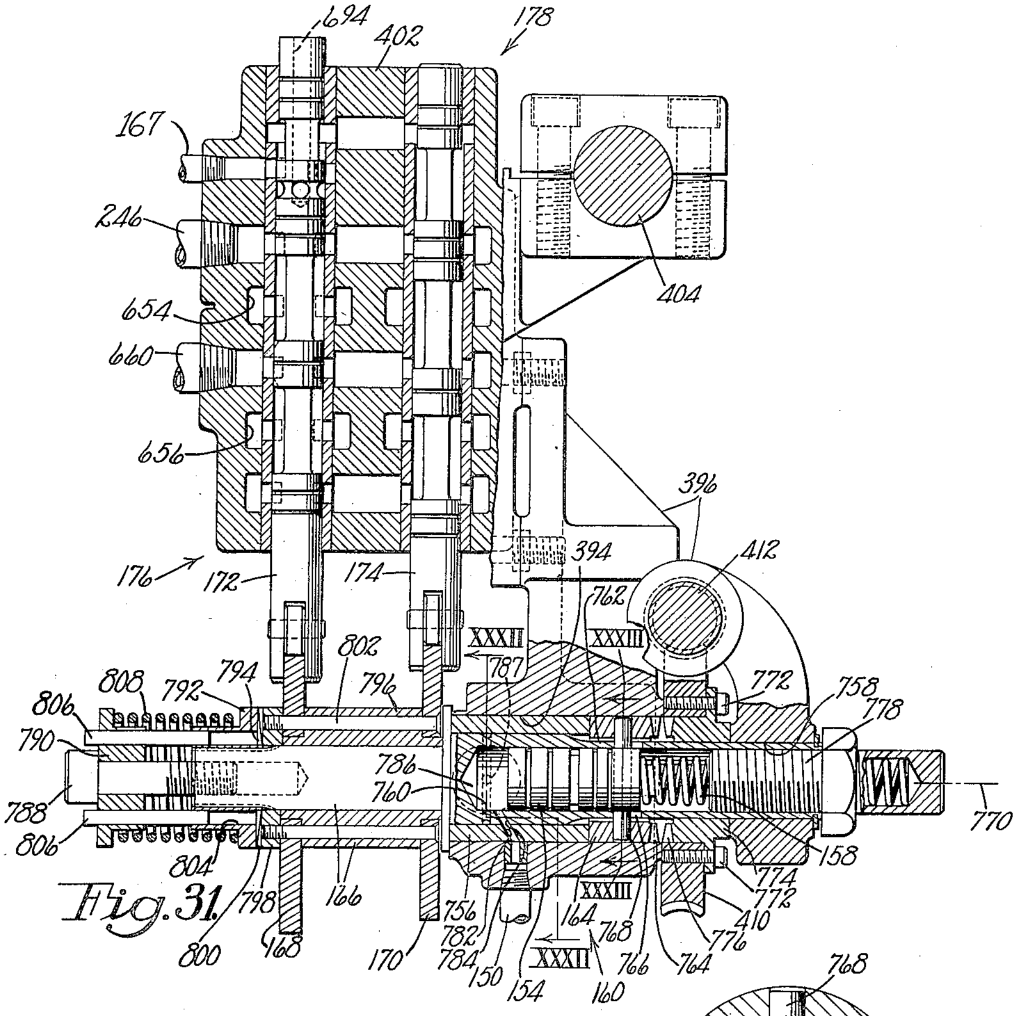
Fig. 31 is a vertical longitudinal section through a fluid pressure operated clutch, a cam shaft operated by the driven portion of said clutch and valves for controlling oil pressure to pistons operatively connected respectively to loader block and carrier chain actuating mechanisms.
Figure 32:
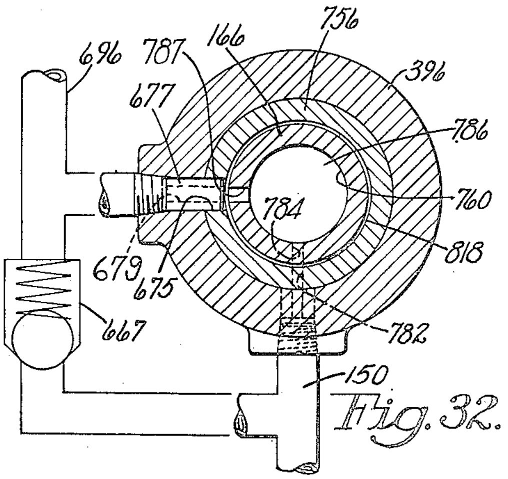
Figs. 32 and 33 are sections on lines XXXII—XXXII and XXXIII—XXXIII respectively of Fig. 31.
Figure 33:
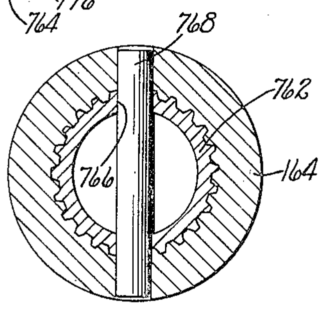

The worm gear 410, which is driven by the worm 412, has secured to it by screws 772 a collar or driving member 774 of the clutch having teeth 776 which are arranged opposite to the teeth 764 of the driven member 164 of the clutch and are constructed and arranged, when said member 164 is moved to the right as viewed in Fig. 31, to mesh with the teeth 776, thereby rotating the member 164 and accordingly the shaft 166. Threaded into the shaft 166 is a holder 778 for the compression spring 158 which constantly urges the piston 154 to the left as viewed in Fig. 31 to a limit determined by the engagement of the coupling pin 768 with the left ends of the slots 766.

Formed in the bushing 756 is a passage 782 which is at all times open to the line 150 and when the clutch is disengaged and at rest, as shown in Fig. 31, is in register with a passage 784 in the shaft 166 and extends into the bore 760 at the left end of the plunger 154 which forms with said bore the above-mentioned chamber 786. Secured to the left end of the shaft 166 is a bearing screw 788 upon which is mounted a block 790 and splined for rotation with, but movable longitudinally of, the shaft 166, is a gear 792 which has inclined face teeth 794. Mounted upon the driven shaft 166 is a sleeve 796 and a gear 798 which has inclined face teeth 800 in opposed relation to the teeth 794 of the gear 792, said gear 798 and cams 168 and 170 being secured to the sleeve by pins 802 passing through the sleeve and threaded into the gear 798. Secured to the block 790 and extending into bores 804 of the gear 792 are guide pins 806 and interposed between opposed shoulders of the block and the gear 798 is a compression spring 808.

Upon actuation of the valve 148, which is hereinafter described in detail, oil under pressure enters the chamber 786 through the line 150 and the passages 782, 784 in the sleeve 756 and the shaft 166 respectively causing the plunger 154 to move to the right, as viewed in Fig. 31, against the action of the spring 158 and thus causing the teeth 764 of the driven member 164 to mesh with the teeth 776 of the driving member 774, thereby rotating the shaft 166. The shaft 166 through the splined gear 792, which has its teeth 794 meshing with the teeth 800 of the gear 798, rotates said sleeve 796 and accordingly the cams 168 and 170. As above explained, in the present machine the loader block arm 192 has no vertical movement and accordingly the cam 170 is circular and maintains the plunger 174 of the valve 178 inactive. Should for any reason the sleeve 796 meet excess resistance the teeth 794 of the gear 792 will cam themselves out of driving relation with the teeth 800 of the gear 798 against the action of the spring 808.

As soon as the shaft 166 has rotated a few degrees from its idle position shown in Fig. 31, its passage 784 moves out of alinement with the passage 782, high pressure oil in the chamber 786 being relied upon to maintain the teeth 764 of the driving member 164 in engagement with the teeth 776 of the member 774. In order to insure that, between the time that the passage 784 of the shaft 166 has been rotated away from the passage 782 in the sleeve 756 and the shaft has completed one-revolution, sufficient pressure shall be maintained in the chamber 786 to force the teeth 764 with effective driving pressure against the teeth 776, provision is made to maintain the line 150 open to said chamber during approximately the first 90° of rotation of the shaft and for maintaining said pressure in the chamber during the remaining 270° of rotation of the shaft. With the foregoing in view, the bushing 756 is provided with the hole 675 in which the thimble 677 fits and which communicates with an annular channel 818 in communication with the chamber 786 through a passage 787 which is formed in the bushing and which is offset longitudinally and circumferentially from the passage 784. Accordingly, when the line 150 is open to high pressure oil, such oil is available through the ball check 667, the line 696, the passage 679, the channel 818 and the passage 787 for the chamber 786, said ball check 667 insuring against loss of oil in said chamber, after the line 150 has been opened to the exhaust line 698. The above construction is also useful in the event that the machine is stopped when the one-revolution clutch 160 has completed only a portion of its cycle and the machine has stood idle for a sufficient period for oil to leak out of the chamber 786 sufficiently to allow the teeth 764 to become disengaged from the teeth 776. By introducing a supply of oil to the chamber 786 through the above described auxiliary supply line the clutch is engaged whenever high pressure oil is made available for the line 150.

In order to render high pressure oil in the line 152 available for the line 150 and accordingly for the chamber 786 of the clutch 160, the plunger 146 of the valve 148, which is secured by screws 819 (Figs. 2, 40 and 41) to the slide 140, is moved a predetermined distance in a bore 820 of the valve from its rest position shown in Fig. 41 in engagement with a screw 821 threaded into the valve, by mechanism which will now be described.

Figure 1:
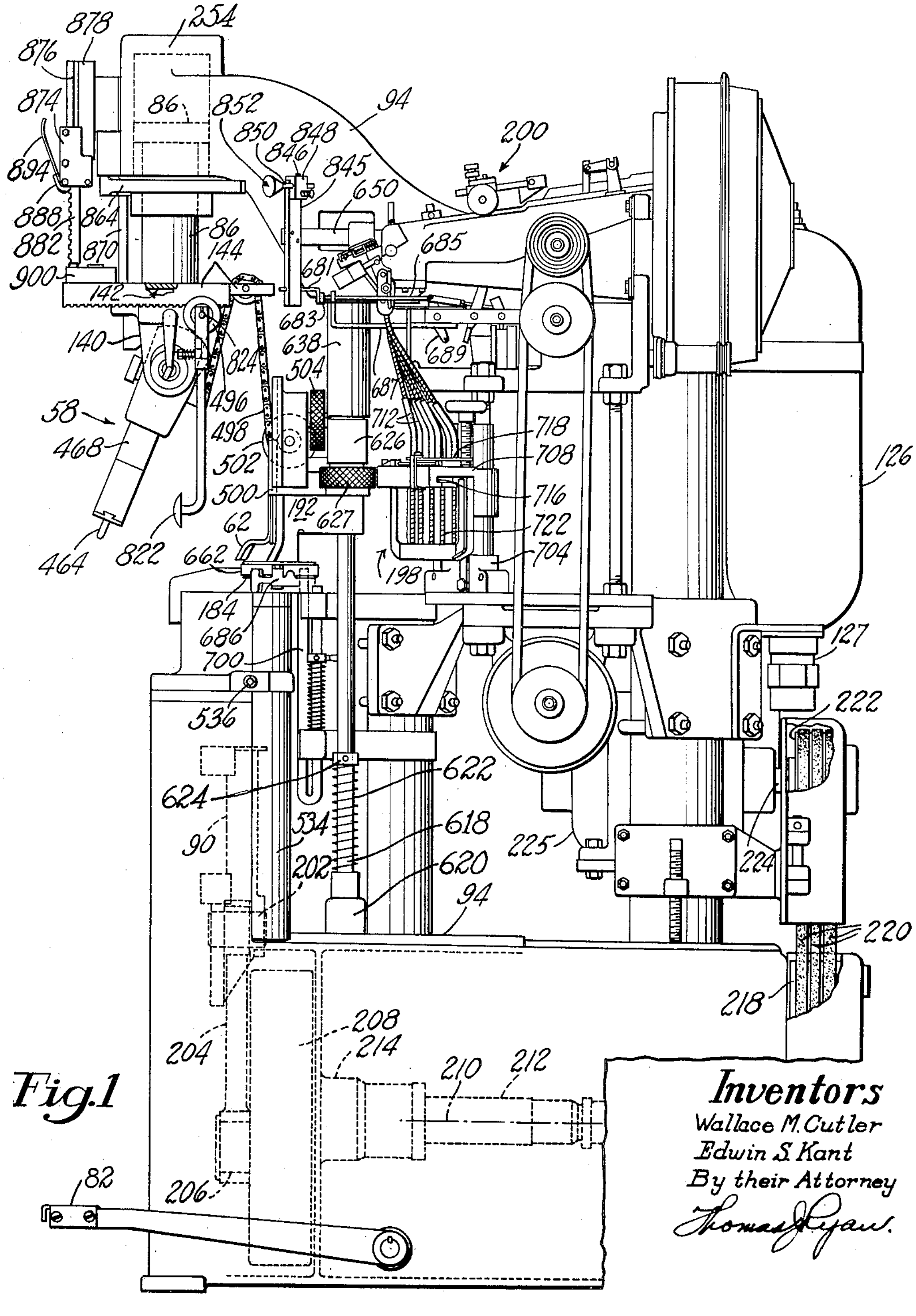
Fig. 1 is a right side elevation of a machine in which the present invention is embodied.

After removing the work from the machine the operator manually actuates the plunger 146 by swinging counterclockwise, as viewed in Fig. 1, a lever 822 (Fig. 1) which is secured to one end of a rod 824 rotatably mounted in the slide 140 and also in a hub of the hand wheel 496 which, as above explained, is also rotatable in said slide. Secured to the other or left end of the rod 824, as viewed from the front of the machine, is an upstanding arm 826 which is constantly urged counterclockwise, as viewed in Fig. 41, by a spring 827 and the upper end of which is pivotally connected to an arm 828 carrying a pin 830 having mounted on it a roll 836 riding on a cam surface 838 of the valve 148 and constantly forced against said face by a spring 840. Secured to the forward end of the arm 828 is a vertically arranged thrust rod 834 and pivotally mounted upon a pin 835 carried by the arm 828 is an abutment 837 the purpose of which will be explained later. When the plunger 146 is in its rest position shown in Fig. 41 a stop screw 842 threaded into the arm 826 is in engagement with the casing of the valve 148 and the thrust rod 834 is arranged just rearward of a collar 844 secured to the forward end of the plunger. When the lever 822 is swung counterclockwise, as viewed in Fig. 1, the arm 826 is swung clockwise, as viewed in Fig. 41, the thrust rod 834 forcing the collar 844 and accordingly the plunger 146 forward until the rod 834 rides on top of the collar, the plunger then coming to rest in a position in which the line 150 is open to the line 152.

Figures 19, 20, 21:
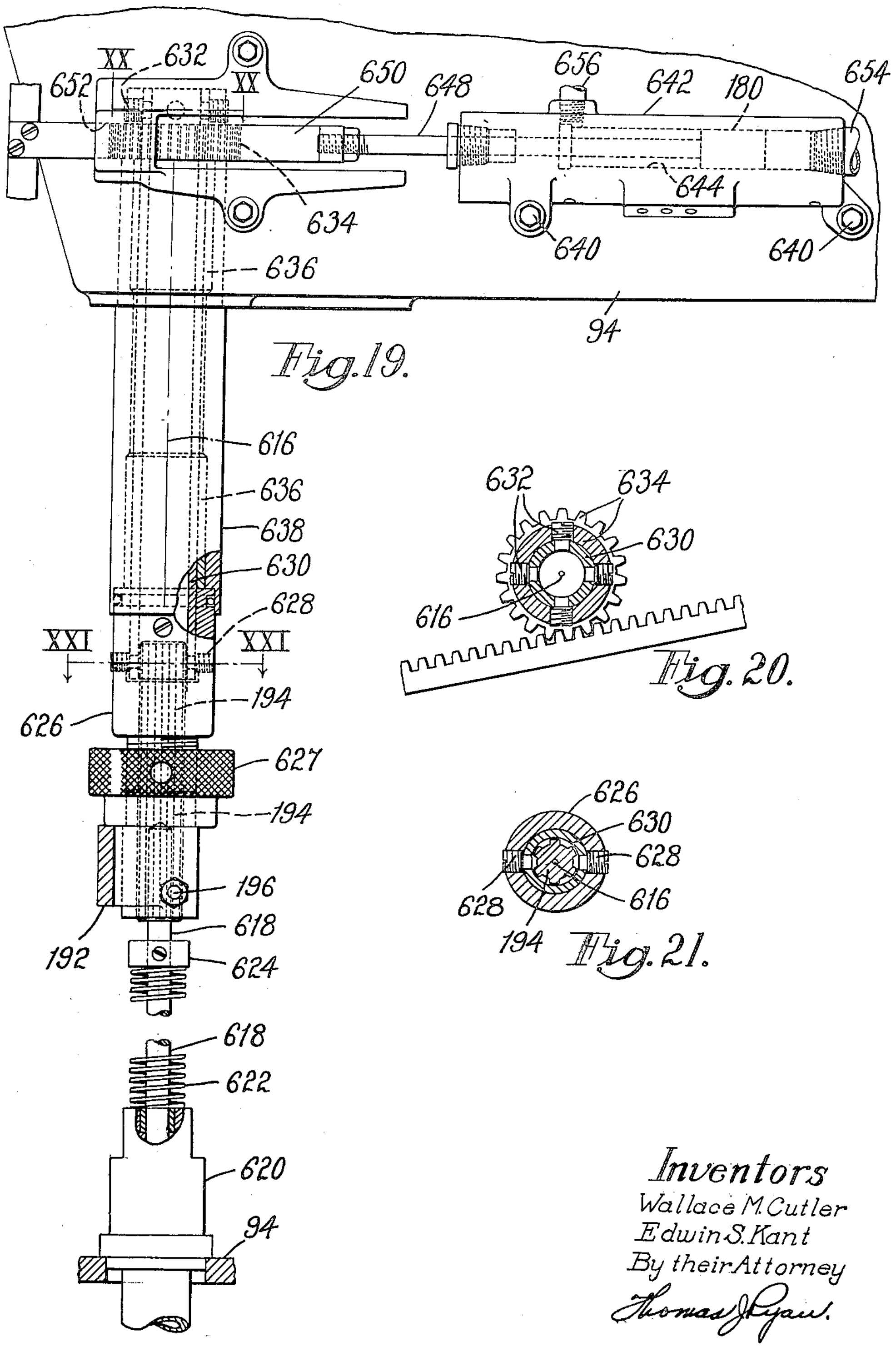
Fig. 19 is a view showing in an enlarged scale mechanism for operating the loader block arm.
Figs. 20 and 21 are sections on lines XX—XX and XXI—XXI respectively of Fig. 19.

As the clutch 160 is engaged the piston 180 together with the rack 650 slides to the left, as viewed in Figs. 12 and 19 causing the loader block arm 192 to move the loader block 184 to its nail delivering position over the nailing die 68, said arm coming to rest upon engagement of the stop lug 690 (Figs. 14 and 16) of said arm with the stud 692.

In order to insure that the passage 784 in the shaft 166 shall have moved away from the passage 782 in the bushing 756 before the plunger 146 is moved rearward from its forward or open position, above described, to its retracted position shown in Fig. 41 said plunger is held in its forward position until being forced rearward by mechanism, which will now be described, in response to forward movement of the rack 650.

Figure 40:
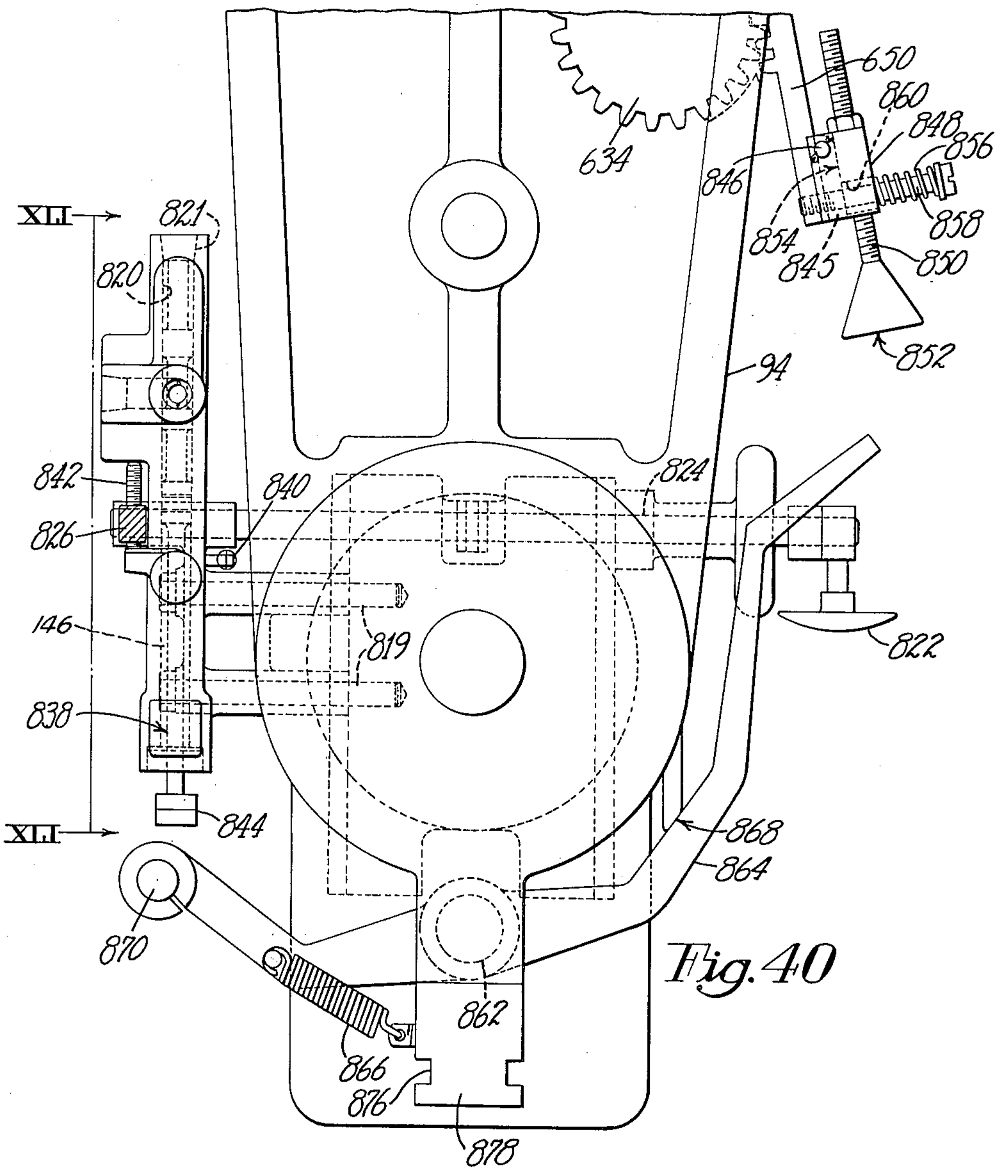
Fig. 40 is a plan view showing a valve and operating mechanism associated therewith for controlling the fluid pressure clutch shown in Figs. 31 to 33.

Carried by the upper end of the vertical bar 845 secured to the rack 650 is a pin 846 (Figs. 1 and 40) upon which is pivotally mounted a swing block 848 in which is adjustably secured a thrust rod 850 having a flat fror face 852 of substantial area, said block being normally held in its position shown in Fig. 40 with a face 854 thereof engaging the bar 845, by a spring 856 interposed between the block and a head of a screw 858 threaded into the vertical bar 845 and passing through a slot 860 in the block.

Mounted upon a shoulder screw 862 secured to the main frame 94 is a lever 864 which is constantly urged counterclockwise, as viewed in Fig. 40, by a spring 866, counterclockwise movement of the lever being limited by the engagement of said lever with a stop face 868 of the main frame 94. Secured to the lever 864 is a vertical rod 870 (Figs. 1, 2, 40 and 41) which is normally spaced from and directly in front of the collar 844 of the plunger 146 of the clutch valve 148 when said plunger has been moved to its forward or open position. As the rack 650 is moved forward the face 852 of the thrust rod 850 engages the lever 864 swinging the same and the rod 870 clockwise as viewed in Fig. 40 and moving the plunger 146 to its rest or starting position shown in Figs. 40 and 41.

Figure 41:
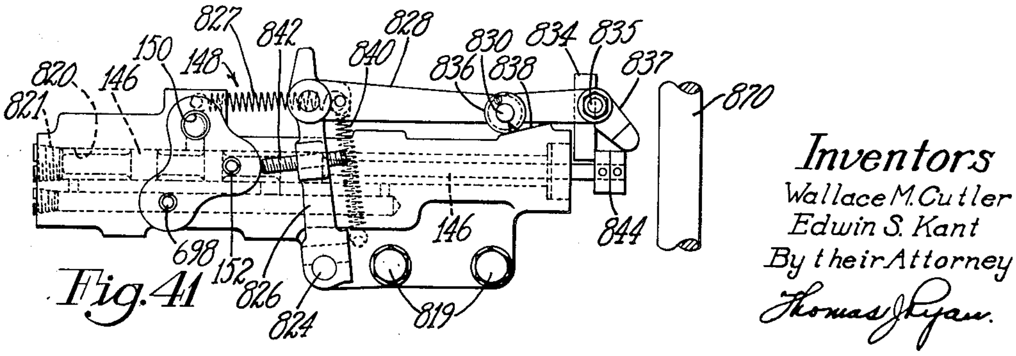
Fig. 41 shows in side elevation the valve shown in Fig. 40 as viewed on line XLI—XLI of Fig. 40.

In order to insure that the operator in the use of the lever 822 shall not retain the thrust rod 834 in a position in which it interferes with movement of the plunger 146 to its rest position against the screw 821, the arm 828 has pivoted to it the above-mentioned abutment 837 which is engaged by the vertical rod 870 before said rod engages the collar 844 of the plunger 146 and thus raises the thrust rod 834 about the pivotal connection of the arm 828 and the arm 826 to an elevation higher than that of the collar, the thrust rod moving into its rest or starting position, controlled by the engagement of the roll 836 with the cam surface 838 as shown in Fig. 41, behind the collar 844 as the vertical rod 870 swings counterclockwise as viewed in Fig. 40 away from said collar.

As above explained, upward movement of the piston 86 which carries the jack 58 ceases when the platform 144 which is formed integral with the piston has raised the plunger 370 of the limit stop valve 266 into a position in which the line 267 is open to the line 264 then in communication with accumulator oil thereby causing the plunger 272 of the main cylinder pilot valve 249, moved from its position shown in Fig. 48 to its position shown in Fig. 47, to cut off the upper chamber 298 of the main cylinder 254 from the exhaust line 256.

The position of the platform 144 at the bottom of the work clamping stroke of the jack varies in accordance with the height of said work, said height usually being expressed in terms of the height of the last upon which the shoe is mounted. The operator according to his experience usually desires to raise the jack of the machine a predetermined distance in operating upon a run of shoes of the same size and style, said distance usually varying and depending upon the height of the lasts used in the run of shoes upon which the machine is operating.

Accordingly, provision is made in the present machine to insure that from different heightwise work clamping positions of the jack, said jack will rise a predetermined distance, which may be selectively varied, and will automatically come to rest for any run of shoes of the same style. The distance required to raise the plunger 370, of the limit stop valve 266 from its lowest position in engagement with press fitted plug 375 of the valve as shown in Figs. 35 and 48 in which the line 267 is cut off from the line 264, to its raised position shown in Fig. 47 in which the line 267 is open to the line 264, is constant and approximately 5⁄16″ which is a distance of lift somewhat less than the minimum distance of lift required by the most experienced operators.

With the above considerations in view the plunger 370 of the limit stop valve 266 is connected by a pin 872 to a carriage 874 which is slidable in a pair of vertical grooves 876 formed in a housing 878 of the valve 266. Vertically slidable in a bore 880 of the housing 878 is a measuring rod 882 which has at its front face a plurality of teeth 884 between which are formed notches 886 into any one of which fits a latch 888 which is pivoted upon a pin 890 secured to the carriage 874 and is constantly urged counterclockwise, as viewed in Fig. 34, by a spring-pressed plunger 892 or biasing means mounted in the carriage. When the machine is in its rest position (Figs. 1 and 47) and a thin plate 894 forming part of the latch 888 is tapped by the operator, the plunger 370 is lowered in its associated bore 372 of the valve 266 by the spring 374 with the result that the piston 86 and accordingly the jack 58 are raised until hereinafter described mechanism associated with the platform 144 of the piston and operating through the rod 882 and the carriage 874 has raised the plunger sufficiently to allow oil in the line 264 to be admitted to the line 267.

The lower end of the measuring rod 882 has a cylindrical shank 896 passing through an arcuate slot 898 which is formed in a turret 900 and is concentric with an axis 902 of the turret. The turret 900 is rotatable into different positions about the axis 902 upon a shoulder screw 904 which is threaded into the platform, the construction and arrangement being such that the turret travels vertically with the platform 144 and can be rotated upon the shoulder screw 904 with relation to the platform into three different operating positions determined by the engagement of a spring-pressed plunger 906 carried by the turret in any one of three recesses 908, 908*a* or 908*b* formed in the upper surface of said platform.

Figures 34, 35, 36, 37:
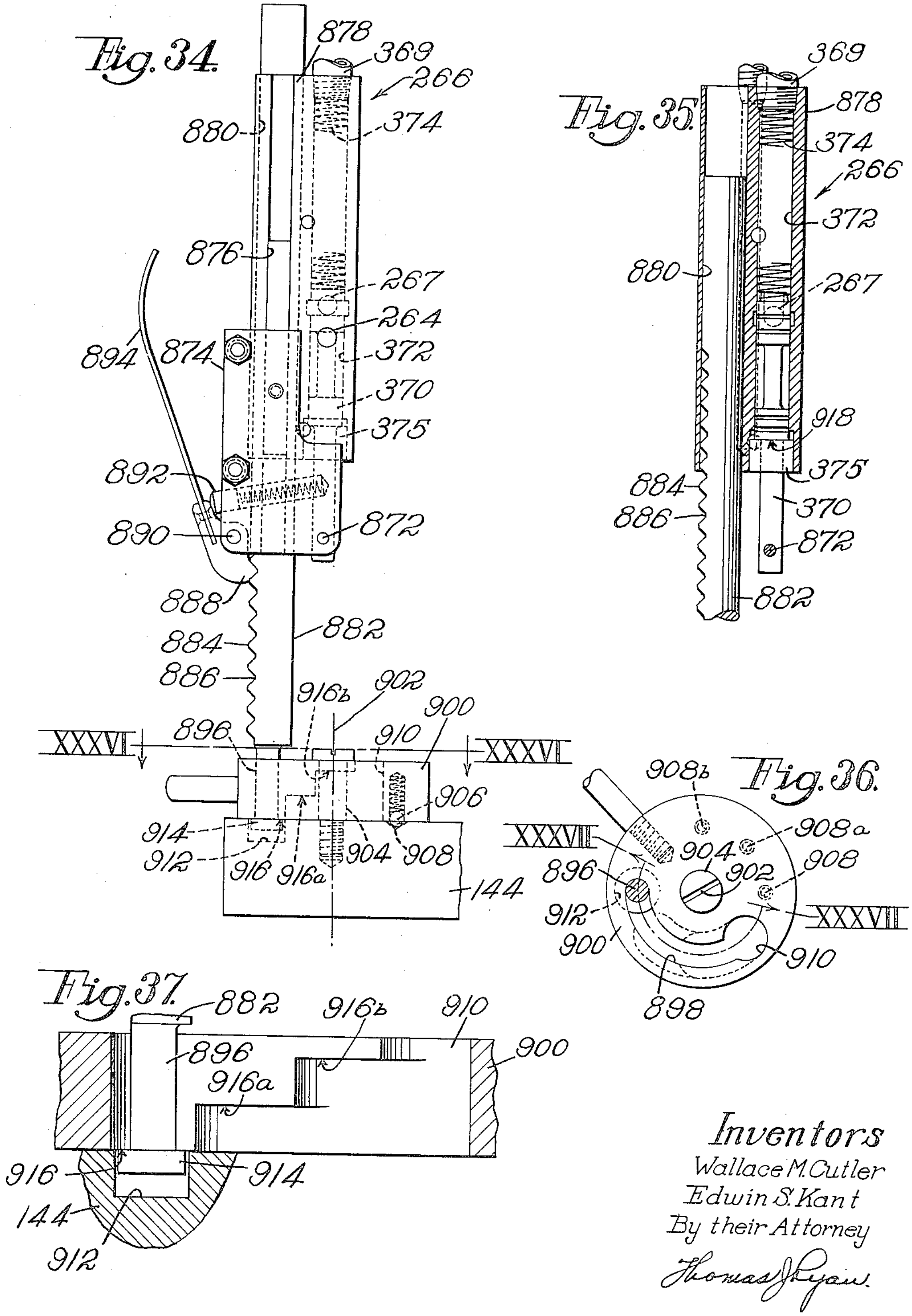
Fig. 34 is a side view of a valve and mechanism, which is operatively connected to said valve and to a jack operating piston, for varying the position of the jack with relation to said piston and for limiting upward movement of the piston.
Fig. 35 is a vertical longitudinal section through the upper portion of the mechanism illustrated in Fig. 34.
Fig. 36 is a plan view on line XXXVI—XXXVI of Fig. 34 showing a turret which may be set in different adjusted positions to vary the amount of vertical travel of the jack.
Fig. 37 is a section on line XXXVII—XXXVII of Fig. 36.
Figure 38:
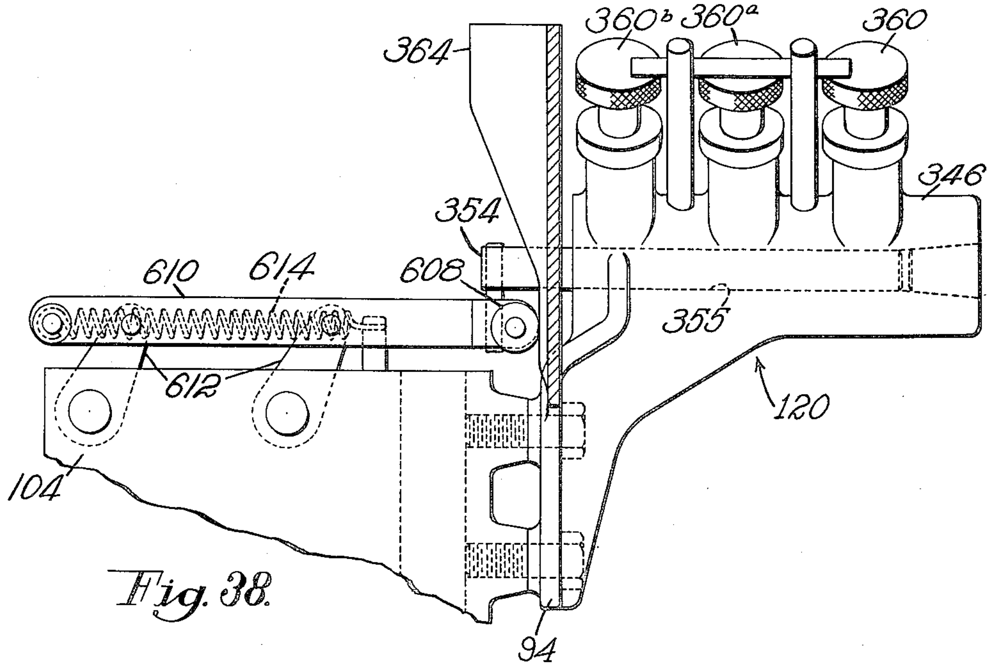
Figs. 38 and 39 are plan and sectional views respectively of portions of mechanism for controlling the maximum pressures that are exerted by the jack against the work.
Figure 39:
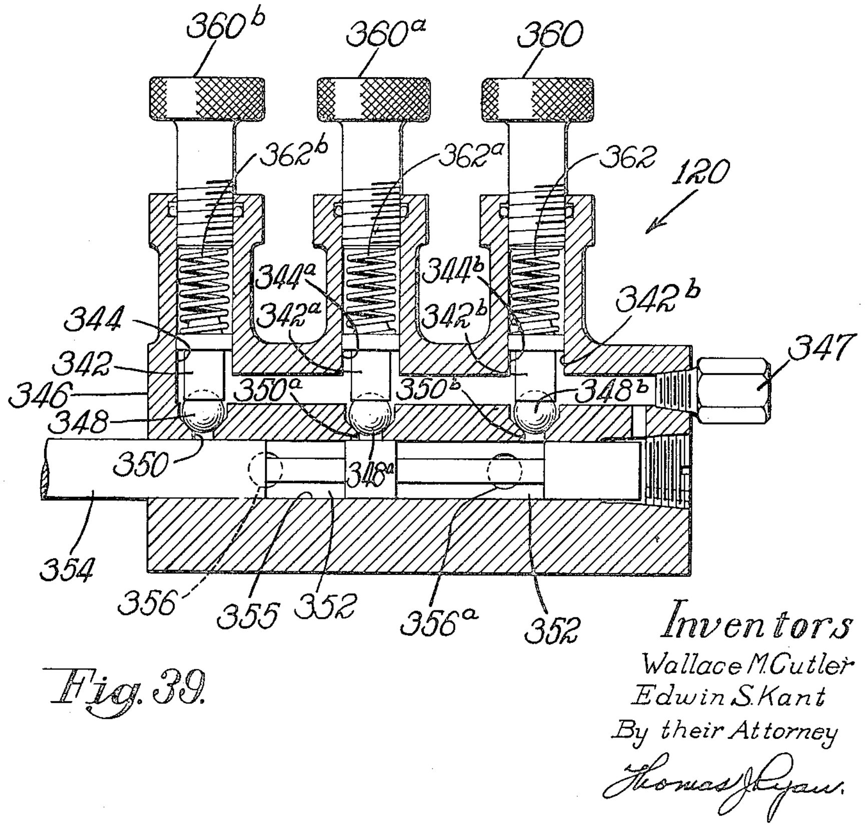

At the right end of the slot 898 formed in the turret, as viewed in Fig. 36, is a circular opening 910 which is initially moved into vertical alinement with a well 912 formed in the upper face of the platform 144 to enable the measuring rod 882 to be moved into said well, the turret 900 then being rotated about the shoulder screw 904 to a position in which the spring-pressed plunger 906 engages one of the recesses 908, 908*a*, or 908*b* thereby moving one of the faces 916, 916*a* or 916*b* of the turret selectively into a position above the well 912.

When the plunger 116 of the treadle valve 117 is in its lowered rest position shown in Fig. 47 and the latch 894 is tapped as above described to swing it clockwise as viewed in Fig. 34 against the action of the spring-pressed plunger 892, the head 914 of the measuring rod 882 at this time being in engagement with the bottom of the well 912 and the plunger 370 of the limit stop valve 266 being in its position shown in Fig. 47, the carriage 874 and the plunger 370 under force of gravity and the action of the spring 374 are lowered a predetermined distance with relation to the measuring rod 882, depending upon how many times the latch 888 is tapped, the construction and arrangement being such that a quick tap and release of the latch will cause the carriage to drop one notch 886 down the measuring rod. As the plunger 370 is lowered and the line 267 is open to the exhaust line 369, the plunger 272 of the main cylinder pilot valve 249 is moved by the spring 274 to its raised position shown in Fig. 48 with the result that the piston 86 is raised and the measuring rod 882 then in engagement with the bottom of the well 912 is raised thus causing the carriage 874 and the plunger 370 to be raised. When the plunger 370 has been raised to a position in which oil under pressure in line 264 is admitted to the line 267 the plunger 272 of the main cylinder pilot valve 249 is again depressed against the action of the spring 274 to its position shown in Fig. 47 to close off the line 296 from the exhaust line 256 thus causing upward movement of the piston 86 and accordingly the jack 58 to cease. It will thus be clear that the latch 882 may be tapped, automatically to raise the jack to a desired higher starting position preparatory to working on a new run of work of a different style or in changing from on the last to off the last work for example.

When a shoe of a new run of work has been positioned in the machine the operator depresses the treadle 82 causing the piston 86 and accordingly the platform 144 and the jack 58 to be lowered. As the platform 144 is depressed the face 916, **916*a* or 916*b* of the turret 900, depending upon the adjustment of the turret on the platform 144, engages the head 914 of the measuring rod 882, the carriage 874, the plunger 370 and the measuring rod 882 being lowered as a unit until a face 918 of the plunger 370 engages the plug 375 of the limit stop valve 266 whereupon the plunger and the carriage come to rest. As the piston 86 and accordingly the platform 144 continue to be depressed the measuring rod 882 remains fixed to and temporarily at rest with the carriage until the head 914 of said rod is engaged by the face 916, 916*a* or 916*b*, depending upon the angular adjustment of the turret 900 upon the platform, the measuring rod thereafter being drawn down by the turret, the teeth 884 of said rod camming the latch 888 out of engagement therewith until the jack 58** has arrived at the lower end of its stroke and has compressed the work.

When the heel 52 has been attached to the shoe 50 or the top lift 54 has been spanked onto the heel, and the jack 58 and accordingly the platform 144 of the piston 86 is raised, the measuring rod 882 remains stationary until its head 914 engages the bottom of the well, such distance being substantially ⅜″, ¾″ and 1⅛″ depending upon which of the faces 916, **916*a* and 916*b* respectively is arranged above the well, the measuring rod then being raised together with the platform 144 and raising with it the carriage 874 and the plunger 370 of the limit stop valve 266 approximately 5⁄16″ before said plunger has moved to the position shown in Fig. 47 to admit oil under pressure to the line 267 thereby causing the plunger 272 of the main cylinder pilot valve 249 to close the chamber 298 of the main cylinder 254 from the exhaust line 256 and accordingly stopping upward movement of the piston 86. When the jack 58 comes to rest it will be spaced predetermined distances, controlled by the positioning of the turret 900 on the platform 144, above the nailing die 68. An experienced operator usually sets the turret 900** so that a minimum gap of approximately 11⁄16″ exists between the heel seat of the shoe swung rearwardly to its vertical position on the jack and the heel on the carrier while a less experienced operator sets the turret so as to produce a wider gap.

As above explained, the sliding beam 112 (Figs. 3, 27, 28, 29 and 30) is operatively connected for vertical reciprocation to the impeller 90 by the clutch 88 which comprises a locking lever 922 pivoted on a pin 924 mounted in a lug 926 which is secured by screws 928 to, and may be considered part of the sliding beam 112, said lever having a flanged lower end 930 movable into a recess 932 of a wear plate 934 secured to the impeller when said recess is in registry with said end. The locking lever 922 is constantly urged counterclockwise as viewed in Figs. 29 and 30 about the pivot pin 924 by a spring 936 opposite ends of which fit in recesses of the lug 926 of the sliding beam 112 and the lever 922 respectively.

Normally secured to the lower ends of the vertical guide rods 92 (Figs. 3, 27, 28 and 29) by screws 938 and nuts 940 is a supporter yoke 942 having alined bores 944 in which is rotatably supported a shaft 946. The upper ends of the vertical rods 92 are threaded into the bracket 104 of the main frame 94, said rods having secured to their lower ends worm gears 948 which mesh with worms 950 secured to the shaft 946. The vertical guide rods 92 have enlarged portions which fit slidingly in bores 952 of guide brackets 954 secured by screws 956 to the main frame 94 and have mounted upon them in engagement with shoulders thereof fibre collars 958 for limiting downward movement of the sliding beam 112. As will be explained later, it is desirable that when the sliding beam 112 is in its lowered waiting position in engagement with the fibre collars 958, the locking lever 922 shall be positioned to swing into the recess 932 of the impeller 90 and accordingly the shaft 946 may be initially rotated in the yoke 942 by the use of a hand crank (not shown) after releasing the screws 938, initially to raise or lower said rods 92 the same distances to the desired positions.

Rotatably mounted in alined bores 960 of the supporter yoke 942 is a shaft 962 having secured by screws 964 to its left end, as viewed from the front of the machine, a crank arm 966 in which is threaded a shoulder screw 968 (Figs. 3 and 4) fitting in a vertical slot 970 of a coupling 972 secured to the forward end of the piston 288. Fulcrumed upon and secured by screws 974 to the shaft 962 are levers 976, 978 respectively. The lever 978 carries a bearing stud 980 having pivoted on it a connector plate 982 which is constantly urged counterclockwise as viewed in Fig. 28 about said stud by a compression spring 984. When the sliding beam 112 is in its lowered or rest position shown in Figs. 28, 29 and 30 counterclockwise movement of the connector plate 982 is limited by the engagement of an inclined face 986 of the plate with a pin 988 fixed to the sliding beam.

Formed integral with the lever 978 is a spring retainer 990, front and rear ends of a compression spring 992 being seated in sockets of said retainer and the lever 976 respectively. The levers 976, 978 have at their lower ends slots 994, 996, said levers being rotatable about and together with the shaft 962 between limits determined by screws 998 and 1000, which are secured to the supporter yoke 942 and pass through said slots. Fulcrumed on a pin 1002 carried by the lever 976 is a detent 1004 which is constantly urged clockwise, as viewed in Figs. 29, 30 with relation to said lever by a spring 1006 mounted on a screw 1008 which is secured to the lever and passes through a slot 1010 of the detent. Secured by rivets 1012 to the upper portion of the lever 976 is a latch plate 1014 which has an inclined surface 1016 and behind the right hand end of which as viewed in Fig. 28 lies a portion of the connector plate 982, when the sliding beam 112 is in its lowered or rest position.

When the vertically reciprocated impeller 90 is in its lowermost position it is substantially at rest and has its recess 932 arranged in opposed relation to the flanged lower end 930 of the locking lever 922. Upon actuation of the piston 288 and accordingly the coupling 972 to the left, as viewed in Fig. 4, the shaft 962 is rotated counterclockwise, as viewed in Figs. 29 and 30 causing said lever 978 and accordingly the connector plate 982 to swing counterclockwise about the axis of said shaft with the result that the lever 976, the latch plate 1014 of which at that time is in front of the connector plate 982, is also rotated counterclockwise. Such movement of the lever 976 causes the detent 1004 to be moved away from the lug 926 of the sliding beam 112 and permits the locking lever 922 to swing under the action of the spring 936 into a position in which its flanged lower end 930 engages in the recess 932 of the actuator 90. When the one-revolution clutch 88 has been thus engaged the sliding beam 112 moves through a cycle with the impeller 90 causing upward movement of the driver head 72 and accordingly the driving of nails which are in the passages 76 of the nailing die 68, into the work. As the sliding beam 112 is raised from its rest or waiting position the pin 988 cams the connector plate 982 about the bearing stud 980 and moves said plate from behind the latch plate 1014 thus allowing the lever 976 actuated by the spring 992 to swing back to its vertical position shown in Figs. 29 and 30, in which the latch plate 1014 is in a position to be engaged by the locking lever 922 as the sliding beam 112 moves to its lowered position, in order to withdraw said locking lever from the recess 932 of the impeller 90. As the shaft 962 in response to forward retractive movement of the piston 288, as viewed in Fig. 4, returns to its rest position the inclined surface 1016 of the latch plate 1014 cams the connector plate 982 clockwise as viewed in Fig. 28 said connector plate then returning to its vertical rest position behind the latch plate and against the pin 988 readily to effect through the above described mechanism the tripping of the one-revolution clutch 88 when the shaft 962 is again actuated.

The sliding beam 112 has operatively connected to it the counterweights 295 and the impeller 90 has operatively connected to it counterweights 1018 (Fig. 3). The counterweights 295 have pivotally connected to them links 1020 which are pivotally connected to the outer ends of levers 1022 journaled on bearings 1024 mounted in the main frame 94, the inner ends of the levers 1022 being operatively connected to the sliding beam 112 by links 1026, the construction and arrangement being such that the counterweights 295, which slide along the rods 297, have a direction of movement opposite to that of the sliding beam and travel at the same speed as the sliding beam. Since the counterbalancing of the sliding beam 112 and the impeller 90 is described in detail in application Serial No. 281,392 no further description of this mechanism is believed to be necessary herein. As above explained, the rod 293, which forms part of the mechanism for actuating the latch 291 which locks the plunger 116 of the treadle valve 117 in its raised position, is secured to the left counterweight as viewed from the front of the machine.

The unloader 132 comprises pump and accumulator passages 1028, 1030 respectively (Figs. 43, 44, 45, 47 and 48), between which is positioned a ball check 1032 and through which oil from the pump 136 is forced into the accumulator line 127. Open to the passage 1030 is a passage or line 1034 leading to the upper end of a pilot valve plunger 1036 which is movable in a bore or cylinder 1038 of an unloader housing 1040 and is constantly urged upward to its normal position against a stop face 1042 of a screw 1043 by a spring 1044 which is included in a sleeve 1046 (Fig. 43) threaded into the housing, the upper end of said spring engaging the plunger and the lower end of the spring engaging a spring holder 1048 resting upon a cross pin secured to an adjusting sleeve 1050 threaded onto the sleeve 1046. The plunger 1036 comprises a stem or finger 1052 which is positioned adjacent to the exit end of the passage 1034 and is complemental to and slightly smaller than a cylindrical recess or bore 1054 which is coaxial with said stem or finger and is formed in a screw 1056 threaded into the upper end of the housing 1040 and adapted to receive the stop screw 1043.

Extending between the bore or cylinder 1038 and a dump valve bore or cylinder 1058 in the housing 1040 is a passage or line 1060 in communication with an L-shaped passage 1062 the lower end of which opens into the bore or cylinder 1038, said L-shaped passage when the plunger 1036 is in its raised position, at which time the accumulator 126 is receiving the oil from the gear pump 136, being opened to an exhaust line 1064 formed by the sleeve 1046.

Vertically slidable in the bore or cylinder 1058 is a plunger 1066 which is constantly urged upward by a spring 1068 to its position shown in Figs. 43 and 47 in engagement with a screw 1070 which is threaded into the housing 1040 and forms with the bore or cylinder 1058 and the plunger or piston 1066 a chamber 1072, said bore having opening into it a transfer passage 1074, which extends to the pump passage 1028, and a passage or exhaust port 1076 leading to the sump. So long as oil in the accumulator 126 does not reach a predetermined pressure, oil from the gear pump 136 flows through the passages 134, 1028, 1030 and 127 into the accumulator 126. Whenever the desired pressure in the accumulator 126 is exceeded, oil from the passage or line 1034 acting against an end 1078 of the plunger 1036 and flowing into a chamber 1080 which is formed between the bore 1038, the plunger 1036 and the screw 1056 and which at that time is somewhat restricted, depresses the plunger 1036 to a position in which the oil in said chamber flows through the passage or line 1060 into the chamber 1072 thus depressing the plunger or piston 1066 from its position shown in Figs. 43 and 47 to its position shown in Fig. 48 to open the transfer passage 1074 to the exhaust line 1076 so that oil from the line 134 will flow directly back into the sump without having to operate against the ball check 1032.

The pressure or pressure band of oil in the accumulator 126 may be readily varied by rotating the adjusting sleeve 1050 upon the sleeve 1046 to increase or decrease the loading of the spring 1044 bearing against the plunger 1036, or by separately setting the screw 1056 and the stop screw 1043 in different positions. By providing the plunger 1036 with the stem or finger 1052 which moves in and out of the cylindrical recess or bore 1054 of the screw 1056 said plunger is resisted sufficiently to eliminate any dithering or pulsating action of the plunger thereby insuring that the pressure in the accumulator line 127 remains in a narrow pressure band.

The carrier 66, which is best illustrated in Fig. 11, is similar to the carrier 64 and comprises a frame 1082 which is slidable on the rod 516 constructed to accommodate this type of carrier and is normally urged to the right, as viewed from the front of the machine, by the chain 528, movement of the carrier to the right being limited by the engagement of a stop 1084 adjustably secured to the frame with the left side of the bracket 104.

Secured in ways 1086 (Fig. 11) of the frame 1082 by a pin 1088 is a plate 1090 having formed in it a recess 1092 in which the rubber heel 56 fits. Overlying the plate 1090 and mounted upon the frame 1082 is a back gage 1094 for positioning lengthwise upon the carrier the base lift 57 resting on the rubber heel 56, and pivotally mounted and geared together for equal and opposite movement upon the frame 1082 are fingers 1096 having notches 1098 which engage the opposite breast corners of the base lift.

The back gage 1094 and the centralizing fingers 1096 may be moved forward and rearward into different adjusted positions independently or with relation to each other to accommodate the base lift and are mounted for a slight degree of vertical tilting movement so as to move vertically with the base lift as pressure is exerted against it by the heel seat of the shoe. Since the carrier 66 is identical with that disclosed in application Serial No. 281,392 no further description of said carrier is believed to be necessary herein.

Figure 16:
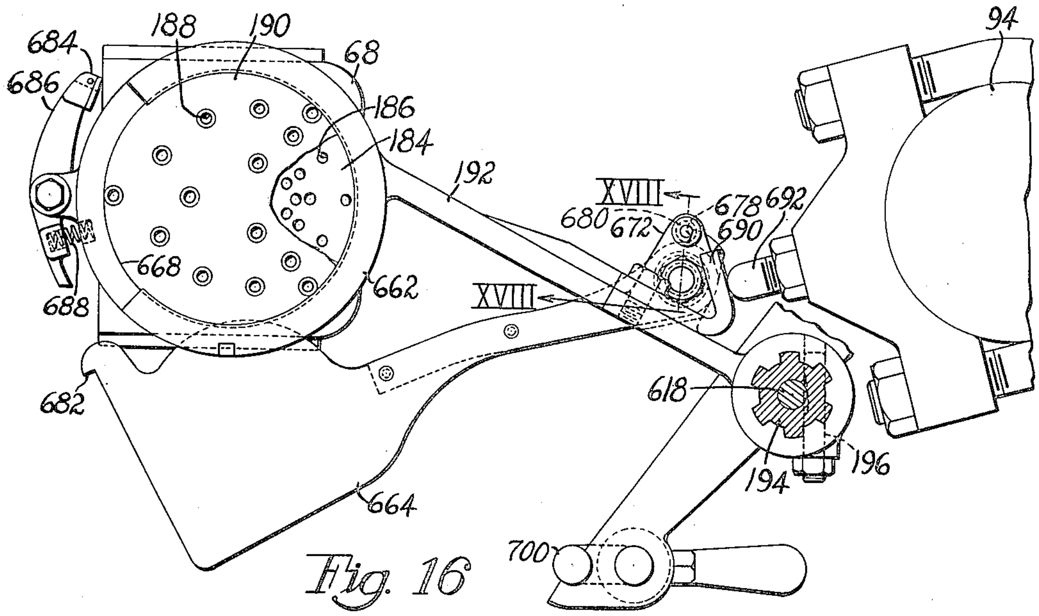
Fig. 16 is a plan view showing the loader block and the arm which carries it over the nailing die.
Figure 17:
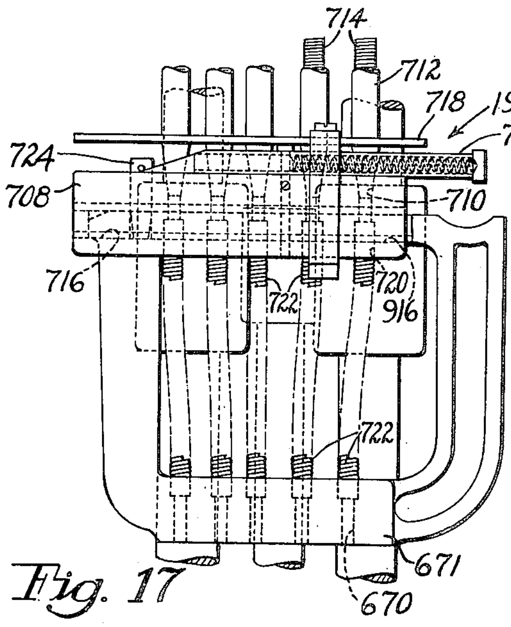
Fig. 17 is a view showing in an enlarged scale the nail delivering unit in side elevation.

Preparatory to attaching the leather heel 52 to the shoe 50 by the use of the above described machine the operator swings the lever 822 (Figs. 1 and 40) rearward, to effect forward movement of the plunger 146 (Figs. 40 and 41) of the valve 148 and accordingly engagement of the one-revolution hydraulic clutch 160 (Fig. 31) thereby causing rotation of the cam 168, actuation of the valve 176, forward movement of the rod 648 (Figs. 12, 47 and 48) and rotation of the splined shaft 194 to swing clockwise, as viewed from above, the loader block 184 containing a load of nails from its rest position (Fig. 12) to a nail delivering position over the nailing die 68 (Fig. 16). After a short dwell over the nailing die 68, during which the nails drop into the passages 76 of the nailing die 68, the loader block is swung to a position beneath the nail delivering unit 190 (Fig. 14) where it receives a new load of nails and then back to its rest position between the nail supplying unit 198 and the nailing die 68 as shown in Fig. 12 to complete its cycle.

The operator then positions in the heel and top lift receiving stations 506, 508 (Fig. 8) of the carrier 64 the heel 52 and the top lift 54 which is to be attached to the shoe, the heel receiving unit at that time being positioned over the nailing die 68. The shoe 50 on the last 60 is then mounted upon the jack 58, then in its forward or loading and unloading position, the jack together with the shoe thereafter being swung rearward to move the rand crease of the shoe against the back gage 62 which has been initially adjusted to the proper position. The operator then depresses the treadle 82 causing through the shaft 420, the yieldable connections shown in Figs. 4 and 5, the arm 432 and the left arm 434 the plunger 116 of the treadle valve 117 to be raised. The raising of the plunger 116 to its position shown in Fig. 48 causes oil at accumulator pressure to be available for the line 248 and connects the line 250 and accordingly the chamber 252 of the main cylinder to the exhaust line 256. When the line 250 is open to exhaust pressure and is open to the upper end of the plunger 272 of the main cylinder pilot valve 249, said plunger moves to its raised position shown in Fig. 48 under the action of the spring 274 thus causing accumulator oil to be available for the chamber 298 and thereby effecting, through the fluid pressure means above-described, downward movement of the piston 86 to cause the heel seat portion of the shoe to be forced against the heel in the carrier 64. When the treadle 82 is only partially depressed and the operator is not fully satisfied with the relative positioning of the heel and the shoe, the treadle 82 is raised and the piston 86 and accordingly the jack 58 are raised to a position determined by the limit stop valve 266. After rearranging the work in the machine the treadle 82 is fully depressed causing the shoe to be forced under preliminary pressure against the heel, the plunger 282 (Figs. 47 and 48) of the clutch trip pilot valve 114 being raised against the action of the spring 284 by pressure from the line 300 applied against the face 302 of the plunger 282. When the plunger 282 has been raised oil under accumulator pressure passes through the passage 258 and the channel 260 of the plunger 116 of the treadle valve 117 (Fig. 42), through lines 262 and 286 to the face 308 of the plunger 288 of the actuator for the one-revolution clutch 88 to trip through the crank arm 966 and the shaft 962 the one revolution clutch 88 thereby operating the driver head 72 to drive nails then in the passages 76 of the nailing die 68 through the heel and the heel seat of the shoe, the head ends of the nails being left projecting beyond the top lift receiving face of the heel as shown in Fig. 4. As the driver head 72 starts upward the booster 118 is rendered active causing high pressure fluid to be forced into the chamber 298 to force the shoe against the heel under secondary pressure during driving of the nails into the work.

After fully raising the plunger 116 of the treadle valve 117 the operator loses control of the machine by reason of the spring pressed latch 291 (Figs. 4, 5 and 6) swinging into a position beneath the plunger and usually removes his foot from the treadle 82. As the nail driver head 72 reaches the upper end of its stroke the spring pressed latch 291 is swung by the arm 448 on the shaft 444 from its locking position beneath the treadle valve plunger 116 which returns to its rest position under the action of the spring 244 causing the piston 86 and accordingly the jack 58 together with the work mounted on it and gripped by the operator to be raised a predetermined distance in accordance with the setting of the turret 900 which controls the height of the jack 58 at the time the limit-stop valve 266 opens the line 267 to the line 264 and causes the plunger 272 of the main cylinder pilot valve 249 to be depressed.

As the driver head 72 reaches the upper end of its stroke the detent 556 (Figs. 25 and 26) which is associated with the carrier 64 is lowered by the action of the cam 327 (Figs. 3 and 27) on the roll 572 operatively connected to the multipart rod 548, thus releasing the carrier which when pressure of the work against it has been released slides under the action of the fluid pressure biased chain 528 to a position in which the top lift receiving station or unit 508 of the carrier 64 is arranged over the nailing die 68, the shoe in the meanwhile being held on the jack by the operator.

The operator thereafter partially depresses the treadle 82 to cause the jack 58 and the attached heel of the shoe to be forced against the top lift in the carrier, the projecting nails extending beyond the heel being forced into the top lift to spank said lift onto the heel, the operator raising the treadle. The jack 58 is then swung forward and the work is removed from the jack.

Preparatory to attaching rubber heels 56 and their associated base lifts 57 to shoes 50 the operator opens the valve 379 into a position in which the chamber 378 of the valve 249 is opened to the line 286 and moves the valve 307 into a position in which the line 305 is opened to a portion of the line 300 leading to the pilot valve 114. Moreover, the nails in the distributor 200 are changed, the nails **74*a* being substituted for the nails 74, and various parts of the nail delivering mechanism are changed to accommodate "Rubber" work. After swinging the lever 822 counterclockwise as viewed in Fig. 1 to cause the load of nails 74*a* to be delivered by the loader block 184 to the nailing die 68 and positioning the heel 56 and its base lift 57 in the carrier 66 the shoe upon the last is placed upon the jack 58 then in its forward position and is swung to its rearward position against the back gage 62. The operator then depresses the treadle 82 to force the shoe under pressure against the base lift 57 and accordingly the base lift against the rubber heel 56 in the carrier 66. As the treadle 82 is further depressed and the one-revolution clutch 88 is engaged, pressure in the line 286 forces the plunger 272 of the valve 249 to the upper end of its housing thereby opening the exhaust line 122 to the chamber 298 and thus releasing pressure against the piston 86 so that only force applied by the jack 58 against the work is that due to residual pressure the weight of the jack and its supporting parts supplemented if desirable by residual pressure in the chamber 298 controlled by the relief valve 124 being sufficient to support the shoe against the driving action of the nails. As the machine completes its cycle the jack 58 rises to a predetermined position controlled by the limit stop valve 266** and its associated mechanism causing said jack to come to rest, the jack then being swung forward and the work being removed from said jack.

In order to insure that nails resting in the passages 186 of the loader block 184 arranged over the nailing die 68 shall readily drop into passages 76 of said die, the carrier stop 526 is so regulated that when the loader block is stopped by the stop stud 692, said carrier moves slightly away from the ring portion 662 of the loader block arm 192 and then bounces back against said arm. Moreover, in order further to insure that the nails shall be properly delivered from the passages 186 of the loader block 184 to the passages 76 of the nailing die 68, the cam 168 is preferably provided with a recess 1100 which causes a slight swinging movement and agitation of the loader block while said block is positioned over the nailing die.

Although the illustrative machine has been described with reference to the attachment of heels to shoes, it will be understood that the machine, which may be also regarded as a fastening inserting machine, may be used for driving nails into the heel seats of shoes in a manner similar to that disclosed in United States Letters Patent No. 2,480,905, granted September 6, 1949 in the name of Thomas B. Clarke et al. Preparatory to equipping the illustrative machine for this operation the heel and top lift carrier 64 is removed from the machine and the housing 100 of the nail driver head 72 is so adjusted that the nail drivers 98 drive nails a desired distance into the heel seats of the shoes leaving portions of the nails projecting from said heel seats. Leather heels may be subsequently attached to the shoes, beyond the heel seats of which the nails project, by the use of the machine disclosed in said Patent 2,480,905 or by the use of an improved machine such as disclosed in United States Letters Patent No. 2,524,120, granted October 3, 1950 on an application filed in the name of Thomas B. Clarke.

Having thus described our invention, what we claim as new and desire to secure by Letters Patent of the United States is:

1. In a heel attaching machine, fluid pressure means, a pair of supports, an actuator which is operatively connected to one of the supports, a treadle valve having an element, means for moving said element from an initial to a displaced position to cause movement of the actuator by said fluid pressure means and accordingly movement of said one support in one direction to force together a heel mounted upon one of the supports and a heel seat of a shoe mounted upon the other of the supports, fastening inserting means, said fluid pressure means comprising a pilot valve responsive entirely to pressure exerted against the actuator for rendering said fastening inserting means active to insert fastenings into the heel and the heel seat of the shoe, and means for moving said element of the treadle valve back to its initial position to cause movement of the actuator by said fluid pressure means and accordingly movement of said one support in an opposite direction to effect relative retraction of said supports.

2. In a heel attaching machine, fluid pressure means, a pair of supports, an actuator which is operatively connected to one of the supports, a treadle valve having an element, means for moving said element from an initial to a displaced position to cause movement of the actuator by said fluid pressure means and accordingly movement of said one support in one direction to force together a heel mounted upon one of the supports and a heel seat of a shoe mounted upon the other of the supports, fastening inserting means, mechanism comprising a plunger for rendering said fastening inserting means active, said fluid pressure means also comprising a pilot valve responive entirely to pressure open to the actuator for operating said plunger thereby rendering said fastening inserting means active to drive fastenings into the heel and the heel seat of the shoe, means for varying the timing of the pilot valve, and means for moving said element of the treadle valve back to its initial position to cause movement of the actuator by said fluid pressure means and accordingly movement of said one support in an opposite direction to effect relative retraction of said supports.

3. In a heel attaching machine, a pair of work supports, a piston operatively connected to one of the supports, fluid pressure means comprising a pair of chambers which are formed partly by said piston and into which high and low pressure fluids are introduced respectively to produce a pressure differential acting upon the piston to move said one support first in one direction and then in an opposite direction, a piston pilot valve for sealing the chamber heretofore open to low pressure fluid for limiting movement of the piston in said opposite direction, and a limit stop valve which is operative in response to movement of the piston in said opposite direction for operating said piston pilot valve.

4. In a heel attaching machine, a pair of work supports, a piston operatively connected to one of the supports, fluid pressure means comprising a pair of chambers which are formed partly by said piston and into which fluids under high and low pressures are introduced respectively to produce a pressure differential acting upon the piston to move said one work support first in one direction and then in an opposite direction, a piston pilot valve for shutting off one of said chambers to limit movement of the piston in said opposite direction, and a limit stop valve having a movable element which is operatively connected, with a slight amount of lost motion, to the piston and is adapted to control the operation of said piston pilot valve.

5. In a heel attaching machine, fluid pressure means, a pair of supports, an actuator operatively connected to one of the supports and having faces against which differential pressure is applied by said fluid pressure means to move said actuator first in one direction and then in an opposite direction, said fluid pressure means comprising a treadle valve having an element, means for moving said element from a rest position to a displaced position, to cause said fluid pressure means to effect movement of the actuator in said one direction thereby forcing together a heel mounted upon one of the supports and a heel seat of a shoe mounted upon the other of the supports, and for moving said element back to said rest position to cause said fluid pressure means to effect movement of the actuator in said opposite direction thereby causing relative retraction of the supports, and mechanism for inserting fastenings into the heel and the heel seat of the shoe, said fluid pressure means also comprising a fastening inserting pilot valve having an element which is movable entirely in response to pressure applied against one of the faces of the actuator to render said fastening inserting means active to drive said fastenings into the heel and the shoe.

6. In a heel attaching machine, fluid pressure means, a pair of supports, an actuator operatively connected to one of the supports and having faces against which differential pressure is applied by said fluid pressure means to move said actuator first in one direction and then in an opposite direction, said fluid pressure means comprising a treadle valve having an element, means for moving said element from a rest position to a displaced position to cause said fluid pressure means to effect movement of the actuator in said one direction thereby forcing together under primary pressure a heel and a heel seat of a shoe mounted respectively upon the supports, and for moving said element back to said rest position to effect movement of the actuator in said opposite direction thereby causing relative retraction of the supports, mechanism for inserting fastenings into the heeel and the heel seat of the shoe, said fluid pressure means also comprising a fastening inserting pilot valve having an element which is movable entirely in response to pressure applied against one of the faces of the actuator for rendering said fastening inserting means active to drive said fastenings into the heel and the shoe, and pressure boosting means responsive to movement of said fastening inserting means for forcing the heel and the heel seat of the shoe together with augmented pressure during the operation of the fastening inserting means.

7. In a heel attaching machine, fluid pressure means, a pair of supports, an actuator operatively connected to one of the supports having faces against which differential pressure is applied by said fluid pressure means to move said actuator first in one direction and then in an opposite direction, said fluid pressure means comprising an accumulator for supplying high pressure oil and also comprising a treadle valve having an element, means for moving said element from a rest position to a displaced position, to cause said fluid pressure means to effect movement of the actuator in said one direction thereby forcing together a heel and a heel seat of a shoe mounted respectively on the supports, and for moving said element back to said rest position to cause said fluid pressure means to effect movement of the actuator in said opposite direction thereby causing relative retraction of the supports, mechanism for inserting fastenings into the heel and the heel seat of the shoe, and a pressure regulator, said fluid pressure means also comprising a pilot relief valve having a plunger which is available to fluid acting against the actuator and is also available to fluid in the pressure regulator and is movable in response to excessive pressures applied against the actuator and determined by the pressure regulator.

8. In a heel attaching machine, a nailing die, fluid pressure means comprising a jack which is movable toward and away from the nailing die, nail driving means, a clutch engagement of which renders said nail driving means active, mechanism for engaging the clutch, manually actuated means movable a predetermined distance for rendering said fluid pressure means active to move the jack toward the nailing die for forcing together under substantial pressure a heel and the heel seat of a shoe, a clutch trip pilot valve having a plunger movable in response to action of said fluid pressure means to cause fluid of said means to actuate said mechanism and accordingly effect engagement of said clutch thereby causing nails to be driven into the heel and the heel seat of the shoe, and a resistance member which acts against the plunger of said pilot valve and is adjustable to vary the timing of said valve.

9. In a heel attaching machine, a nailing die, fluid pressure means comprising a jack which is movable toward and away from the nailing die, nail driving means, a clutch engagement of which renders said nail driving means active, mechanism for engaging the clutch, manually actuated means movable a predetermined distance for rendering said fluid pressure means active to move the jack toward the nailing die for forcing together under substantial pressure a heel and the heel seat of a shoe, a spring, a clutch trip pilot valve having a plunger which is movable against the action of the spring by the action of said fluid pressure means against it to operate said mechanism and thereby engage the clutch and cause nails to be driven into the heel and the heel seat of the shoe, and means for loading the spring to vary the timing of the engagement of the clutch with relation to the clamping together of the heel and the heel seat of the shoe.

10. In a heel attaching machine, a nailing die, fluid pressure means comprising a jack which is movable toward and away from the die, nail driving means, an impeller which reciprocates continuously when the machine is powered, a one-revolution clutch operatively connecting the impeller to the nail driving means, mechanism operatively connected to the clutch, a treadle valve having a movable element, manually actuated means for displacing said movable element of the treadle valve a predetermined distance for rendering said fluid pressure means active to effect movement of the jack for forcing together under substantial pressure a heel and the heel seat of a shoe positioned between the jack and the nailing die, a clutch trip pilot valve having a plunger movable in response to fluid of said fluid pressure means for causing said fluid pressure means to actuate said mechanism and accordingly to effect engagement of the clutch and nails to be driven into the heel and the heeel seat of the shoe, and a resistance member which acts against the plunger of said pilot valve and is adjustable to vary the timing of said pilot valve.

11. In a heel attaching machine, a nailing die, fluid pressure means comprising a jack which is movable toward and away from the die, nail driving means, an impeller which reciprocates continuously when the machine is powered, a one-revolution clutch operatively connecting the impeller to the nail driving means, mechanism operatively connected to the clutch, a treadle valve having a movable element, manually actuated means for displacing said movable element of the treadle valve a predetermined distance for rendering said fluid pressure means active to effect movement of the jack and thus force together under substantial pressure a heel and the heel seat of a shoe positioned between the jack and the nailing die, clutch trip pilot valve having a plunger movable in response to action of said fluid pressure means to cause said fluid pressure means to actuate said mechanism and accordingly to cause engagement of the clutch and thus cause nails to be driven into the heel and the heel seat of the shoe, a resister unit which acts against the plunger of said pilot valve and is adjustable to vary the timing of said valve, and a pressure regulator associated with said fluid pressure means for limiting the maximum pressure which can be applied against the work by the jack.

12. In a heel attaching machine, a nailing die, fluid pressure means comprising a jack which is movable toward and away from the die, nail driving means, an impeller which reciprocates continuously when the machine is powered, a one-revolution clutch operatively connecting the impeller to the nail driving means, mechanism operatively connected to the clutch, a treadle valve having a movable element, manually actuated means for displacing said movable element of the treadle valve a predetermined distance for rendering said fluid pressure means active to effect movement of the jack for forcing together under substantial pressure a heel and the heel seat portion of a shoe positioned between the jack and the nailing die, a spring, a clutch trip pilot valve having a plunger which is movable against the action of the spring by the action of said fluid pressure means against it to operate said mechanism and thereby engage the clutch and cause nails to be driven into the heel and the heel seat of the shoe, and means for loading the spring to vary the timing of the engagement of the clutch with relation to the clamping together of the heel and the heel seat of the shoe.

13. In a machine for securing two shoe parts together, members for supporting said parts respectively, fluid pressure means for effecting relative movement of said members, said fluid pressure means comprising a cylinder and a plunger which is movable therein and is operatively connected to one of said members and has a pair of faces forming with the cylinder a pair of chambers, an accumulator for fluid under pressure, a control valve positioned between the accumulator and opposite faces of the plunger for alternately connecting respectively said faces of the plunger to oil in the accumulator and to an exhaust line in order to move the plunger first in one direction to cause the shoe parts to be clamped together and then in an opposite direction, means for driving nails into said shoe parts when they are clamped together to secure said shoe parts to one another, a cutoff valve positioned between one of said faces of the plunger and the control valve, a limit stop valve responsive to engagement by said plunger for operating said cutoff valve to seal the chamber which is formed partly by said one face thereby limiting movement of the plunger in said opposite direction, and means responsive to fluid pressure operating against said one face of the plunger for actuating the nail driving means.

14. In a heel attaching machine, a jack, a nailing die, and fluid pressure means for effecting relative approaching movement and movement of separation of the die and the jack, said fluid pressure means comprising a cutoff valve and a limit stop valve having operatively connected to it an element which partakes, with a predetermined amount of lost motion, of said relative approaching movement and said movement of separation between the jack and the die and which is adapted, when said movement of separation has progressed a predetermined distance, to operate the limit stop valve and thus to cause said cutoff valve to be closed thereby stopping said movement of separation.

15. In a heel attaching machine, a jack for a shoe, a nailing die for supporting a heel, fluid pressure means comprising a manually operated reversing valve and an actuator which carries the jack, a high pressure line, a low pressure line, said actuator having a pair of faces, said reversing valve having an element, means adapted to move said element from a rest position to a displaced position, thereby causing said faces respectively of the actuator to be connected to said high and low pressure lines to move through the actuator jack toward the nailing die to clamp the heel seat of the shoe against the heel, and adapted to move said element back to its rest position, thereby causing said faces of the actuator to be connected respectively in reverse order to the high and low pressure lines to move through the actuator the jack away from the nailing die, and a limit stop valve forming part of the fluid pressure means, an element which is operatively connected to the limit stop valve and is operatively connected, with a predetermined amount of lost motion, to the actuator, and displacement of which, to a predetermined point as the actuator and the jack move away from the nailing die, effects a predetermined action of the limit stop valve and causes said fluid pressure means to stop movement of said actuator and said jack.

16. In a heel attaching machine, a jack and a nailing die for supporting respectively a shoe and a heel to be attached to the shoe, a plunger operatively connected to the jack, means comprising a treadle valve and an accumulator for supplying fluid under pressure to the plunger to move the jack toward the nailing die for clamping together the heel and the heel seat of the shoe, a loader block, fluid pressure means open to the accumulator for operating the loader block through a cycle to supply nails to the nailing die, means for driving nails into the heel and the heel seat of the shoe, means movable in response to fluid pressure applied against the plunger for rendering said nail driving means operative, and fluid pressure means acting directly on the treadle valve when the loader block is in operation for insuring against movement of said valve.

17. In a heel attaching machine, a nailing die, a nail delivering unit, a nail distributor positioned above the nail delivering unit and constructed and arranged to supply nails to said unit, a loader block, means for moving the loader block between said unit and said nailing die to deliver a load of nails to said die, and mechanism for actuating the nail distributor to cause it to deliver a load of nails to the nail delivering unit, said means being adapted to render said mechanism active as the loader block swings toward the nail delivering unit and to move said loader block beneath the unit ready to receive said nails as they drop without stopping through said unit from the nail distributor.

18. In a heel attaching machine, a jack and a nailing die for supporting respectively a shoe and a heel to be attached to the shoe, a plunger operatively connected to the jack, means for supplying oil under pressure to the plunger to move the jack toward the nailing die for clamping together the heel and the heel seat of the shoe, means comprising a treadle valve having a manually actuated plunger, a loader block, fluid pressure means for operating said loader block through a cycle to supply nails to the nailing die and including a fluid pressure clutch and a fluid pressure line extending between the clutch and the plunger of the treadle valve and serving to secure said plunger against movement when said clutch is engaged.

19. In a heel attaching machine, a jack and a nailing die for supporting respectively a shoe and a heel to be attached to the shoe, a plunger operatively connected to the jack, means for supplying oil under pressure to the plunger to move the jack toward the nailing die for clamping together the heel and the heel seat of the shoe, means comprising a treadle valve having a manually actuated element, a loader block, fluid pressure means for operating said loader block through a cycle to supply nails to the nailing die and including a clutch having a chamber into which fluid pressure is introduced to engage said clutch, and a fluid pressure line extending between said chamber of the clutch and said element of the treadle valve to cause fluid pressure introduced into said chamber to engage the clutch and to retain said clutch engaged and also to act against said element of the treadle valve to secure such element against movement thereby insuring against movement of the jack when the loader block is being operated.

20. In a heel attaching machine, a nailing die having passages, nail driving mechanism comprising a plurality of drivers movable in said passages, fluid pressure means for forcing work against said nailing die with preliminary pressure, and a compressor actuated by said driving mechanism and associated with said fluid pressure means for raising during the operation of said nail driving mechanism the pressure applied against said work.

21. In a heel attaching machine, a nailing die, nail driving mechanism, a jack, means for positioning respectively a shoe and a heel to be attached to the shoe upon the jack and the die, fluid pressure means for effecting relative movement of the jack and the die to clamp between them the shoe and the heel, a mechanically actuated driving member, and means for coupling said driving member to and for uncoupling said member from said nail driving mechanism, fluid compressing means associated with said fluid pressure means and powered by said nail driving mechanism for increasing during the driving of nails into the heel and the heel seat of the shoe by said nail driving mechanism the clamping pressure between the heel and the shoe.

22. In a heel attaching machine, a jack for supporting a shoe, a carrier for a heel, a nailing die having passages, nail driving mechanism movable in said passages, fluid pressure means for operating the jack to force a shoe on the jack against the heel positioned in the carrier and supported by the nailing die, a mechanically powered drive, manually actuated means for operating said fluid pressure means, a clutch trip connection which is operated by said fluid pressure means and is adapted to effect engagement of the clutch to couple said nail driving means to said drive for driving nails then in said passages of the nailing die into the heel and the heel seat of the shoe, and a fluid pressure booster operative in response to movement of the nail driving means for raising the pressure supplied to the jack by said fluid pressure means as nails are being driven into the work.

23. In a heel attaching machine, a jack for supporting a shoe, a carrier for a heel, a nailing die having passages, nail driving mechanism mounted for movement in said passages, fluid pressure means for operating the jack to force with preliminary pressure a shoe on the jack against a heel positioned upon the carrier and supported by the nailing die, a fluid pressure booster, manually actuated means for operating the fluid pressure means, a clutch operatively connected to said nail driving mechanism, and clutch actuating means comprising a member which is operatively connected to the clutch and to said fluid pressure means and which is adapted to trip said clutch to render said nail driving mechanism active to drive nails in said passages into the heel and the heel seat of the shoe, said fluid pressure booster being operated in response to movement of the nail driving mechanism and cooperating with said fluid pressure means to force under secondary pressure the shoe upon the jack against said heel.

24. In a heel attaching machine, a jack for supporting a shoe, a carrier for a heel, a nailing die having passages, nail driving mechanism mounted for movement in said passages, fluid pressure means comprising a control valve for operating the jack to force under preliminary pressure the heel seat of the shoe on the jack against a heel positioned upon the carrier and supported by the nailing die, a fluid pressure booster which is actuated by said nail driving mechanism and is operatively connected to said fluid pressure means, a mechanical drive, treadle mechanism for operating said control valve, a clutch, and a clutch trip valve comprising a spring pressed plunger which is operated with delayed action by fluid rendered available by the control valve, said clutch trip valve upon actuation of said spring pressed plunger causing the clutch to be engaged thereby coupling said mechanical drive to the nail driving mechanism to drive nails then in said passages into the heel and the heel seat of the shoe and rendering said booster active as the nails are being driven thereby causing the heel seat of the shoe to be forced under secondary pressure against the heel during the nail driving operation.

25. In a heel attaching machine, a pair of members, nail driving means, fluid pressure means operatively connected to one of said members and comprising an accumulator, control means comprising a plunger, means for moving the plunger in one direction to render fluid from the accumulator available for said fluid pressure means to move said one member in one direction thereby causing a heel and a heel seat of a shoe mounted respectively upon said members to be clamped together, means operative in response to movement of said plunger in said one direction for operating said nail driving means to attach the heel to the shoe, means for moving said plunger of said control means in an opposite direction to cause fluid from the accumulator to move said one member in an opposite direction thereby enabling the shoe and its attached heel to be moved away from the other of said members, and a limit stop valve which is associated with said fluid pressure means and has operatively connected to it a plunger connected, with a predetermined but an initially variable amount of lost motion, to said one member and which is movable in response to movement of said one member to cause movement of said one member away from the other member to cease.

26. In a heel attaching machine, a pair of supports, fluid pressure means, said means comprising a treadle valve and a plunger which is operatively connected to one of the supports, manually actuated mechanism for operating the treadle valve to cause said means to move the plunger and said one support toward the other support thereby clamping together a heel and a heel seat of a shoe supported respectively upon the supports, mechanism for driving nails into the heel and the heel seat of the shoe, a continuously operated mechanical drive, a one-revolution clutch, means for tripping said clutch in order operatively to connect said nail driving mechanism to said drive, and a spring, said fluid pressure means comprising a clutch trip pilot valve responsive to pressure applied against the plunger and movable against the action of said spring to render said clutch tripping means operative to effect movement of said nail driving means.

27. In a heel attaching machine, a pair of supports adapted to receive respectively a shoe and a heel, an actuator, fluid pressure means for operating said actuator, said fluid pressure means comprising an accumulator and a treadle operated valve comprising a plunger, means for moving the plunger from a starting position to one position to cause fluid from the accumulator and operating through said fluid pressure means to force the actuator in one direction to clamp with preliminary pressure said shoe and heel together, means for moving the plunger from said one portion to said starting position to cause fluid from the accumulator and operating through said fluid pressure means to force the actuator in an opposite direction, a mechanically driven booster for augmenting, as said actuator is forced in said one direction, the force applied to the actuator in that direction to clamp said shoe and heel together with secondary pressure, a fluid pressure regulator, a ball check interposed between the actuator on the one hand and the booster and the treadle operated valve on the other hand, and a by-pass valve responsive to the pressure regulator and also to pressure acting against the actuator for by-passing oil from the booster into the accumulator when pressure against the actuator reaches a predetermined maximum.

28. In a heel attaching machine, a pair of supports for receiving respectively a shoe and a heel which is to be attached to the shoe, an actuator operatively connected to one of the supports, fluid pressure means comprising an accumulator for fluid under pressure, a treadle valve having a plunger, nail driving means, an impeller, a clutch for operatively connecting said nail driving means to said impeller, mechanism for tripping the clutch to render the same active, and treadle operated means for displacing said plunger of the treadle valve in one direction to render available for said actuator fluid in the accumulator thereby moving the actuator in one direction to force together the heel and the heel seat of the shoe mounted upon said supports, said fluid pressure means comprising a pilot valve for controlling operation of the clutch tripping mechanism, said plunger of the treadle valve having a passage which makes oil available for and causes actuation of the pilot valve at the end portion of the displacement of the plunger in said one direction thereby operating said clutch operating mechanism to cause said clutch to be tripped and the nail driving means rendered active to drive nails into the heel and the heel seat of the shoe.

29. In a heel attaching machine, a pair of members, a plunger operatively connected to one of said members, an accumulator for fluid under pressure, fluid pressure means associated with said accumulator and comprising said plunger, said fluid pressure means comprising a manually actuated valve for effecting movement of the plunger in one direction and accordingly movement of one of said members toward the other to force together with initial pressure a heel and a heel seat of a shoe supported respectively by said members, a continuously powered impeller, nail driving means, a clutch for operatively connecting said nail driving means to the impeller, clutch tripping mechanism for rendering the clutch active, a pilot valve which is responsive to fluid pressure acting against the plunger and operation of which causes said clutch tripping mechanism and accordingly said nail driving means to become active to drive nails into the heel and the heel seat of the shoe, a pressure booster which is operative in response to movement of said nail driving means to increase pressure applied to said plunger and accordingly to said one member to force the heel and the shoe together under secondary pressure, and means for regulating the maximum pressure that can be applied by the plunger against said one member as it is forced toward the other member.

30. In a heel attaching machine, a pair of supports, fluid pressure means, said fluid pressure means comprising a treadle valve and an actuator which is operatively connected to one of the supports, manually actuated mechanism for operating the treadle valve to cause said fluid pressure means to move the actuator and said one support toward the other support thereby clamping together a heel and a heel seat of a shoe mounted respectively upon the supports, nail driving mechanism, a mechanically operated impeller, a clutch for operatively connecting said nail driving mechanism to said impeller, means for tripping the clutch for rendering it active to connect the nail driving mechanism to the impeller, and a pilot valve for actuating said clutch tripping means when the pressure against said actuator reaches a predetermined amount thereby rendering the nail driving mechanism active to cause nails to be driven into the heel and the heel seat of the shoe.

31. In a heel attaching machine, a pair of supports, fluid pressure means, said fluid pressure means comprising a treadle valve and an actuator which is operatively connected to one of the supports, manually actuated mechanism for operating the treadle valve to cause said fluid pressure means to move the actuator and said one support toward the other support thereby clamping together under preliminary pressure a heel and a heel seat of a shoe mounted respectively upon the supports, nail driving mechanism, an impeller, a clutch for operatively connecting said nail driving mechanism to said impeller, means for tripping the clutch for rendering it active to connect the nail driving mechanism to the impeller, a clutch trip pilot valve which is responsive to fluid pressure acting against the actuator and is adapted to operate said clutch tripping means when the pressure against said actuator reaches a predetermined amount to drive nails into the heel and the heel seat of the shoe, and a booster unit which is in communication with said fluid pressure means and is operated by said nail driving mechanism to supply fluid pressure under augmented pressure to the actuator and accordingly to said one support during the driving of nails into the work.

32. In a heel attaching machine, a pair of supports, fluid pressure means, said fluid pressure means comprising a treadle valve and an actuator which is operatively connected to one of the supports, said treadle valve having a plunger, manually actuated mechanism for moving the plunger of the treadle valve in one direction to cause said fluid pressure means to move the actuator and said one support toward the other support thereby clamping together a heel and a heel seat of a shoe mounted respectively upon the supports, nail driving mechanism, a mechanically powered impeller, a clutch for operatively connecting said nail driving mechanism to said impeller, means for tripping the clutch for rendering it active to connect the nail driving mechanism to the impeller, and a clutch trip pilot valve, said plunger of the treadle valve being provided with passages which when the plunger is displaced a predetermined distance in said one direction connects the pilot valve with fluid under pressure in said fluid pressure means to operate the pilot valve thereby causing operation of said clutch tripping means to effect driving of nails into the heel and the heel seat of the shoe.

33. In a heel attaching machine, a pair of supports, fluid pressure means, said means comprising a treadle valve having a plunger, an accumulator, an actuator operatively connected to one of said supports, and an actuator pilot valve positioned between the treadle valve and the actuator, treadle mechanism for moving the plunger to cause said pilot valve to render oil from the accumulator available for the actuator to effect movement of said one support toward the other support thereby clamping together a heel and a heel seat of a shoe mounted respectively on said supports, mechanism for driving nails into the heel and the heel seat of the shoe to attach the heel to the shoe, a mechanically powered impeller, a clutch for operatively connecting said nail driving mechanism to said impeller, clutch actuating means, a clutch control valve which is responsive to fluid pressure acting against the actuator and the operation of which renders fluid from the actuator available for the clutch actuating means to effect engagement of said clutch, and a booster responsive to movement of said nail driving means for applying additional force against the actuator to force together the heel and the heel seat of the shoe under secondary pressure.

34. In a heel attaching machine, a pair of work supports, fluid pressure means comprising a treadle valve, an actuator which is operatively connected to one of the supports, an actuator pilot valve which is interposed between the treadle valve and the actuator, and a low pressure line, manually actuated means for operating the treadle valve to cause fluid under pressure to flow from said treadle valve and through said pilot valve to the actuator thereby causing said one support to be moved toward the other support to force together a rubber heel and a heel seat of a shoe mounted respectively upon the supports, nail driving mechanism, a mechanically powered impeller, a clutch for operatively connecting said mechanism to said impeller, a clutch control valve responsive to pressure exerted against the actuator, and clutch operating mechanism responsive to operation of the control valve for causing engagement of the clutch to effect movement of the nail driving mechanism and accordingly to drive nails into the heel and the heel seat of the shoe, said pilot valve being operated in response to pressure available for said clutch operating mechanism for connecting the actuator with said low pressure line just prior to tripping the clutch in order drastically to reduce the pressure between the heel and the shoe while nails are being driven.

35. In a heel attaching machine, a pair of work supports, fluid pressure means comprising a treadle valve, an actuator which is operatively connected to one of the supports, an actuator pilot valve which is interposed between the treadle valve and the actuator, and a low pressure line, manually actuated means for operating the treadle valve and through said fluid pressure means operating the pilot valve thereby allowing fluid under pressure to flow through said treadle valve and said pilot valve to the actuator to cause said one support to be moved toward the other support to force together a rubber heel and a heel seat of a shoe mounted respectively upon the supports, nail driving mechanism, a mechanically powered impeller, a clutch for operatively connecting said mechanism to said impeller, a clutch control valve responsive to pressure exerted against the actuator, clutch operating mechanism responsive to operation of said control valve for causing engagement of the clutch to effect movement of the nail driving mechanism and accordingly to drive nails into the heel and the heel seat of the shoe, said pilot valve being operated in response to pressure available for said clutch operating mechanism for connecting the actuator with said low pressure line just prior to tripping the clutch in order drastically to reduce the pressure between the heel and the shoe while nails are being driven, and a relief valve in said low pressure line for varying the pressure exerted against the actuator during the nail driving operation.

36. In a heel attaching machine, supports respectively for a heel and a shoe, an actuator having a pair of faces, fluid pressure means for operating the actuator, an accumulator, said fluid pressure means comprising a treadle operated valve comprising a plunger, means for moving the plunger from a starting position to one position to allow fluid pressure from the accumulator to operate upon one of said faces of the actuator to move said actuator in one direction and thereby to force with preliminary pressure said shoe and heel together, and back to said starting position to allow pressure from the accumulator to act upon the other face of the actuator thereby causing the actuator to move in an opposite direction, a mechanically driven booster for augmenting the pressure applied to said one face of the actuator as it is forced in said one direction to apply secondary pressure between the heel and the shoe, a ball check for normally preventing fluid from the booster being available for the accumulator, and a pressure regulator responsive to pressure applied against said one face of the actuator and cooperating with said fluid pressure means to cause fluid from the booster to be available for the accumulator when a predetermined maximum pressure is applied against said one face of the actuator.

37. In a heel attaching machine, a pair of work supports, fluid pressure means which comprises a piston operatively connected to one of the supports, mechanism for controlling said fluid pressure means to cause said piston and accordingly said one support to move first in one direction to clamp work between said supports and then in an opposite direction back to its starting position, a limit stop valve which is operatively associated with said fluid pressure means and with said mechanism and which has a plunger movable between open and closed positions, and extensible connections which are operatively connected to the plunger of the limit stop valve and are connected with lost motion to the piston, said extensible connections being adapted to move with relation to the plunger of the valve during movement of the piston in said one direction to establish an initial setting of said connections with relation to the plunger in accordance with the height of the work, said plunger remaining at rest and in its closed position during the first part of the movement of the piston in said opposite direction in accordance with the amount of lost motion between said piston and said connections and then being moved a predetermined distance to its open position thereby causing movement of said piston by said fluid pressure means to cease.

38. In a heel attaching machine, a nailing die, fluid pressure means comprising a piston and a manually actuated control valve, a jack carried by the piston, said valve having an element operative from a rest position to a displaced position to cause operation of the piston in one direction to force a shoe on the jack against the heel on the nailing die, means for driving nails into the heel and the heel seat of the shoe to attach the heel to the shoe, said element of said valve being movable back to its rest position to cause operation of the piston in an opposite direction thereby moving the jack away from the nailing die preparatory to removing the shoe and the attached heel from the machine, a limit stop valve which is associated with said fluid pressure means and has a plunger movable between nonby-passing and by-passing positions, and connections between said plunger and the piston for causing a predetermined movement of the piston in said opposite direction to move said plunger from a nonby-passing to a by-passing position whereby to stop movement of the piston in said opposite direction when said predetermined movement of said piston has been effected.

39. In a heel attaching machine, a nailing die, fluid pressure means comprising a piston and a manually actuated control valve, a jack carried by the piston, said valve having an element operative from a rest position to displaced position to cause operation of the piston in one direction to force a shoe on the jack against the heel on the nailing die, means for driving nails into the heel and the heel seat of the shoe to attach the heel to the shoe, said element of said valve being movable back to its rest position to effect operation of said piston in an opposite direction thereby moving the jack away from the nailing die preparatory to removing the shoe and the attached heel from the machine, a limit stop valve which is associated with said fluid pressure means and has a plunger movable between nonby-passing and by-passing positions, lost motion connections between said plunger and the piston for causing a predetermined movement of the piston in said opposite direction to move said plunger from said nonby-passing to said by-passing positions whereby to stop movement of the piston in said opposite direction when said predetermined movement of the piston has been effected, and means for varying the amount of lost motion between the plunger of the limit stop valve and the piston to vary the amount of movement of the piston in said opposite direction.

40. In a heel attaching machine, a nailing die, a jack, fluid pressure means comprising a piston upon which the jack is mounted, a reversing valve operative to cause said fluid pressure means to move said piston and accordingly the jack toward and away from the nailing die, said fluid pressure means comprising a cutoff valve and a limit stop valve having a plunger provided with a slight amount of movement toward and away from the nailing die, a carriage connected to the plunger, a latch, a measuring rod which is secured by said latch to the carriage and which is operatively connected to the piston with a predetermined amount of play toward and away from the nailing die, biasing means associated with the latch for allowing said latch to release the carriage from the measuring rod moved toward the nailing die by the piston, when said plunger of the valve has reached a limit of movement toward said nailing die, thereby allowing said rod to move with said piston toward the nailing die with relation to the carriage as work is clamped between the jack and said die and thus to measure the height of work positioned between the jack and the nailing die, said biasing means acting upon the latch to cause said latch to prevent movement of the measuring rod away from the nailing die with relation to the carriage, said measuring rod, after the piston and accordingly the jack have moved predetermined distances, depending upon said lost motion, away from the nailing die with relation to the rod, being moved as a unit together with the carriage and the plunger of the limit stop valve a predetermined distance to render the limit stop valve effective to cause said cutoff valve to be closed and thus prevent further movement of the piston away from the nailing die.

41. In a heel attaching machine, a nailing die, fluid pressure means comprising a piston and a manually operated control valve, a jack carried by the piston, said valve having an element operative from a rest position to a displaced position to operate the piston in one direction whereby to force a shoe on the jack against a heel on the nailing die, means for driving nails into the heel and the heel seat of the shoe to attach the heel to the shoe, said element of said valve being operative back to its rest position to move said piston in an opposite direction whereby to move the jack away from the nailing die preparatory to removing the shoe and the attached heel from the machine, a limit stop valve associated with said fluid pressure means and having a plunger which, when said element of the control valve has been moved to its rest position, is moved from a nonby-passing to a by-passing position to cause movement of the piston in said opposite direction to cease, said limit stop valve having a stop with which the plunger engages when the plunger is in its nonby-passing position, a carriage pinned to said plunger of the limit stop valve, a measuring rod which is slidingly mounted in the carriage and has a head, a pawl and ratchet arrangement for normally securing said rod to the carriage but permitting movement of the rod toward the die with relation to the carriage, said piston having formed in it a pair of spaced abutment faces between which the head of the rod is confined and with which the head of the rod is successively engaged as the piston moves in said one direction and said opposite direction, one of said abutment faces being in engagement with the head of the rod when the piston is in its rest position and as the piston and accordingly the jack are moved toward the die the rod remaining stationary until the other abutment face engages the head of the rod and forces the rod, the carriage and the plunger to move toward the nailing die until the plunger reaches its nonby-passing position against the stop and comes to rest, the measuring rod thereafter operating the pawl and ratchet to enable said connecting rod to move with the piston and with relation to the carriage and the plunger to measure the work, said rod, upon movement of the piston away from the die, remaining stationary until it is engaged by the other abutment face of the piston and then traveling in locked relation with the carriage and the plunger until said plunger has been moved into its by-passing position thereby preventing further movement of the piston away from the nailing die.

42. In a heel attaching machine, a pair of supports for shoe parts respectively, fluid pressure means comprising an actuator operatively connected to one of the supports, manually actuated means movable to and from a rest position for causing said fluid pressure means to move one of said supports toward the other to clamp said shoe parts together and then to move said one support away from the other preparatory to removing the shoe parts from the machine, a limit stop valve which is associated with said fluid pressure means and comprising a plunger, and a measuring rod which is connected with a predetermined amount of lost motion to the actuator and is movable relatively to the plunger to measure said shoe parts as said one support moves toward the other, said measuring rod being moved, after a predetermined amount of lost motion, by said one support as said one support moves away from the other and being positively connected for movement with the plunger, said plunger being adapted to cause fluid of said fluid pressure means acting against the actuator to be sealed when the plunger reaches a predetermined position during movement of said one support away from the other thereby causing movement of said one support away from the other to cease.

43. In a heel attaching machine, a jack, a nailing die having driver passages, a loader block having nail passages, means for positioning relatively to the nailing die a shoe mounted upon the jack and a heel which is to be attached to a heel seat of the shoe and is mounted on the nailing die, fluid pressure means for moving the loader block to a position over the nailing die and for vibrating it over said die to deliver nails from the passages of the loader block to the passages of the nailing die, fluid pressure means for moving the jack relatively to the nailing die to force a heel seat of the shoe against the heel, drivers reciprocable in the passages of the nailing die, and means responsive to said fluid pressure means for operating said drivers to drive nails in said passages through the heel and the heel seat of the shoe to attach said heel to the shoe.

44. In a heel attaching machine, a jack, a nailing die having driver passages, a loader block having nail passages, means for positioning relatively to the nailing die a shoe mounted upon the jack and a heel which is to be attached to a heel seat of the shoe and is mounted on the nailing die and fluid pressure means comprising a valve and a valve controlling cam for causing the loader block to be moved to a position over the nailing die to deliver nails from the passages of the loader block to the passages of the nailing die, fluid pressure means for moving the jack relatively to the nailing die to force a heel seat of the shoe against the heel, said cam being shaped and arranged to cause said valve to effect vibration of the loader block when said block is over the nailing die thereby agitating nails in said block to facilitate delivery of said nails to the passages of the nailing die drivers reciprocable in the passages of the nailing die, and means responsive to said fluid pressure means for operating said drivers to drive said nails through the heel and the heel seat of the shoe to attach said heel to the shoe.

45. In a heel attaching machine, a nailing die, a jack, fluid pressure means comprising a piston upon which the jack is mounted, a control valve operative to cause said fluid pressure means to move said piston and accordingly the jack in a path extending toward and away from the nailing die, said fluid pressure means comprising a cutoff valve and a limit stop valve which has a plunger, a stop engaged by the plunger, and a measuring rod which is operatively connected to the piston with lost motion extending generally lengthwise of said path and which is connected for yielding movement with relation to said plunger as the rod moves toward the nailing die and after the plunger has engaged said stop thereby measuring the height of work clamped between the jack and the nailing die, said measuring rod being connected for movement as a unit away from the nailing die with the plunger to cause, when said plunger has been displaced a predetermined distance by the piston, the limit stop valve to be moved to a position in which it admits oil under pressure to the cutoff valve and thus causes said cutoff valve to be closed and movement of the piston and accordingly the jack away from the nailing die to cease.

46. In a heel attaching machine, a jack for supporting a shoe on a last, a nailing die for supporting a heel, means for moving the jack in one direction from a rest position toward the nailing die to clamp the heel seat of the shoe against the heel, means for driving nails into the clamped together heel and heel seat of the shoe, means for moving the jack in an opposite direction to its rest position, means for limiting movement of said jack in said opposite direction away from the nailing die, and mechanism which during movement of the jack in said one direction is automatically set in a predetermined position with relation to said last-named means in accordance with the combined heights of the assembled shoe, last and heel and which, during movement of the jack in said opposite direction, operates on said last-named means and causes it to vary the rest position of the jack.

47. In a heel attaching machine, supports for receiving respectively, a heel and a shoe which is mounted upon a last and to which the heel is to be attached, means for moving in one direction one of the supports from a rest position toward the other to clamp together the heel and the heel seat of the shoe, means for driving nails into the clamped together heel and heel seat of the shoe, means for moving said one support in an opposite direction toward its rest position preparatory to removing the shoe and its attached heel from the machine, means for limiting movement of said one support away from the other support and thus establishing the rest position of said one support, and mechanism which during movement of said one support in said one direction is automatically set in a predetermined position with relation to said last-named means in accordance with the combined heightwise dimension of the assembled shoe, last and heel, and which, during movement of said one support in an opposite direction, operates on said last-named means and causes it to vary the rest position of said one support in accordance with the heightwise dimension of the work.

48. In a fastening inserting machine, fluid pressure means, a support, an abutment, an actuator which is operatively connected to the support, a treadle valve having an element, means for moving said element from an initial to a displaced position to cause movement of the actuator by said fluid pressure means and accordingly movement of said support toward the abutment to force a shoe mounted upon said support against the abutment, fastening inserting means, said fluid pressure means comprising a pilot valve responsive entirely to pressure exerted against the actuator for rendering said fastening inserting means active to insert fastenings into the shoe, and means for moving said element of the treadle valve back to its initial position to cause movement of the actuator by said fluid pressure means and accordingly movement of said support away from the abutment.

49. In a fastening inserting machine, fluid pressure means, a support, an abutment, an actuator which is operatively connected to said support, a treadle valve having an element, means for moving said element from an initial to a displaced position to cause movement of the actuator by said fluid pressure means and accordingly movement of said support toward the abutment to force a shoe mounted upon the support against said abutment, fastening inserting means, mechanism comprising a plunger for rendering said fastening inserting means active, said fluid pressure means also comprising a pilot valve responsive entirely to pressure open to the actuator for operating the plunger thereby rendering said fastening inserting means active to drive fastenings into the shoe, means for varying the timing of the pilot valve, and means for moving said element of the treadle valve back to its initial position to cause movement of the actuator by said fluid pressure means and accordingly movement of said support away from the abutment.

50. In a fastening inserting machine, a work support, an abutment, a piston operatively connected to the work support, fluid pressure means comprising a pair of chambers which are formed partly by said piston and into which high and low pressure fluids are introduced respectively to produce a pressure differential acting upon the piston to move said piston first in one direction and then in an opposite direction whereby to move said support toward the abutment and then away from said abutment, a piston pilot valve for sealing the chamber heretofore open to low pressure fluid for limiting movement of the piston in said opposite direction and the support away from the abutment, and a limit stop valve which is operative in response to movement of the piston in said opposite direction for operating said piston pilot valve.

51. In a machine for operating upon shoes, a work support, an abutment, a piston operatively connected to said support, fluid pressure means comprising a pair of chambers which are formed partly by said piston and into which fluids under high and low pressures are introduced respectively to produce a pressure differential acting upon the piston to move said work support first in one direction and then in an opposite direction, a piston pilot valve for shutting off one of the chambers to limit movement of the piston in said opposite direction, and a limit stop valve having a movable element which is operatively connected, with a slight amount of lost motion, to the piston and is adapted to control operation of said piston pilot valve.

52. In a machine for use in the manufacture of shoes, fluid pressure means, a jack, an abutment, an actuator operatively connected to the jack and having faces against which differential pressure is applied by said fluid pressure means to move said actuator first in one direction and then in an opposite direction, said fluid pressure means comprising a treadle valve having an element, means for moving said element from a rest position to a displaced position to cause said fluid pressure means to effect movement of the actuator in said one direction thereby forcing a shoe under primary pressure against the abutment, and for moving said element back to said rest position to effect movement of the actuator in said opposite direction thereby causing movement of the jack away from the abutment, mechanism for inserting fastenings into the shoe forced against the abutment, said fluid pressure means also comprising a fastening inserting pilot valve having an element which is movable entirely in response to pressure applied against one of the faces of the actuator for rendering said fastening inserting means active to drive said fastenings into the heel seat of the shoe in engagement with said abutment, and pressure boosting means responsive to movement of said fastening inserting means for forcing the shoe against the abutment with augmented pressure during the operation of the fastening inserting means.

53. In a machine for use in the manufacture of shoes, an abutment, fluid pressure means comprising a jack which is movable toward and away from the abutment, nail driving means, a clutch engagement of which renders said nail driving means active, mechanism for engaging the clutch, manually actuated means movable a predetermined distance for rendering said fluid pressure means active to move the jack toward the abutment for forcing the heel seat of a shoe against the abutment under substantial pressure, a clutch trip pilot valve having a plunger movable in response to action of said fluid pressure means to cause fluid of said means to actuate said mechanism and accordingly effect engagement of said clutch thereby causing nails to be driven into the heel seat of the shoe, and a resistance member which acts against the plunger of said pilot valve and is adjustable to vary the timing of said valve.

54. In a machine for use in the manufacture of shoes, a jack, an abutment, and fluid pressure means for effecting relative approaching movement and movement of separation of the abutment and the jack, said fluid pressure means comprising a cutoff valve and a limit stop valve having operatively connected to it an element which partakes, with a predetermined amount of lost motion, of said relative approaching movement and said movement of separation between the jack and the abutment and which is adapted, when said movement of separation has progressed a predetermined distance, to operate the limit stop valve and thus to cause said cutoff valve to be closed thereby stopping said movement of separation.

55. In a machine for use in the manufacture of shoes, a jack for supporting a shoe, an abutment, a plunger operatively connected to the jack, means comprising a treadle valve and an accumulator for supplying fluid under pressure to the plunger to move the jack toward the abutment for clamping the shoe against the abutment, a loader block, fluid pressure means open to the accumulator for operating the loader block through a cycle to supply nails to a station adjacent to the abutment, means for driving nails into the heel seat of the shoe, means movable in response to fluid pressure applied against the plunger for rendering said nail driving means operative, and fluid pressure means acting directly on the treadle valve when the loader block is in operation for insuring against movement of said valve.

56. In a fastening inserting machine, an abutment having passages, fastening inserting mechanism comprising a plurality of drivers movable in said passages, fluid pressure means for forcing work against the abutment with preliminary pressure, and a compressor actuated by said fastening inserting mechanism and associated with said fluid pressure means for raising during the operation of said fastening inserting mechanism pressure applied against the work.

57. In a machine for use in the manufacture of shoes, a jack for a shoe, an abutment, an actuator, fluid pressure means for operating said actuator, said fluid pressure means comprising an accumulator and a treadle operated valve comprising a plunger, means for moving the plunger from a starting position to one position to cause fluid from the accumulator and operating through said fluid pressure means to force the actuator in one direction to clamp with primary pressure the shoe against the abutment, means for moving the plunger from said one position to said starting position to cause fluid from the accumulator and operating through said fluid pressure means to force the actuator in an opposite direction, a mechanically driven booster for augmenting, as the actuator is forced in said one direction, the force applied to the actuator in that direction to clamp the shoe against the abutment under secondary pressure, a fluid pressure regulator, a ball check interposed between the actuator on the one hand and the booster and the treadle operated valve on the other hand, and a by-pass valve responsive to the pressure regulator and also to pressure acting against the actuator for by-passing oil from the booster into the accumulator when pressure against the actuator reaches a predetermined maximum.

58. In a machine for use in the manufacture of shoes, a jack, an abutment, fluid pressure means comprising a piston operatively connected to said jack, mechanism for controlling said fluid pressure means to cause said piston and accordingly said jack to move first in one direction to clamp work against the abutment and then in an opposite direction back to a starting position, a limit stop valve which is operatively associated with said fluid pressure means and with said mechanism and which has a plunger movable between open and closed positions, and extensible connections which are operatively connected to the plunger of the limit stop valve and are connected with lost motion to the piston, said extensible connections being adapted to move with relation to the plunger of the valve during movement of the piston in said one direction to establish an initial setting of said connection with relation to the plunger in accordance with the height of the work, said plunger being adapted to remain at rest and in its closed position during the first part of the movement of the piston in said opposite direction in accordance with the amount of lost motion between said piston and said connections and then being moved a predetermined distance to its open position thereby causing movement of said piston by said fluid pressure means to cease.

59. In a heel attaching machine, a support for a shoe, a support for a heel, fluid pressure means comprising an acuator which is operatively connected to one of said supports and has a face against which fluid of said means is applied, fastening inserting means, manually actuated movable to a recognizable position for causing fluid under relatively low pressure to be applied against said face of the actuator to force together with primary pressure the heel and a heel seat of the shoe, said manually actuated means being movable to a second recognizable position for rendering said fastening inserting means active to drive fastenings into the heel and the heel seat of the shoe, and means which is rendered active in response to the operation of said fastening inserting means and forces said fluid under relatively high pressure against said face of the actuator thereby clamping together the heel and the heel seat of the shoe under augmented pressure during the fastening inserting operation.

60. In a heel attaching machine, means comprising a nailing die for supporting a heel, a jack for a shoe, fluid pressure means comprising an actuator which is operatively connected to the jack and has a face against which fluid of said means is applied, drivers movable in the nailing die, manually actuated means movable to a recognizable position for causing fluid under relatively low pressure to be applied against said face of the actuator to force a heel seat of the shoe on the jack with primary pressure against the heel supported by the nailing die, said manually actuated means being movable to a second recognizable position for rendering said drivers active to drive fastenings into the heel and the heel seat of the shoe, and means which is rendered active in response to the operation of the drivers and forces said fluid under relatively high pressure against said face of the actuator thereby imparting increased pressure to the jack and accordingly forcing the heel seat of the shoe against the heel with augmented pressure.

References Cited in the file of this patent

UNITED STATES PATENTS

| | | |
|---|---|---|
| 1,133,533 | Buckminister | Mar. 30, 1915 |
| 1,157,688 | Glidden | Oct. 26, 1915 |
| 1,157,689 | Jarram | Oct. 26, 1915 |
| 1,573,045 | Durrance | Feb. 16, 1926 |
| 1,920,281 | Standish | Aug. 1, 1933 |
| 2,242,765 | Stein | May 20, 1941 |
| 2,365,060 | De Wolfe | Dec. 12, 1944 |
| 2,420,052 | Muir | May 6, 1947 |
| 2,428,336 | Munschauer | Sept. 30, 1947 |
| 2,435,834 | Herman | Feb. 10, 1948 |
| 2,468,213 | Lancaster | Apr. 26, 1949 |

FOREIGN PATENTS

| | | |
|---|---|---|
| 814,335 | France | Mar. 15, 1937 |